US008641806B2

(12) United States Patent
Claridge et al.

(10) Patent No.: US 8,641,806 B2
(45) Date of Patent: *Feb. 4, 2014

(54) SYSTEMS AND METHODS FOR MULTI-STAGE AIR DEHUMIDIFICATION AND COOLING

(75) Inventors: David E. Claridge, College Station, TX (US); Charles H. Culp, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/294,968

(22) Filed: Nov. 11, 2011

(65) Prior Publication Data

US 2012/0118155 A1 May 17, 2012

Related U.S. Application Data

(60) Provisional application No. 61/413,327, filed on Nov. 12, 2010.

(51) Int. Cl.
*B01D 53/22* (2006.01)
(52) U.S. Cl.
USPC ............ 96/9; 95/43; 95/52; 96/4; 96/7; 96/10
(58) Field of Classification Search
USPC ........................... 95/43, 45, 52; 96/4, 7, 10, 9
See application file for complete search history.

(56) References Cited

U.S. PATENT DOCUMENTS

| | | | | | |
|---|---|---|---|---|---|
| 2,506,656 | A | * | 5/1950 | Wallach et al. ................ | 95/52 |
| 2,517,499 | A | * | 8/1950 | McGrath ........................ | 62/93 |
| 2,583,601 | A | * | 1/1952 | Schwertz ........................ | 95/52 |
| 3,604,246 | A | * | 9/1971 | Toren ............................. | 73/38 |
| 3,735,559 | A | * | 5/1973 | Salemme ........................ | 95/52 |

(Continued)

FOREIGN PATENT DOCUMENTS

| JP | 60238120 A | 11/1985 |
|---|---|---|
| JP | 63054920 A | 3/1988 |

(Continued)

OTHER PUBLICATIONS

Elvers et al. "Ullmann's encyclopedia of Industrial Chemistry," Cambridge, New York, p. 204, 1990.*

(Continued)

*Primary Examiner* — Jason M Greene
*Assistant Examiner* — Anthony Shumate
(74) *Attorney, Agent, or Firm* — Fletcher Yoder, P.C.

(57) ABSTRACT

Systems and methods are provided for dehumidifying air by establishing a humidity gradient across a water selective permeable membrane in a dehumidification unit. Water vapor from relatively humid atmospheric air entering the dehumidification unit is extracted by the dehumidification unit without substantial condensation into a low pressure water vapor chamber operating at a partial pressure of water vapor lower than the partial pressure of water vapor in the relatively humid atmospheric air. For example, water vapor is extracted through a water permeable membrane of the dehumidification unit into the low pressure water vapor chamber. As such, the air exiting the dehumidification unit is less humid than the air entering the dehumidification unit. The low pressure water vapor extracted from the air is subsequently condensed and removed from the system at ambient conditions.

23 Claims, 25 Drawing Sheets

(56) References Cited

U.S. PATENT DOCUMENTS

| | | | | |
|---|---|---|---|---|
| 4,466,202 | A | * | 8/1984 | Merten .................... 34/470 |
| 4,834,779 | A | * | 5/1989 | Paganessi et al. ............. 95/44 |
| 4,900,448 | A | | 2/1990 | Bonne et al. |
| 4,931,070 | A | * | 6/1990 | Prasad ..................... 95/52 |
| 5,034,025 | A | * | 7/1991 | Overmann, III ............. 95/52 |
| 5,071,451 | A | | 12/1991 | Wijmans |
| 5,118,327 | A | * | 6/1992 | Nelson et al. ............... 95/10 |
| 5,205,842 | A | | 4/1993 | Prasad |
| 5,236,474 | A | * | 8/1993 | Schofield et al. ............ 95/47 |
| 5,256,295 | A | * | 10/1993 | Baker et al. ................ 210/640 |
| 5,259,869 | A | | 11/1993 | Auvil et al. |
| 5,383,956 | A | | 1/1995 | Prasad et al. |
| 5,525,143 | A | | 6/1996 | Morgan et al. |
| 5,641,337 | A | * | 6/1997 | Arrowsmith et al. ......... 95/39 |
| 5,681,368 | A | * | 10/1997 | Rahimzadeh ............... 95/19 |
| 6,346,142 | B1 | * | 2/2002 | Jetter et al. ................. 96/9 |
| 6,485,545 | B1 | * | 11/2002 | Ohlrogge et al. ............. 96/4 |
| 6,619,064 | B1 | | 9/2003 | Piao et al. |
| 6,786,059 | B1 | | 9/2004 | Piao et al. |
| 6,887,303 | B2 | * | 5/2005 | Hesse et al. ................. 96/8 |
| 7,604,681 | B2 | | 10/2009 | Malsam et al. |
| 7,767,256 | B2 | | 8/2010 | Gu et al. |
| 8,221,530 | B2 | * | 7/2012 | Peter et al. .................. 96/9 |
| 2008/0138569 | A1 | | 6/2008 | Collier et al. |
| 2008/0237919 | A1 | | 10/2008 | Liu et al. |
| 2008/0299377 | A1 | | 12/2008 | Gu et al. |
| 2009/0000475 | A1 | | 1/2009 | Fekety et al. |
| 2009/0110873 | A1 | | 4/2009 | Jiang et al. |
| 2009/0110907 | A1 | | 4/2009 | Jiang et al. |
| 2010/0072291 | A1 | | 3/2010 | Matsubara |
| 2010/0297531 | A1 | | 11/2010 | Liu et al. |
| 2010/0304953 | A1 | | 12/2010 | Liu et al. |
| 2011/0045971 | A1 | | 2/2011 | Collier et al. |
| 2011/0052466 | A1 | | 3/2011 | Liu |
| 2011/0100900 | A1 | | 5/2011 | Drury et al. |
| 2011/0274835 | A1 | | 11/2011 | Liu et al. |
| 2012/0117987 | A1 | * | 5/2012 | Claridge et al. ............. 62/94 |
| 2012/0118145 | A1 | * | 5/2012 | Claridge et al. ............. 95/52 |
| 2012/0118146 | A1 | * | 5/2012 | Claridge et al. ............. 95/52 |
| 2012/0118147 | A1 | * | 5/2012 | Claridge et al. ............. 95/52 |
| 2012/0118148 | A1 | * | 5/2012 | Culp et al. .................. 95/52 |

FOREIGN PATENT DOCUMENTS

| | | |
|---|---|---|
| JP | 05228328 A | 9/1993 |
| JP | 2002136830 A | 5/2002 |
| JP | 2004286262 A | 10/2004 |
| WO | 2008106028 | 9/2008 |

OTHER PUBLICATIONS

Kinsara, A., et al.; "Proposed energy-efficient air-conditioning system using liquid desiccant", Applied Therman Engineering, 16 (10), 791-806, 1996.

Harriman, L.G., et al.; ASHRAE Journal, Nov. 1997, 37-45.

Li, Z., et al.; "Long-term chemical and biological stability of surfacant-modified zeolite", Environ. Sci. Technol., 32 (17), 2628-2632, 1998.

El-Dessouky, H.T., et al.; "A novel air conditioning system—Membrane air drying and evaporative cooling", Chemical Enginerring Research & Design, 78 (A7): 999-1009, 2000.

Kawahara, K., et al.; "Antibacterial effect of silver-zeolite on oral bacteria under anaerobic conditions", Dental Materials, 16 (16), 452-455, 2000.

Koros, W.J., et al.; "Pushing the limits on possibilities for large-scale gas separation: which strategies?", J. Mem. Sci. 175, 181-196, 2000.

Scovazzo, P., et al.; "Membrane porosity and hydrophilic membrane-based dehumidification performance", J. Mem. Sci., 167, 217-225, 2000.

Morigami, Y., et al.; "The first large-scale pervaporation plant using tubular-type module with zeolite NaA membrame", Sep. and Purification Tech. 25, 251-260, 2001.

Liu, W., et al.; "Monolithic reactor for the dehydrogenation of ethylbenzene to styrene", Ind. Eng. Chem. Res., 41, 3131-38, 2002.

Ye, H.H., et al.; "Water transport properties of Nafion membranes—Part I. Single-tube membrane module for air drying", Journal of Membrane Science, 221 (1-2): 147-161, 2003.

Bhattacharya, M., et al.; "Mass-Transfer Coefficients in Washcoated Monoliths", AIChE J. 50, 2939-2955, 2004.

Kangoglu, M., et al.; "Energy and exergy analyses of an experimental open-cycle desiccant cooling system", Applied Thermal Engineering, 24, 919-923, 2004.

Feng, N., et al.; "Applications of natural zeolite to construction and building materials in China", Construction and Building Materials, 19(80), 579-584, 2005.

Mina, E.M., et al.; "A generalized coefficient of performance for conditioning moist air", International Journal of Refrigeration, 28, 784-790, 2005.

O'Neill, C., et al.; "Durability of hydrophilic and antimicrobial zeolite coatings under water immersion", AIChE Journal, vol. 52, No. 3, 1157-1161, 2006.

Yin, Y.G., et al.; "Experimental study on dehumidifier and regenerator of liquid desiccant cooling air conditioning system", Building and Environment 42 (7), 2505-2511, 2007.

Li, J.L., et al.; "Dehumidification and humidification of air by surface-soaked liquid membrane module with triethylene glycol", Journal of Membrane Science, 325 (2):1007-1012, 2008.

Liu, W.; "High surface area inorganic membrane for process water removal", Quarterly Progress Report to DOE Industrial Technology Program Office, Award Number: DE-FC36-04GO98014, from Oct. 1, 2008 to present, 2 pages.

Zhang, L.Z., et al.; "Synthesis and characterization of a PVA/LiCl blend membrane for air dehumidification", Journal of Membrane Science, 308 (1-2), 198-206, 2008.

Bernardo, P., et al.; "Membrane gas separation: a review/state of the art", Ind. Eng. Chem. Res., 48, 4638-4663, 2009.

Liang, C.H., et al.; "Independent air dehumidification with membrane-based total heat recovery: Modeling and experimental validation", International Journal of Refrigeration—Revue Internationale Du Froid, 33 (2): 398-408, 2010.

Xiong, Z.Q., et al.; "Development of a novel two-stage liquid desiccant dehumidification system assisted by CaCl2 solution using exergy analysis method", Applied Energy, 87 (5):1495-1504, 2010.

Zhang, J., et al.; "Air dehydration membranes for non-aqueous lithium-air batteries", J. Electrochem. Soc., May 2010, in print, 940-946.

Zhang, J., et al.; "Oxygen-selective immobilized liquid membranes for operation of lithium-air batteries in ambient air", Journal of Power Sources, May 2010, in print, 7438-7444.

Scovazzo, P., et al.; "Hydrophilic membrane-based humidity control", J. Mem. Sci., 149, 69-81, 1998.

Ye, X., et al.; "Water transport properties of Nafion membranes—Part II. Multi-tube membrane module for air drying", Journal of Membrane Science, 221 (1-2): 163-173, 2003.

PCT International Search Report; PCT/US2011/060490; Jun. 21, 2012, pp. 1-9.

Tegrotenhuis, Ward, et al.; "Passive microchannel humidifier for PEM fuel cell water management," 234th ACS National Meeting, Aug. 19-23, 2007, Boston, MA (1 page).

Turner, D., P.E., Ph.D.; "Case Studies of High Humidity Problems in Hot and Humid Climates in the United States," Proceedings: Indoor Air 2005, Energy Systems Laboratory, Texas A&M University System, College Station, Texas, pp. 1438-1444.

* cited by examiner

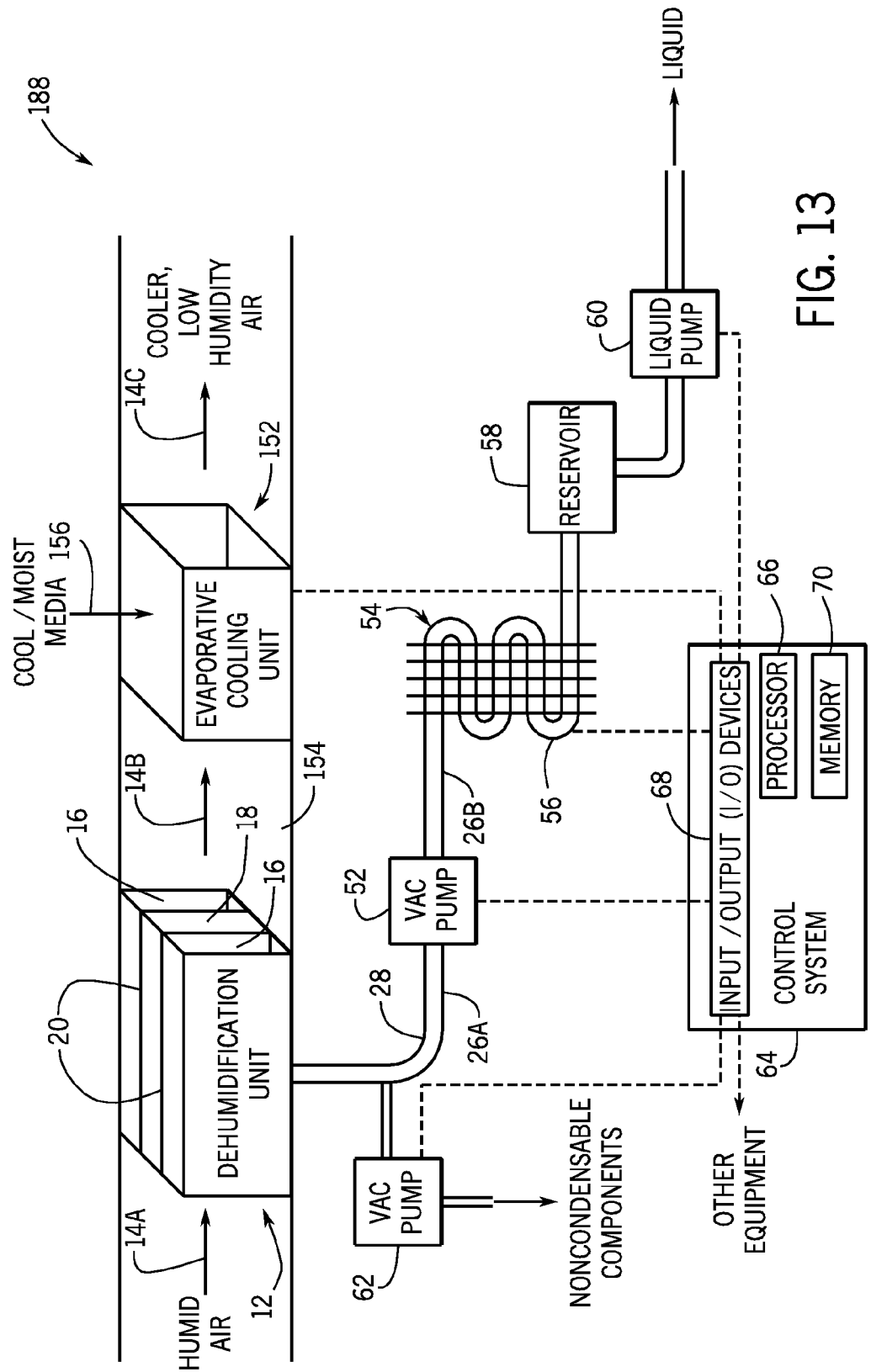

SYSTEMS AND METHODS FOR MULTI-STAGE AIR DEHUMIDIFICATION AND COOLING

This application is a Non-Provisional patent application of U.S. Provisional Patent Application No. 61/413,327, entitled "Systems and Methods for Air Dehumidification and Cooling", filed Nov. 12, 2010, which is incorporated by reference in its entirety herein.

BACKGROUND

Heating, ventilating, and air conditioning (HVAC) systems often have dehumidification systems integrated into the cooling apparatus for dehumidifying the air being conditioned by such systems. When cooling is required in warm to hot environments, the air being cooled and dehumidified will usually have a humidity ratio above approximately 0.009 (pounds of $H_2O$ per pounds of dry air). In these environments, the HVAC systems traditionally use refrigerant compressors for sensible cooling of the air and removal of latent energy (i.e., humidity). The air is typically cooled to about 55° F., which condenses $H_2O$ out of the air until the air is about 100% saturated (i.e., relative humidity at about 100%). The 55° F. temperature lowers the humidity ratio to about 0.009 pounds of $H_2O$ per pound of dry air, which is the water vapor saturation point at 55° F., resulting in a relative humidity of almost 100%. When this air warms to about 75° F., the humidity ratio remains approximately the same, and the relative humidity drops to approximately 50%. This traditional method of dehumidification requires the air to be cooled to about 55° F., and can usually achieve a coefficient of performance (COP) of approximately 3-5.

BRIEF DESCRIPTION OF THE DRAWINGS

These and other features, aspects, and advantages of embodiments of the present disclosure will become better understood when the following detailed description is read with reference to the accompanying drawings in which like characters represent like parts throughout the drawings, wherein:

FIG. 13 is a schematic diagram of an HVAC system having the evaporative cooling unit disposed downstream of the dehumidification unit in accordance with an embodiment of the present disclosure;

DETAILED DESCRIPTION OF SPECIFIC EMBODIMENTS

Figure 1:
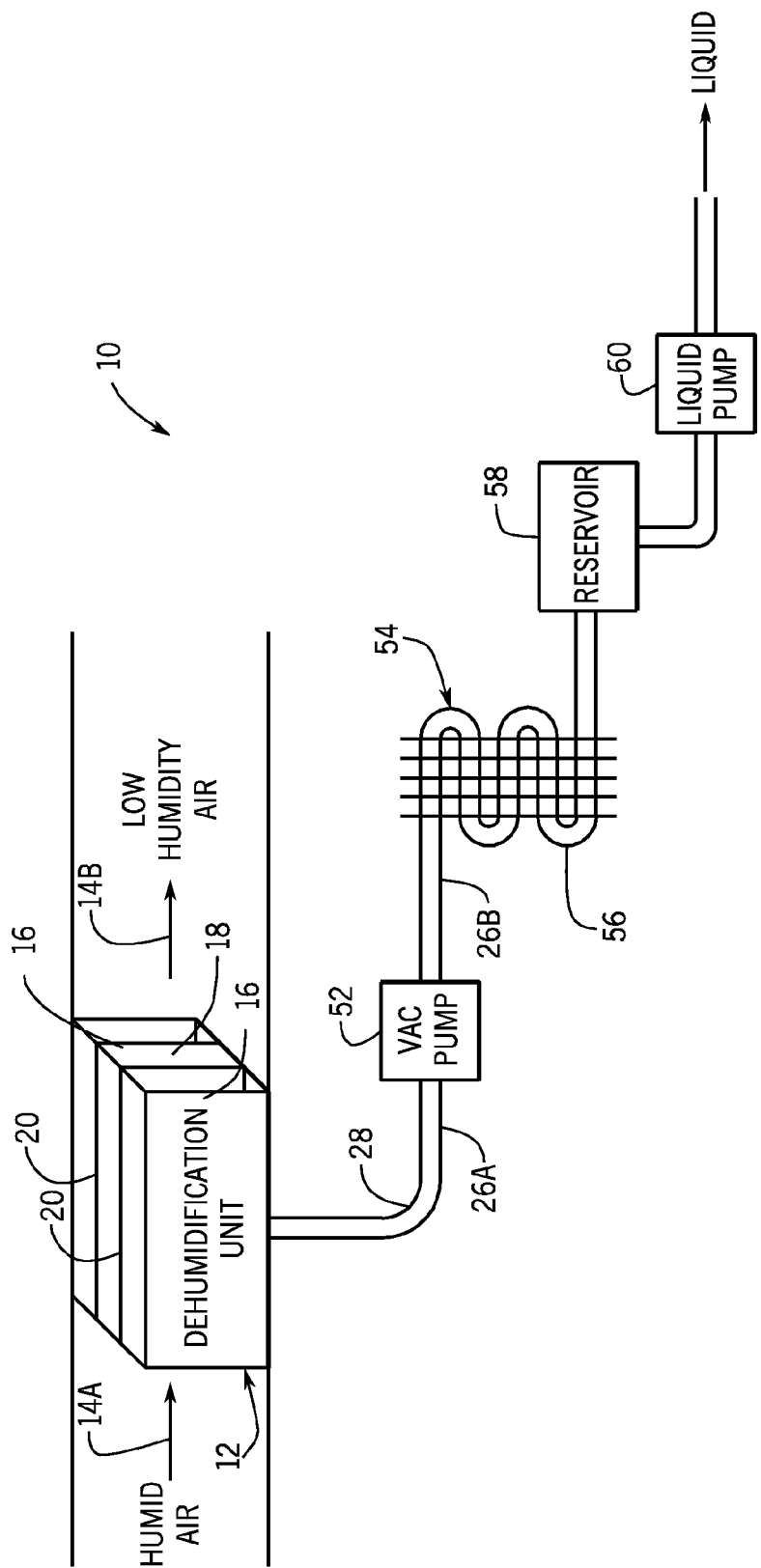
FIG. 1 is a schematic diagram of an HVAC system having a dehumidification unit in accordance with an embodiment of the present disclosure.

Specific embodiments of the present disclosure will be described herein. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The subject matter disclosed herein relates to dehumidification systems and, more specifically, to systems and methods capable of dehumidifying air without initial condensation by establishing a humidity gradient in a dehumidification unit. In one embodiment, a water vapor permeable material (i.e., a water vapor permeable membrane) is used along at least one boundary separating an air channel from a secondary channel or chamber to facilitate the removal of water vapor from the air passing through the air channel. The secondary channel or chamber separated from the air channel by the water vapor permeable material may receive water vapor extracted from the air channel via the water vapor permeable material.

In operation, the water vapor permeable material allows the flow of $H_2O$ (which may refer to $H_2O$ as water molecules, gaseous water vapor, liquid water, adsorbed/desorbed water molecules, absorbed/desorbed water molecules, or combinations thereof) through the water vapor permeable material from the air channel to the secondary channel or chamber, while substantially blocking the flow of other components of the air flowing through the air channel from passing through the water vapor permeable material. As such, the water vapor permeable material reduces the humidity of the air flowing through the air channel by removing primarily only water vapor from the air. Correspondingly, the secondary channel or chamber is filled with primarily water vapor. It should be noted that the passage of $H_2O$ through the water vapor permeable material may be facilitated by a pressure differential. Indeed, a lower partial pressure of water vapor (i.e., a partial pressure less than the partial pressure of water vapor in the air channel) may be created in the secondary channel or chamber to further facilitate passage of the $H_2O$ through the water vapor permeable material. Accordingly, the side of the water vapor permeable material opposite the air channel may be referred to as the suction side of the water vapor permeable material.

Once the $H_2O$ has been passed through the water vapor permeable material, a vacuum pump is used to increase the partial pressure of the water vapor on the suction side of the water vapor permeable material to a minimal saturation pressure used to enable condensation of the water vapor by a condenser. That is, the vacuum pump compresses the water vapor to a pressure in a range suitable for condensing the water vapor into liquid water (e.g., a range of approximately 0.25-1.1 pounds per square inch absolute (psia), with the higher value applying to embodiments using multiple dehumidification units in series), depending on desired conditions for condensation. The condenser then condenses the water vapor into a liquid state, and the resulting liquid water is then pressurized to approximately atmospheric pressure, such that the liquid water may be rejected at ambient atmospheric conditions. By condensing the water vapor to a liquid state prior to expelling it, certain efficiencies are provided. For example, pressurizing liquid water to atmospheric pressure uses less energy than pressurizing water vapor to atmospheric pressure. Alternatively, the water vapor may be rejected to ambient conditions through a membrane water vapor rejection unit. It should also be noted that the dehumidification unit described herein in general uses significantly less energy than conventional systems.

While the embodiments described herein are primarily presented as enabling the removal of water vapor from air, other embodiments may enable the removal of other $H_2O$ components from air. For example, in certain embodiments, instead of a water vapor permeable material, an $H_2O$ permeable material may be used. As such, the $H_2O$ permeable material may allow the flow of one, all, or any combination of $H_2O$ components (i.e., water molecules, gaseous water vapor, liquid water, adsorbed/desorbed water molecules, absorbed/desorbed water molecules, and so forth) through the $H_2O$ permeable material from the air channel to the secondary channel or chamber, while substantially blocking the flow of other components of the air flowing through the air channel from passing through the $H_2O$ permeable material. In other words, the disclosed embodiments are not limited to the removal of water vapor from air, but rather to the removal of $H_2O$ (i.e., in any of its states) from air. However, for conciseness, the embodiments described herein are primarily focused on the removal of water vapor from air.

In certain embodiments, as described in more detail below with respect to FIGS. 19-26, one or more of the aforementioned dehumidification units may be combined with one or more cooling systems, such as evaporative cooler systems. In one example, multiple stages, each stage including one evaporative or mechanical cooler and one dehumidification unit, may be combined in series and/or in parallel. Outside air may enter a first stage of the multiple stages, and be subsequently directed through multiple stages, exiting a final stage as cooler, drier air. That is, each subsequent stage may cool and dry the air from the previous stage. In one embodiment, a multi-stage vacuum pump may be used to create a low pressure side, providing a partial pressure differential suitable for enabling the outside air to move through the multiple stages. In other embodiments, multiple pumps may be used alternative or additional to the multi-stage pump. The low pressure side may also include a purge unit useful in removing certain components of the air, such as noncondensable components (e.g., oxygen, nitrogen, and other atmospheric gas components). A condenser may also be provided, suitable for condensing water vapor which may then be directed into a liquid receiver. A pump may then discharge the liquid from the receiver. Controller systems may be communicatively coupled to the various components of the multiple stages (e.g., pumps, valves, condensers, evaporative coolers) and used to more efficiently control the drying and cooling of the air.

By providing for the aforementioned multiple stages, each stage including an evaporator or mechanical cooler and a dehumidification system, a drier, cooler air may be produced in a more efficient manner, when compared to using a single stage. Additionally, including the multiple stages may enhance reliability and provide for redundancy. For example, bypass valves may be used to bypass certain stages in the event of an unexpected maintenance event. Indeed, maintenance, including the complete removal of one or more stages, may be performed, for example, by using the bypass valves, while the remaining stages may continue drying and/or cooling operations. Further, each stage may be provided at different producing capacities (e.g., drying, cooling capacity), thus enabling an HVAC system suitable for use in a variety of conditions.

With the foregoing in mind, it may be useful to describe certain systems and methods, such as an HVAC system 10 depicted in FIG. 1. More specifically, FIG. 1 is a schematic diagram of an HVAC system 10 having a dehumidification unit 12 in accordance with an embodiment of the present disclosure. As illustrated, the dehumidification unit 12 may receive inlet air 14A having a relatively high humidity and expel outlet air 14B having a relatively low humidity. In particular, the dehumidification unit 12 may include one or more air channels 16 through which the air 14 (i.e., the inlet air 14A and the outlet air 14B) flows. In addition, the dehumidification unit 12 may include one or more water vapor channels 18 adjacent to the one or more air channels 16. As illustrated in FIG. 1, the air 14 does not flow through the water vapor channels 18. Rather, the embodiments described herein enable the passage of water vapor from the air 14 in the air channels 16 to the water vapor channels 18, thus dehumidifying the air 14 and accumulating water vapor in the water vapor channels 18. In particular, water vapor from the air 14 in the air channels 16 may be allowed to flow through an interface 20 (i.e., a barrier or membrane) between adjacent air channels 16 and water vapor channels 18, while the other components (e.g., nitrogen, oxygen, carbon dioxide, and so forth) of the air 14 are blocked from flowing through the interface 20. In general, the water vapor channels 18 are sealed to create the low pressure that pulls the water vapor from the air 14 in the air channels 16 through the interfaces 20 as $H_2O$ (i.e., as water molecules, gaseous water vapor, liquid water, adsorbed/desorbed water molecules, absorbed/desorbed water molecules, and so forth, through the interfaces 20).

As such, a humidity gradient is established between the air channels 16 and adjacent water vapor channels 18. The humidity gradient is generated by a pressure gradient between the air channels 16 and adjacent water vapor channels 18. In particular, the partial pressure of water vapor in the water vapor channels 18 is maintained at a level lower than the partial pressure of water vapor in the air channels 16, such that the water vapor in the air 14 flowing through the air channels 16 tends toward the suction side (i.e., the water vapor channels 18 having a lower partial pressure of water vapor) of the interfaces 20.

Components of air other than $H_2O$ may be substantially blocked from passing through the interfaces 20 in accordance with present embodiments. In other words, in certain embodiments, approximately 95% or more, approximately 96% or more, approximately 97% or more, approximately 98% or more, or approximately 99% or more of components of the air 14 other than $H_2O$ (e.g., nitrogen, oxygen, carbon dioxide, and so forth) may be blocked from passing through the interfaces 20. When compared to an ideal interface 20 that blocks 100% of components other than $H_2O$, an interface 20 that blocks 99.5% of components other than $H_2O$ will experience a reduction in efficiency of approximately 2-4%. As such, the components other than $H_2O$ may be periodically purged to minimize these adverse effects on efficiency.

Figure 2A:
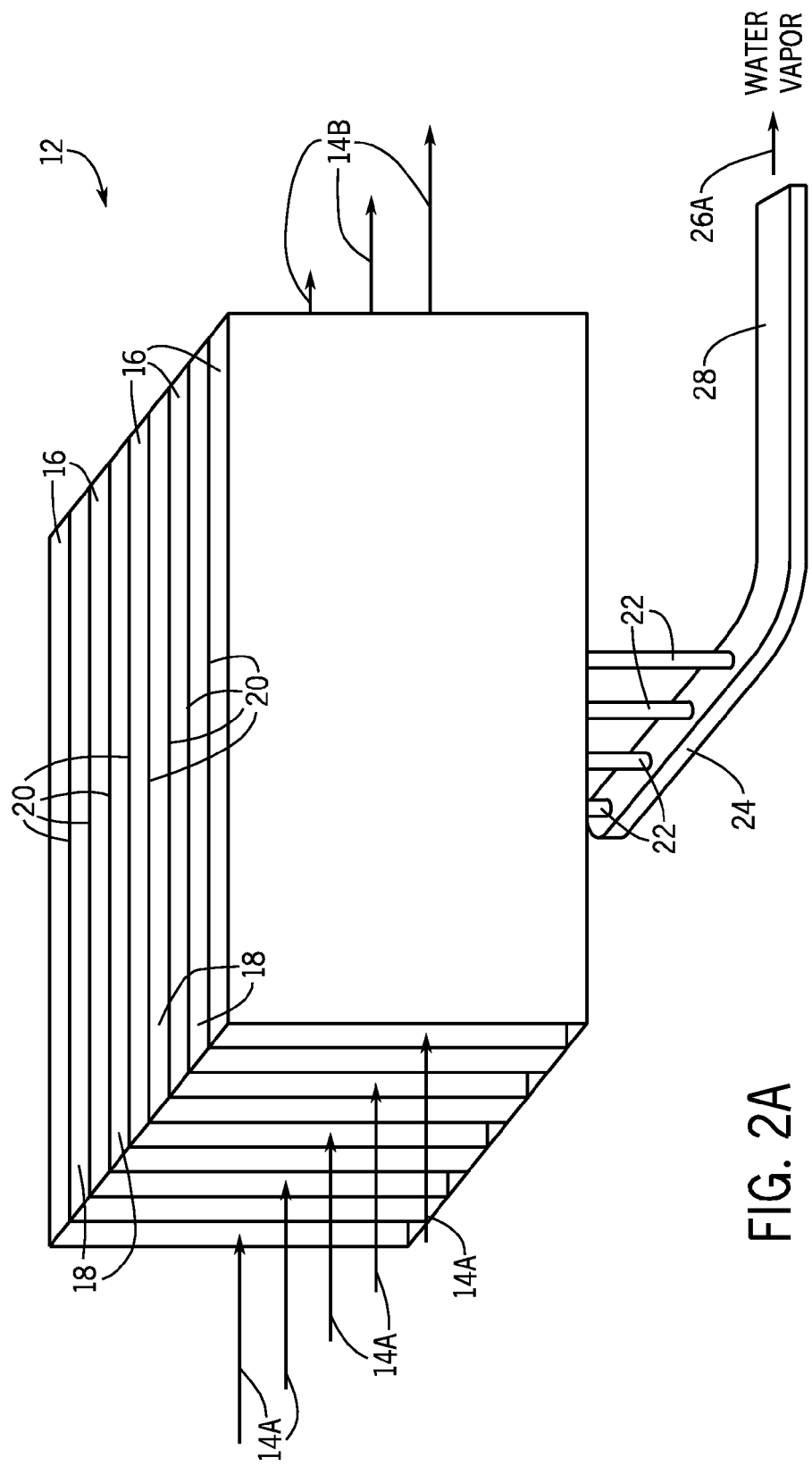
FIG. 2A is a perspective view of the dehumidification unit of FIG. 1 having multiple parallel air channels and water vapor channels in accordance with an embodiment of the present disclosure.

FIG. 2A is a perspective view of the dehumidification unit 12 of FIG. 1 having multiple parallel air channels 16 and water vapor channels 18 in accordance with an embodiment of the present disclosure. In the embodiment illustrated in FIG. 2A, the air channels 16 and the water vapor channels 18 are generally rectilinear channels, which provide a substantial amount of surface area of the interfaces 20 between adjacent air channels 16 and water vapor channels 18. Further, the generally rectilinear channels 16, 18 enable the water vapor 26A to be removed along the path of the air channels 16 before the air 14 exits the air channels 16. In other words, the relatively humid inlet air 14A (e.g., air with a dew point of 55° F. or higher such that the air is appropriate for air conditioning) passes straight through the air channels 16 and exits as relatively dry outlet air 14B, because moisture has been removed as the air 14 traverses along the atmospheric pressure side of the interfaces 20 (i.e., the side of the interfaces 20 in the air channels 16). In an embodiment where a single unit is dehumidifying to a 60° F. saturation pressure or below, the suction side of the interfaces 20 (i.e., the side of the interfaces 20 in the water vapor channels 18) will generally be maintained at a partial pressure of water vapor that is lower than the partial pressure of water vapor on the atmospheric pressure side of the interfaces 20.

As illustrated in FIG. 2A, each of the water vapor channels 18 is connected with a water vapor channel outlet 22 through which the water vapor in the water vapor channels 18 is removed. As illustrated in FIG. 2A, in certain embodiments, the water vapor channel outlets 22 may be connected via a water vapor outlet manifold 24, wherein the water vapor 26A from all of the water vapor channels 18 is combined in a single water vapor vacuum volume 28, such as a tube or a chamber.

Figure 2B:
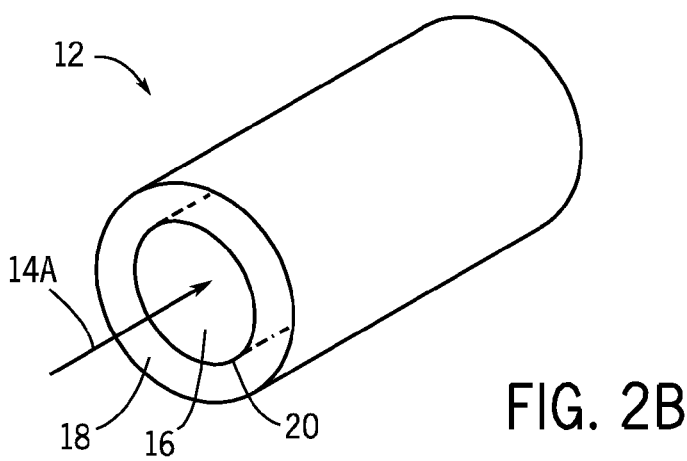
FIG. 2B is a perspective view of the dehumidification unit of FIG. 1 having a single air channel located inside a single water vapor channel in accordance with an embodiment of the present disclosure.

Other configurations of the air channels 16 and the water vapor channels 18 may also be implemented. As another example, FIG. 2B is a perspective view of the dehumidification unit 12 of FIG. 1 having a single air channel 16 located inside a single water vapor channel 18 in accordance with an embodiment of the present disclosure. As illustrated, the air channel 16 may be a cylindrical air channel located within a larger concentric cylindrical water vapor channel 18. The embodiments illustrated in FIGS. 2A and 2B are merely exemplary and are not intended to be limiting.

Figure 3:
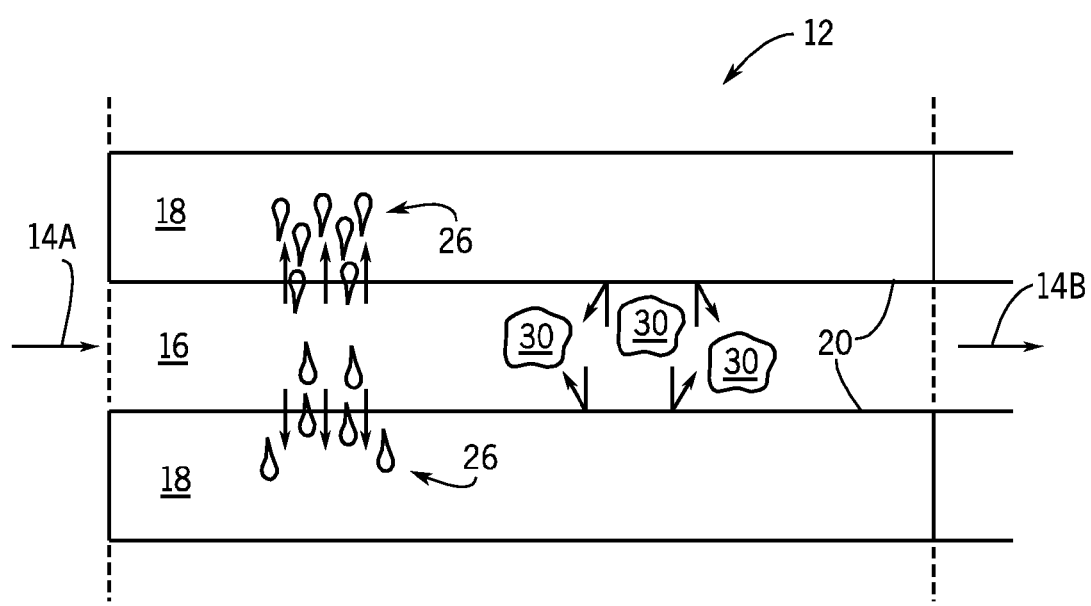
FIG. 3 is a plan view of an air channel and adjacent water vapor channels of the dehumidification unit of FIGS. 1, 2A, and 2B in accordance with an embodiment of the present disclosure.

FIG. 3 is a plan view of an air channel 16 and adjacent water vapor channels 18 of the dehumidification unit 12 of FIGS. 1, 2A, and 2B in accordance with an embodiment of the present disclosure. In FIG. 3, a depiction of the water vapor 26 is exaggerated for illustration purposes. In particular, the water vapor 26 from the air 14 is shown flowing through the interfaces 20 between the air channel 16 and the adjacent water vapor channels 18 as $H_2O$ (i.e., as water molecules, gaseous water vapor, liquid water, adsorbed/desorbed water molecules, absorbed/desorbed water molecules, and so forth, through the interfaces 20). Conversely, other components 30 (e.g., nitrogen, oxygen, carbon dioxide, and so forth) of the air 14 are illustrated as being blocked from flowing through the interfaces 20 between the air channel 16 and the adjacent water vapor channels 18.

In certain embodiments, the interfaces 20 may include membranes that are water vapor permeable and allow the flow of $H_2O$ through permeable volumes of the membranes while blocking the flow of the other components 30. Again, it should be noted that when the $H_2O$ passes through the interfaces 20, it may actually pass as one, all, or any combination of states of water (e.g., as water vapor, liquid water, adsorbed/desorbed water molecules, absorbed/desorbed water molecules, and so forth) through the interfaces 20. For example, in one embodiment, the interfaces 20 may adsorb/desorb water molecules. In another example, the interfaces 20 may adsorb/desorb water molecules and enable passage of water vapor. In other embodiments, the interfaces 20 may facilitate the passage of water in other combinations of states. The interfaces 20 extend along the flow path of the air 14. As such, the water vapor 26 is continuously removed from one side of the interface 20 as the relatively humid inlet air 14A flows through the air channel 16. Therefore, dehumidification of the air 14 flowing through the air channel 16 is accomplished by separating the water vapor 26 from the other components 30 of the air 14 incrementally as it progresses along the flow path of the air channel 16 and continuously contacts the interfaces 20 adjacent to the air channel 16 from the inlet air 14A location to the outlet air 14B location.

In certain embodiments, the water vapor channels 18 are evacuated before use of the dehumidification unit 12, such that a lower partial pressure of the water vapor 26 (i.e., a partial pressure less than the partial pressure of water vapor in the air channels 16) is created in the water vapor channels 18. For example, the partial pressure of the water vapor 26 in the water vapor channels 18 may be in the range of approximately 0.10-0.25 psia during normal operation, which corresponds to dehumidifying to a 60° F. saturation pressure or below. In this example, an initial pressure of approximately 0.01 psia may be used to remove other air components (e.g., noncondensables such as oxygen, nitrogen, and carbon dioxide), whereas the partial pressure of water vapor in the air channels 16 may be in the range of approximately 0.2-1.0 psia. However, at certain times, the pressure differential between the partial pressure of the water vapor in the water vapor channels 18 and the air channels 16 may be as low as (or lower than) approximately 0.01 psia. The lower partial pressure of water vapor in the water vapor channels 18 further facilitates the flow of water vapor 26 from the air channels 16 to the water vapor channels 18, because the air 14 flowing through the air channels 16 is at local atmospheric pressure (i.e., approximately 14.7 psia at sea level). Since the partial pressure of water vapor in the air 14 in the air channels 16 is greater than the partial pressure of the water vapor 26 in the water vapor channels 18, a pressure gradient is created from the air channels 16 to the water vapor channels 18. As described previously, the interfaces 20 between adjacent air channels 16 and water vapor channels 18 provide a barrier, and allow substantially only water vapor 26 to flow from the air 14 in the air channels 16 into the water vapor channels 18. As such, the air 14 flowing through the air channels 16 will generally decrease in humidity from the inlet air 14A to the outlet air 14B.

The use of water vapor permeable membranes as the interfaces 20 between the air channels 16 and the water vapor channels 18 has many advantages. In particular, in some embodiments, no additional energy is used to generate the humidity gradient from the air channels 16 to the water vapor channels 18. In addition, in some embodiments, no regeneration is involved and no environmental emissions (e.g., solids, liquids, or gases) are generated. Indeed, in accordance with one embodiment, separation of the water vapor 26 from the other components 30 of the air 14 via water permeable membranes (i.e., the interfaces 20) can be accomplished at energy efficiencies much greater than compressor technology used to condense water directly from the airstream.

Because water vapor permeable membranes are highly permeable to water vapor, the costs of operating the dehumidification unit 12 may be minimized because the air 14 flowing through the air channels 16 does not have to be significantly pressurized to facilitate the passage of $H_2O$ through the interfaces 20. Water vapor permeable membranes are also highly selective to the permeation of the water vapor from the air 14. In other words, water vapor permeable membranes are very efficient at blocking components 30 of the air 14 other than water vapor from entering the water vapor channels 18. This is advantageous because the $H_2O$ passes through the interfaces 20 due to a pressure gradient (i.e., due to the lower partial pressures of water vapor in the water vapor channels 18) and any permeation or leakage of air 14 into the water vapor channels 18 will increase the power consumption of the vacuum pump used to evacuate the water vapor channels 18. In addition, water vapor permeable membranes are rugged enough to be resistant to air contamination, biological degradation, and mechanical erosion of the air channels 16 and the water vapor channels 18. Water vapor permeable membranes may also be resistant to bacteria attachment and growth in hot, humid air environments in accordance with one embodiment.

Figure 4:
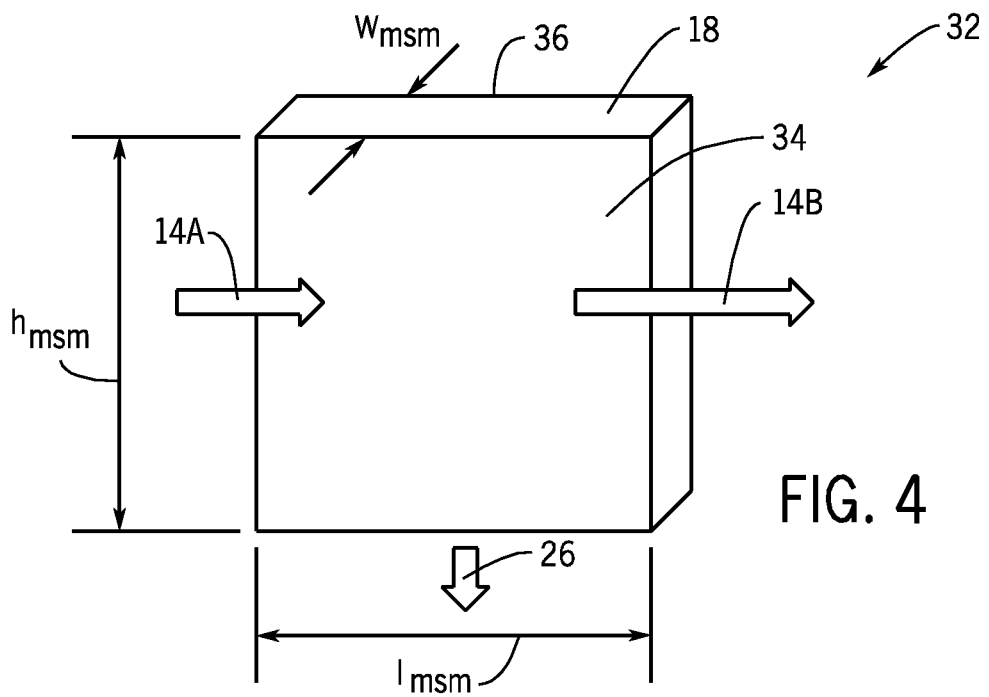
FIG. 4 is a perspective view of a separation module formed using a membrane that may be used as a water vapor channel of the dehumidification unit of FIGS. 1-3 in accordance with an embodiment of the present disclosure.

One example of a material used for the water vapor permeable membranes (i.e., the interfaces 20) is zeolite supported on thin, porous metal sheets. In particular, in certain embodiments, an ultrathin (e.g., less than approximately 2 μm), zeolite membrane film may be deposited on an approximately 50 μm thick porous metal sheet. The resulting membrane sheets may be packaged into a membrane separation module to be used in the dehumidification unit 12. FIG. 4 is a perspective view of a separation module 32 formed using a membrane that may be used as a water vapor channel 18 of the dehumidification unit 12 of FIGS. 1-3 in accordance with an embodiment of the present disclosure. Two membrane sheets 34, 36 may be folded and attached together into a generally rectangular shape with a channel for the water vapor having a width $w_{msm}$ of approximately 5 mm. The separation module 32 may be positioned within the dehumidification unit 12 such that the membrane coating surface is exposed to the air 14. The thinness of the metal support sheet reduces the weight and cost of the raw metal material and also minimizes resistance to the $H_2O$ diffusing through the water vapor permeable membrane film deposited on the membrane sheets 34, 36. The metallic nature of the sheets 34, 36 provides mechanical strength and flexibility for packaging such that the separation module 32 can withstand a pressure gradient of greater than approximately 60 psi (i.e., approximately 4 times atmospheric pressure).

Separation of water vapor from the other components 30 of the air 14 may create a water vapor permeation flux of approximately 1.0 kg/m²/h (e.g., in a range of approximately 0.5-2.0 kg/m²/h), and a water vapor-to-air selectivity range of approximately 5-200+. As such, the efficiency of the dehumidification unit 12 is relatively high compared to other conventional dehumidification techniques with a relatively low cost of production. As an example, approximately 7-10 m² of membrane area of the interfaces 20 may be used to dehumidify 1 ton of air cooling load under ambient conditions. In order to handle such an air cooling load, in certain embodiments, 17-20 separation modules 32 having a height $h_{msm}$ of approximately 450 mm, a length $l_{msm}$ of approximately 450 mm, and a width $w_{msm}$ of approximately 5 mm may be used. These separation modules 32 may be assembled side-by-side in the dehumidification unit 12, leaving approximately 2 mm gaps between the separation modules 32. These gaps define the air channels 16 through which the air 14 flows. The measurements described in this example are merely exemplary and not intended to be limiting.

Figure 5:
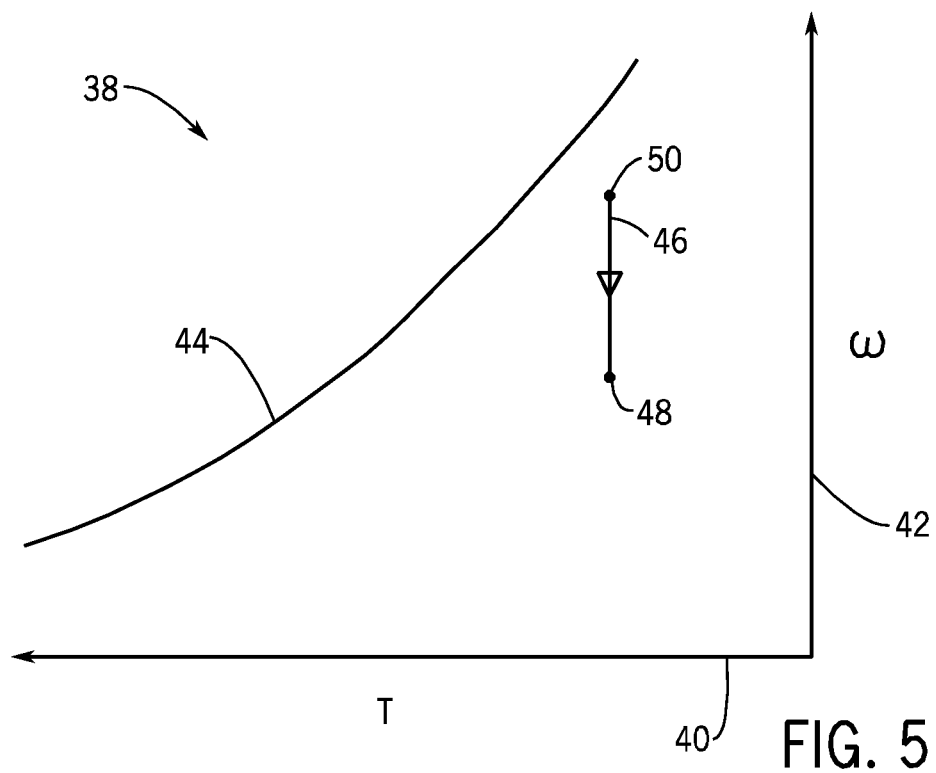
FIG. 5 is a psychrometric chart of the temperature and humidity ratio of the moist air flowing through the dehumidification unit of FIGS. 1-3 in accordance with an embodiment of the present disclosure.

FIG. 5 is a psychrometric chart 38 of the temperature and the humidity ratio of the moist air 14 flowing through the dehumidification unit 12 of FIGS. 1-3 in accordance with an embodiment of the present disclosure. In particular, the x-axis 40 of the psychrometric chart 38 corresponds to the temperature of the air 14 flowing through the air channels 16 of FIG. 1, the y-axis 42 of the psychrometric chart 38 corresponds to the humidity ratio of the air 14 flowing through the air channels 16, and the curve 44 represents the water vapor saturation curve of the air 14 flowing through the air channels 16. As illustrated by line 46, because water vapor is removed from the air 14 flowing through the air channels 16, the humidity ratio of the outlet air 14B (i.e., point 48) from the dehumidification unit 12 of FIGS. 1-3 is lower than the humidity ratio of the inlet air 14A (i.e., point 50) into the dehumidification unit 12 of FIGS. 1-3, while the temperature of the outlet air 14B and the inlet air 14A are substantially the same.

Returning now to FIG. 1, as described previously, a lower partial pressure of the water vapor 26 (i.e., a partial pressure less than the partial pressure of water vapor in the air channels 16) is created in the water vapor channels 18 of the dehumidification unit 12 to further facilitate the passage of $H_2O$ through the interfaces 20 from the air channels 16 to the water vapor channels 18. In certain embodiments, the water vapor channels 18 may initially be evacuated using a vacuum pump 52. In particular, the vacuum pump 52 may evacuate the water vapor channels 18 and the water vapor vacuum volume 28, as well as the water vapor outlets 22 and the water vapor manifold 24 of FIG. 2A. However, in other embodiments, a pump separate from the vacuum pump 52 may be used to evacuate the water vapor channels 18, water vapor vacuum volume 28, water vapor outlets 22, and water vapor manifold 24. As illustrated in FIG. 1, the water vapor 26 removed from the air 14 in the dehumidification unit 12 may be distinguished between the water vapor 26A in the water vapor vacuum volume 28 (i.e., the suction side of the vacuum pump 52) and the water vapor 26B expelled from an exhaust side (i.e., an outlet) of the vacuum pump 52 (i.e., the water vapor 26B delivered to a condensation unit). In general, the water vapor 26B expelled from the vacuum pump 52 will have a slightly higher pressure and a higher temperature than the water vapor 26A in the water vapor vacuum volume 28. The vacuum pump 52 may be a compressor or any other suitable pressure increasing device capable of maintaining a lower pressure on the suction side of the vacuum pump 52 than the partial pressure of water vapor in the humid air 14.

For example, the lower partial pressure of water vapor 26A maintained in the water vapor vacuum volume 28 may be in the range of approximately 0.15-0.25 psia, which corresponds to saturation temperatures of approximately 45° F. to 60° F., with the water vapor 26A in the range of approximately 65-75° F. However, in other embodiments, the water vapor 26A in the water vapor vacuum volume 28 may be maintained at a partial pressure of water vapor in the range of approximately 0.01-0.25 psia and a temperature in the range of approximately 55° F. up to the highest ambient air temperature. A specific embodiment may be designed to lower the partial pressure in the water vapor vacuum volume 28 to the range of 0.01 psia to increase the capacity for removing water vapor from the air 14 to enable an evaporative cooler to process the entire air conditioning load when atmospheric conditions permit this mode of operation.

In certain embodiments, the vacuum pump 52 is a low-pressure pump configured to decrease the pressure of the water vapor 26A in the water vapor vacuum volume 28 to a lower partial pressure than the partial pressure of water vapor on the atmospheric side of the interfaces 20 (i.e., the partial pressure of the air 14 in the air channels 16). On the exhaust side of the vacuum pump 52, the partial pressure of the water vapor 26B has been increased just high enough to facilitate condensation of the water vapor (i.e., in a condensation unit 54). Indeed, the vacuum pump 52 is configured to increase the pressure such that the water vapor 26B in the condensation unit 54 is at a pressure proximate to a minimal saturation pressure in the condensation unit 54. Alternatively, the condensation unit 54 and subsequent components may be replaced by a membrane water vapor rejection unit.

As an example operation of the HVAC system 10, the air 14 may enter the system at a partial pressure of water vapor of 0.32 psia, which corresponds to a humidity ratio of approximately 0.014 pounds of $H_2O$ per pounds of dry air. The system may be set to remove approximately 0.005 pounds of $H_2O$ per pounds of dry air from the air 14. Pressure differentials across the interfaces 20 may be used to create a flow of $H_2O$ through the interfaces 20. For example, the partial pressure of water vapor in the water vapor vacuum volume 28 may be set to approximately 0.1 psia. The pressure of the water vapor 26B is increased by the vacuum pump 52 in a primarily adiabatic process, and as the pressure of the water vapor 26B increases, the temperature increases as well (in contrast to the relatively negligible temperature differential across the interfaces 20). As such, if for example the pressure of the water vapor 26B is increased in the vacuum pump 52 by approximately 0.3 psi (i.e., to approximately 0.4 psia), the condensation unit 54 is then capable of condensing the water vapor 26B at a temperature of approximately 72-73° F., and the temperature of the water vapor 26B increases to a temperature substantially higher than the condenser temperature. The system may continually monitor the pressure and temperature conditions of both the upstream water vapor 26A and the downstream water vapor 26B to ensure that the water vapor 26B expelled from the vacuum pump 52 has a partial pressure of water vapor just high enough to facilitate condensation in the condensation unit 54. It should be noted that the pressure and temperature values presented in this scenario are merely exemplary and are not intended to be limiting.

As the pressure difference from the water vapor 26A entering the vacuum pump 52 to the water vapor 26B exiting the vacuum pump 52 increases, the efficiency of the dehumidification unit 12 decreases. For example, in one embodiment, the vacuum pump 52 may be set to adjust the pressure of the water vapor 26B in the condensation unit 54 slightly above the saturation pressure at the lowest ambient temperature of the cooling media (i.e., air or water) used by the condensation unit 54 to condense the water vapor 26B. In another embodiment, the temperature of the water vapor 26B may be used to control the pressure in the condensation unit 54. The temperature of the water vapor 26B expelled from the vacuum pump 52 may be substantially warmer than the humid air 14A (e.g., this temperature could reach approximately 200° F. or above depending on a variety of factors). Because the vacuum pump 52 may only increases the pressure of the water vapor 26B to a point where condensation of the water vapor 26B is facilitated (i.e., approximately the saturation pressure), the power requirements of the vacuum pump 52 are relatively small, thereby obtaining a high efficiency from the dehumidification unit 12.

Once the water vapor 26B has been slightly pressurized (i.e., compressed) by the vacuum pump 52, the water vapor 26B is directed into the condensation unit 54, wherein the water vapor 26B is condensed into a liquid state. In certain embodiments, the condensation unit 54 may include a condensation coil 56, a pipe/tube condenser, a flat plate condenser, or any other suitable system for achieving a temperature below the condensation point of the water vapor 26B. The condensation unit 54 may either be air cooled or water cooled. For example, in certain embodiments, the condensation unit 54 may be cooled by ambient air or water from a cooling tower. As such, the costs of operating the condensation unit 54 may be relatively low, inasmuch as both ambient air and cooling tower water are in relatively limitless supply.

Once the water vapor 26B has been condensed into a liquid state, in certain embodiments, the liquid water from the condensation unit 54 may be directed into a reservoir 58 for temporary storage of saturated vapor and liquid water. However, in other embodiments, no reservoir 58 may be used. In either case, the liquid water from the condensation unit 54 may be directed into a liquid pump 60 (i.e., a water transport device), within which the pressure of the liquid water from the condensation unit 54 is increased to approximately atmospheric pressure (i.e., approximately 14.7 psia) so that the liquid water may be rejected at ambient conditions. As such, the liquid pump 60 may be sized just large enough to increase the pressure of the liquid water from the condensation unit 54 to approximately atmospheric pressure. Therefore, the costs of operating the liquid pump 60 may be relatively low. In addition, the liquid water from the liquid pump 60 may be at a slightly elevated temperature due to the increase in the pressure of the liquid water. As such, in certain embodiments, the heated liquid water may be transported for use as domestic hot water for use in the home, further increasing the efficiency of the system by recapturing the heat transferred into the liquid water.

Although the interfaces 20 between the air channels 16 and the water vapor channels 18 as described previously generally allow only $H_2O$ to pass from the air channels 16 to the water vapor channels 18, in certain embodiments, very minimal amounts (e.g., less than 1% of the oxygen ($O_2$), nitrogen ($N_2$), or other noncondensable components) of the other components 30 of the air 14 may be allowed to pass through the interfaces 20 from the air channels 16 to the water vapor channels 18. Over time, the amount of the other components 30 may build up in the water vapor channels 18 (as well as in the water vapor vacuum volume 28, the water vapor outlets 22, and the water vapor manifold 24 of FIG. 2A). In general, these other components 30 are noncondensable at the condenser temperature ranges used in the condensation unit 54. As such, the components 30 may adversely affect the performance of the vacuum pump 52 and all other equipment downstream of the vacuum pump 52 (in particular, the condensation unit 54).

Figure 6:
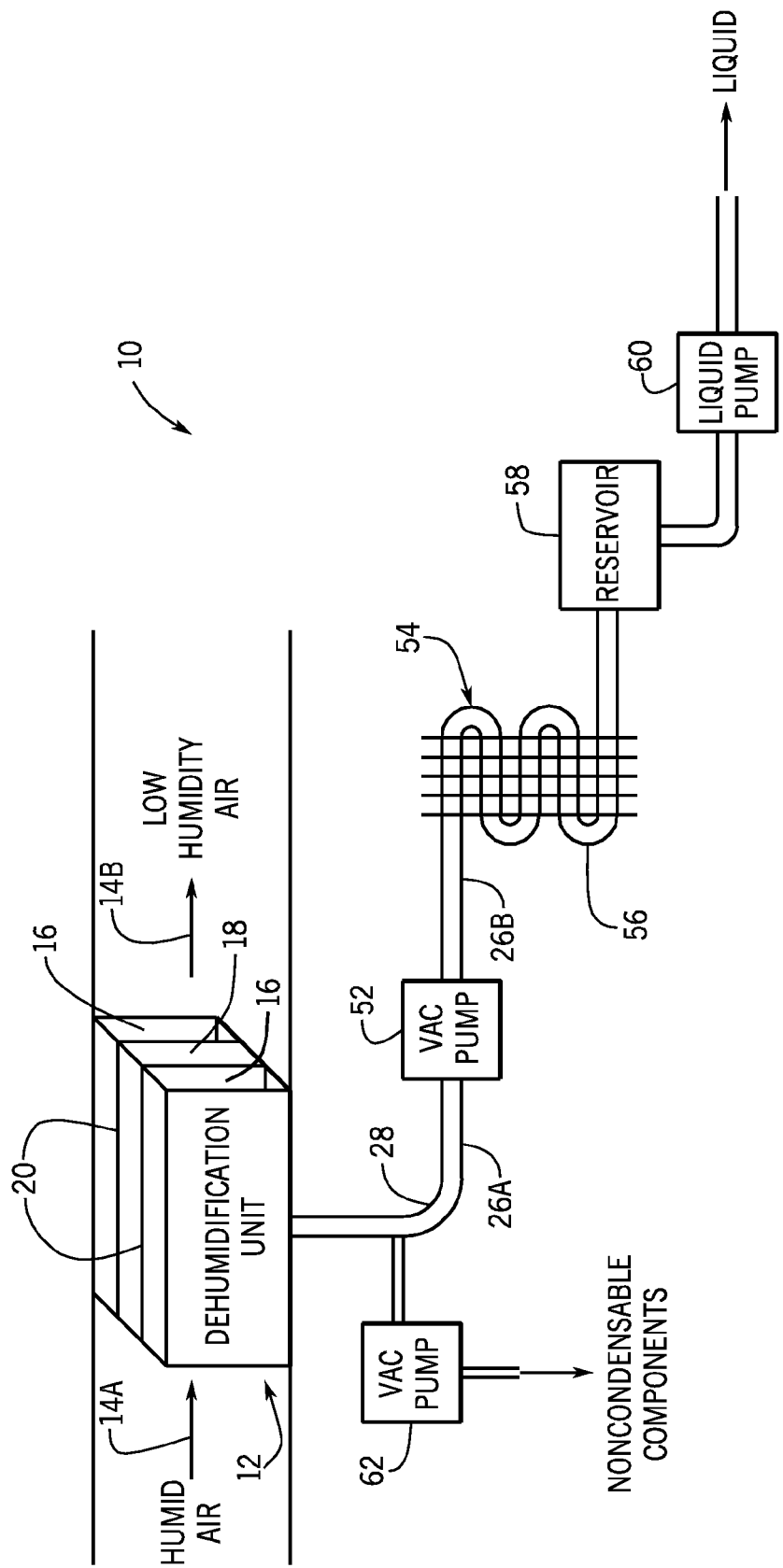
FIG. 6 is a schematic diagram of the HVAC system and the dehumidification unit of FIG. 1 having a vacuum pump for removing noncondensable components from the water vapor in the water vapor extraction chamber of the dehumidification unit in accordance with an embodiment of the present disclosure.

Accordingly, in certain embodiments, a second vacuum pump, such as a pump 62 shown in FIG. 6, may be used to periodically purge the other components 30 from the water vapor vacuum volume 28. FIG. 6 is a schematic diagram of the HVAC system 10 and the dehumidification unit 12 of FIG. 1 having the vacuum pump 62 for removing noncondensable components 30 from the water vapor 26A in the water vapor vacuum volume 28 of the dehumidification unit 12 in accordance with an embodiment of the present disclosure. The vacuum pump 62 may, in certain embodiments, be the same pump used to evacuate the water vapor vacuum volume 28 (as well as the water vapor channels 18, the water vapor outlets 22, and the water vapor manifold 24) to create the lower partial pressure of water vapor described previously that facilitates the passage of the $H_2O$ through the interfaces 20 from the air channels 16 to the water vapor channels 18. However, in other embodiments, the vacuum pump 62 may be different from the pump used to evacuate the water vapor vacuum volume 28 to create the lower partial pressure of water vapor.

Figure 7:
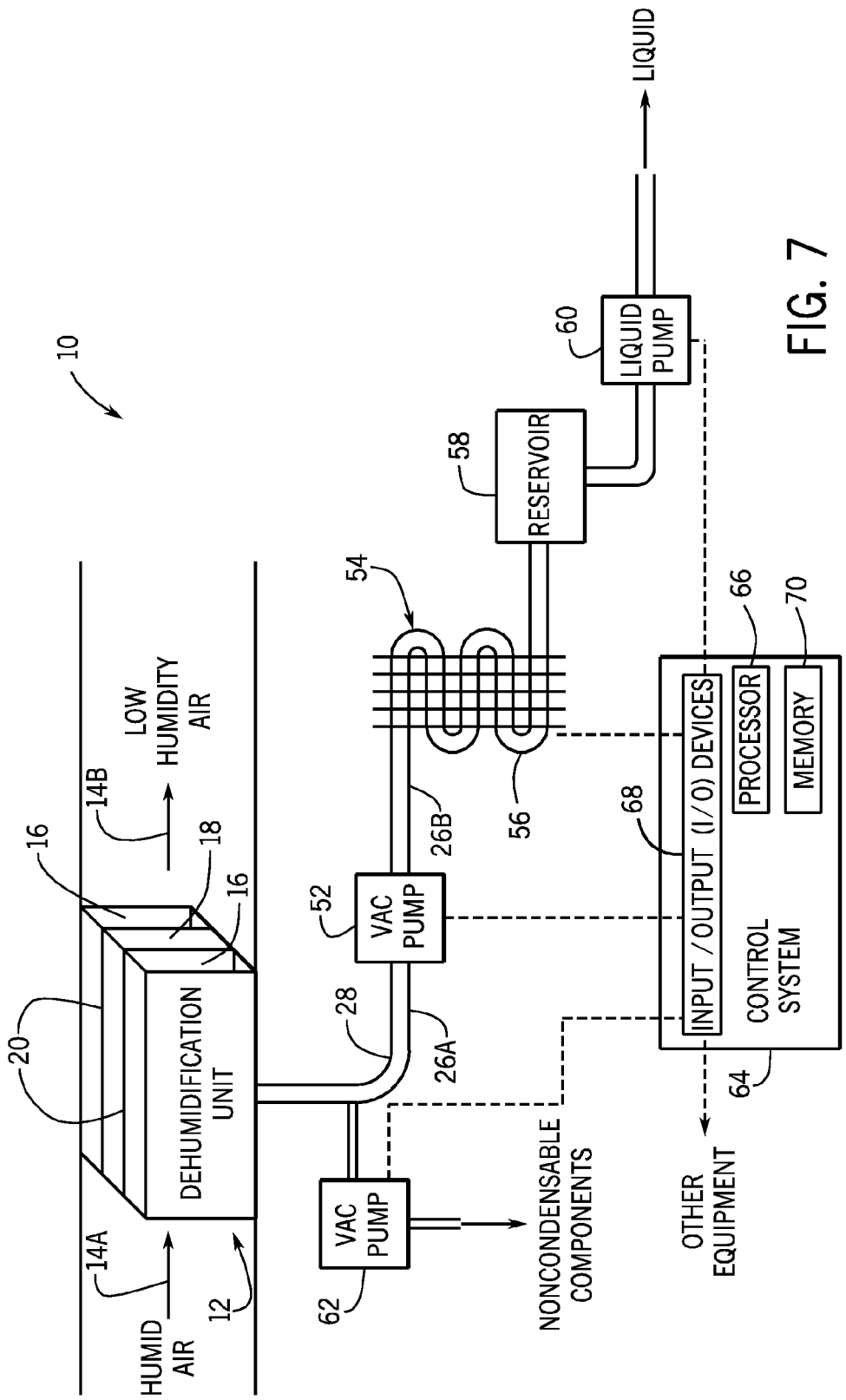
FIG. 7 is a schematic diagram of the HVAC system and the dehumidification unit of FIG. 6 having a control system for controlling various operating conditions of the HVAC system and the dehumidification unit in accordance with an embodiment of the present disclosure.

The dehumidification unit 12 described herein may also be controlled between various operating states, and modulated based on operating conditions of the dehumidification unit 12. For example, FIG. 7 is a schematic diagram of the HVAC system 10 and the dehumidification unit 12 of FIG. 6 having a control system 64 for controlling various operating conditions of the HVAC system 10 and the dehumidification unit 12 in accordance with an embodiment of the present disclosure. The control system 64 may include one or more processors 66, for example, one or more "general-purpose" microprocessors, one or more special-purpose microprocessors and/or ASICS (application-specific integrated circuits), or some combination of such processing components. The processors 66 may use input/output (I/O) devices 68 to, for example, receive signals from and issue control signals to the components of the dehumidification unit 12 (i.e., the vacuum pumps 52, 62, the condensation unit 54, the reservoir 58, the liquid pump 60, other equipment such as a fan blowing the inlet air 14A through the dehumidification unit 12, sensors configured to generate signals related to characteristics of the inlet and outlet air 14A, 14B, and so forth). The processors 66 may take these signals as inputs and calculate how to control the functionality of these components of the dehumidification unit 12 to most efficiently remove the water vapor 26 from the air 14 flowing through the dehumidification unit 12. The control system 64 may also include a nontransitory computer-readable medium (i.e., a memory 70) which, for example, may store instructions or data to be processed by the one or more processors 66 of the control system 64.

For example, the control system 64 may be configured to control the rate of removal of the noncondensable components 30 of the water vapor 26A from the water vapor vacuum volume 28 of the dehumidification unit 12 by turning the vacuum pump 62 on or off, or by modulating the rate at which the vacuum pump 62 removes the noncondensable components 30 of the water vapor 26A. More specifically, in certain embodiments, the control system 64 may receive signals from a sensor in the water vapor vacuum volume 28 that detects when too many noncondensable components 30 are present in the water vapor 26A contained in the water vapor vacuum volume 28. This process of noncondensable component removal may operate in a cyclical manner. In "normal" operation of removing the water vapor 26 from the air 14, the vacuum pump 62 may not be in operation. As the noncondensable components 30 build up in the water vapor vacuum volume 28, the internal pressure in the water vapor vacuum volume 28 eventually reaches a setpoint. At this point in time, the vacuum pump 62 turns on and removes all components (i.e., both the noncondensable components 30 as well as $H_2O$, including the water vapor) until the internal pressure in the water vapor vacuum volume 28 reaches another setpoint (e.g., lower than the starting vacuum pressure). Then, the vacuum pump 62 shuts off and the dehumidification unit 12 returns to the normal operational mode. Setpoints may either be preset or dynamically determined. One method will be to have the vacuum pump 62 only operating in the purge mode intermittently.

Another example of the type of control that may be accomplished by the control system 64 is modulating the lower partial pressure of the water vapor 26A in the water vapor vacuum volume 28 (as well as the water vapor channels 18, the water vapor outlets 22, and the water vapor manifold 24) to modify the water vapor removal capacity and efficiency ratio of the dehumidification unit 12. For example, the control system 64 may receive signals from pressure sensors in the water vapor vacuum volume 28, the water vapor channels 18, the water vapor outlets 22, and/or the water vapor manifold 24, as well as signals generated by sensors relating to characteristics (e.g., temperature, pressure, flow rate, relative humidity, and so forth) of the inlet and outlet air 14A, 14B, among other things. The control system 64 may use this information to determine how to modulate the lower partial pressure of the water vapor 26A (e.g., with respect to the partial pressure of water vapor in the air 14 flowing through the air channels 16) to increase or decrease the rate of removal of water vapor 26 from the air channels 16 to the water vapor channels 18 through the interfaces 20.

For example, if more water vapor removal is desired, the lower partial pressure of the water vapor 26A in the water vapor vacuum volume 28 may be reduced and, conversely, if less water vapor removal is desired, the lower partial pressure of the water vapor 26A in the water vapor vacuum volume 28 may be increased. Furthermore, in certain embodiments, the amount of dehumidification (i.e., water vapor removal) may be cycled to improve the efficiency of the dehumidification unit 12. More specifically, under certain operating conditions, the dehumidification unit 12 may function more efficiently at higher rates of water vapor removal. As such, in certain embodiments, the dehumidification unit 12 may be cycled to remove a maximum amount of water vapor from the air 14 for a period of time (e.g., approximately 1 sec, 10 sec, 100 sec, 10 min), then to remove relatively no water vapor from the air 14 for a period of time (e.g., approximately 1 sec, 10 sec, 100 sec, 10 min), then to remove a maximum amount of water vapor from the air 14 for a period of time (e.g., approximately 1 sec, 10 sec, 100 sec, 10 min), and so forth. In other words, the dehumidification unit 12 may be operated at full water vapor removal capacity for periods of time alternating with other periods of time where no water vapor is removed. In addition, the control system 64 may be configured to control start-up and shutdown sequencing of the dehumidification unit 12.

The dehumidification unit 12 may be designed and operated in many various modes, and at varying operating conditions. In general, the dehumidification unit 12 operates with the water vapor vacuum volume 28 (as well as the water vapor channels 18, the water vapor outlets 22, and the water vapor manifold 24) at a water vapor partial pressure below the water vapor partial pressure of the air 14 flowing through the air channels 16. In certain embodiments, the dehumidification unit 12 may be optimized for dedicated outside air system (DOAS) use, wherein the air 14 may have a temperature in the range of approximately 55-100° F., and a relative humidity in the range of approximately 55-100%. In other embodiments, the dehumidification unit 12 may be optimized for residential use for recirculated air having a temperature in the range of approximately 70-85° F., and a relative humidity in the range of approximately 55-65%. Similarly, in certain embodiments, the dehumidification unit 12 may be optimized for dehumidifying outside air in commercial building recirculated air systems, which dehumidifies the inlet air 14A having a temperature in the range of approximately 55-110° F., and a relative humidity in the range of approximately 55-100%. The outlet air 14B has less humidity and about the same temperature as the inlet air 14A, unless cooling is performed on the outlet air 14B.

The dehumidification unit 12 described herein uses less operating power than conventional dehumidification systems because of the relatively low pressures that are used to dehumidify the air 14A. This is due at least in part to the ability of the interfaces 20 (i.e., water vapor permeable membranes) to remove the water vapor 26 from the air 14 efficiently without requiring excessive pressures to force the water vapor 26 through the interfaces 20. For example, in one embodiment, the minimal power used to operate the dehumidification unit 12 includes only the fan power used to move the air 14 through the dehumidification unit 12, the compressive power of the vacuum pump 52 to compress the water vapor 26 to approximately the saturation pressure (for example, to approximately 1.0 psia, or to a saturation pressure that corresponds to a given condensation temperature, for example, approximately 100° F.), the pumping and/or fan power of the condensation unit 54 (e.g., depending on whether cooling tower water or ambient air is used as the cooling medium), the pumping power of the liquid pump 60 to reject the liquid water from the condensation unit 54 at ambient conditions, and the power of the vacuum pump 62 to purge noncondensable components 30 that leak into the water vapor vacuum volume 28 of the dehumidification unit 12. As such, the only relatively major power component used to operate the dehumidification unit 12 is the compressive power of the vacuum pump 52 to compress the water vapor 26 to approximately the saturation pressure (for example, only to approximately 1.0 psia, or to a saturation pressure that corresponds to a given condensation temperature, for example, approximately 100° F.). As mentioned previously, this power is relatively low and, therefore, operating the dehumidification unit 12 is relatively inexpensive as opposed to conventional refrigeration compression dehumidification systems. Moreover, calculations for an embodiment indicate that the dehumidification unit 12 has a coefficient of performance (COP) at least twice as high (or even up to five times as high, depending on operating conditions) as these conventional dehumidification systems. In addition, the dehumidification unit 12 enables the dehumidification of air without reducing the temperature of the air below the temperature at which the air is needed, as is often done in conventional dehumidification systems.

Figure 8:
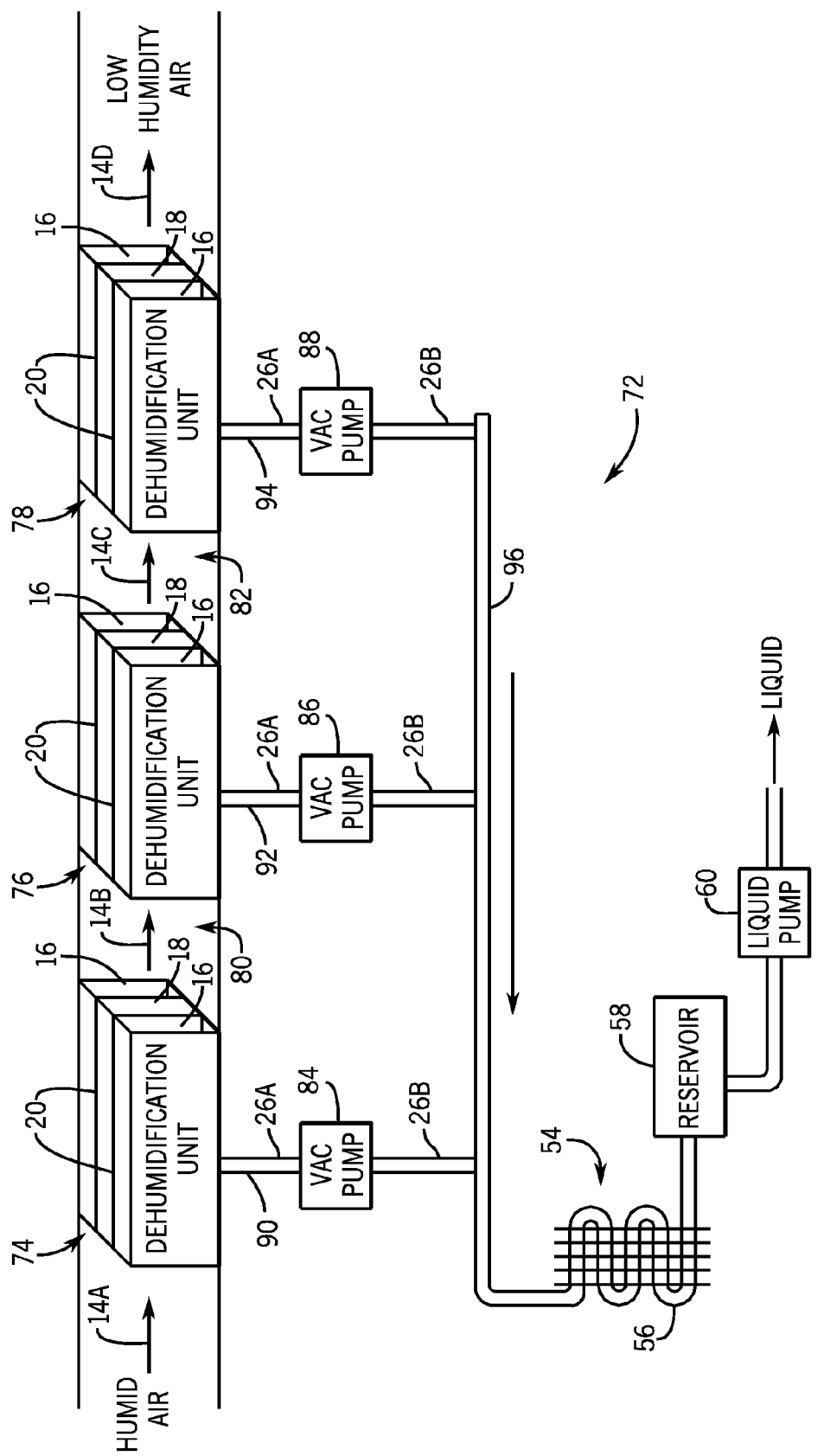
FIG. 8 is a schematic diagram of an HVAC system having a plurality of dehumidification units arranged in series in accordance with an embodiment of the present disclosure.

In certain embodiments, multiple instances of the dehumidification unit 12 described previously with respect to FIGS. 1 through 7 may be used in a single HVAC system. For example, FIG. 8 is a schematic diagram of an HVAC system 72 having a plurality of dehumidification units 12 (i.e., a first dehumidification unit 74, a second dehumidification unit 76, and a third dehumidification unit 78) arranged in series in accordance with an embodiment of the present disclosure. Although illustrated as having three dehumidification units 74, 76, 78 in series, any number of dehumidification units 12 may indeed be used in series in the HVAC system 72. For example, in other embodiments, 2, 4, 5, 6, 7, 8, 9, 10, or even more dehumidification units 12 may be used in series in the HVAC system 72.

The HVAC system 72 of FIG. 8 generally functions the same as the HVAC system 10 of FIGS. 1, 6, and 7. More specifically, as illustrated in FIG. 8, the HVAC system 72 receives the inlet air 14A having a relatively high humidity. However, the relatively dry air 14B from the first dehumidification unit 74 is not expelled into the atmosphere. Rather, as illustrated in FIG. 8, the air 14B expelled from the first dehumidification unit 74 is directed into the second dehumidification unit 76 via a first duct 80. Similarly, air 14C expelled from the second dehumidification unit 76 is directed into the third dehumidification unit 78 via a second duct 82. Outlet air 14D from the third dehumidification unit 78 is then expelled into the conditioned space. Because the dehumidification units 74, 76, 78 of the HVAC system 72 are arranged in series, each successive airstream will be relatively dryer than the upstream airstreams. For example, outlet air 14D is dryer than air 14C, which is dryer than air 14B, which is dryer than inlet air 14A.

As illustrated, many of the components of the HVAC system 72 of FIG. 8 may be considered identical to the components of the HVAC system 10 of FIGS. 1, 6, and 7. For example, as described previously, the dehumidification units 74, 76, 78 of the HVAC system 72 of FIG. 8 may be considered identical to the dehumidification units 12 of FIGS. 1, 6, and 7. In addition, the HVAC system 72 of FIG. 8 also includes the condensation unit 54 that receives water vapor 26B having a partial pressure just high enough to facilitate condensation, as described previously. In certain embodiments, the HVAC system 72 of FIG. 8 may also include the reservoir 58 for temporary storage of saturated vapor and liquid water. However, as described previously, in other embodiments, no reservoir may be used. In either case, the liquid water from the condensation unit 54 may be directed into the liquid pump 60, within which the pressure of the liquid water from the condensation unit 54 is increased to approximately atmospheric pressure (i.e., approximately 14.7 psia) so that the liquid water may be rejected at ambient conditions.

As illustrated in FIG. 8, in certain embodiments, each dehumidification unit 74, 76, 78 may be associated with a respective vacuum pump 84, 86, 88, each of which is similar in functionality to the vacuum pump 52 of FIGS. 1, 6, and 7. However, because water vapor is removed from each successive dehumidification unit 74, 76, 78, the partial pressure of water vapor in the air 14 may be gradually reduced at each successive dehumidification unit 74, 76, 78. For example, as described previously, the partial pressure of water vapor in the inlet air 14A may be in the range of approximately 0.2-1.0 psia; the partial pressure of water vapor in the air 14B from the first dehumidification unit 74 may be in the range of approximately 0.17-0.75 psia (accomplishing approximately ⅓ of the drop); the partial pressure of water vapor in the air 14C from the second dehumidification unit 76 may be in the range of approximately 0.14-0.54 psia (accomplishing approximately the next ⅓ of the drop); and the partial pressure of water vapor in the outlet air 14D from the third dehumidification unit 78 may be in the range of approximately 0.10-0.25 psia, which is consistent with a 60° F. saturation temperature or lower. The very low values may be used to increase capacity for occasional use.

As such, in certain embodiments, the partial pressure of water vapor in the water vapor vacuum volumes 90, 92, 94 (e.g., that are similar in functionality to the water vapor vacuum volume 28 described previously) associated with each respective vacuum pump 84, 86, 88 may be modulated to ensure an optimal flow of water vapor 26 from each respective dehumidification unit 74, 76, 78. For example, the partial pressure of the water vapor 26A in the water vapor vacuum volume 28 described previously may be maintained in a range of approximately 0.15-0.25 psia. However, in the HVAC system 72 of FIG. 8, the partial pressure of the water vapor 26A in the first water vapor vacuum volume 90 may be maintained in a range of approximately 0.15-0.7 psia, the partial pressure of the water vapor 26A in the second water vapor vacuum volume 92 may be maintained in a range of approximately 0.12-0.49 psia, and the partial pressure of the water vapor 26A in the third water vapor vacuum volume 94 may be maintained in a range of approximately 0.09-0.24 psia. Regardless, it may be expected that less water vapor 26 is removed in each successive dehumidification unit 74, 76, 78, and is generally be optimized to minimize energy used to operate the system.

In certain embodiments, each of the vacuum pumps 84, 86, 88 may compress the water vapor 26 and direct it into a common manifold 96 having a substantially constant partial pressure of water vapor (i.e., just high enough to facilitate condensation in the condensation unit 54) such that the water vapor 26 flows in a direction opposite to the flow of the air 14. In other embodiments, the water vapor 26 extracted from each successive dehumidification unit 74, 76, 78 may be compressed by its respective vacuum pump 84, 86, 88 and then combined with the water vapor 26 extracted from the next upstream dehumidification unit 74, 76, 78. For example, in other embodiments, the water vapor 26 from the third dehumidification unit 78 may be compressed by the third vacuum pump 88 and then combined with the water vapor 26 from the second dehumidification unit 76 in the second water vapor vacuum volume 92. Similarly, the water vapor 26 compressed by the second vacuum pump 86 may be combined with the water vapor 26 from the first dehumidification unit 74 in the first water vapor vacuum volume 90. In this embodiment, the exhaust side of each successive vacuum pump 84, 86, 88 increases the partial pressure of the water vapor 26 only to the operating pressure of the next upstream vacuum pump 84, 86, 88. For example, the third vacuum pump 88 may only increase the pressure of the water vapor 26 to approximately 0.2 psia if the partial pressure of water vapor in the second water vapor vacuum volume 92 is approximately 0.2 psia. Similarly, the second vacuum pump 86 may only increase the pressure of the water vapor 26 to approximately 0.35 psia if the partial pressure of water vapor in the first water vapor vacuum volume 90 is approximately 0.35 psia. In this embodiment, the water vapor 26 compressed by the first vacuum pump 84 is directed into the condensation unit 54 at a partial pressure of water vapor just high enough to facilitate condensation.

It should be noted that the specific embodiment illustrated in FIG. 8 having a plurality of dehumidification units 74, 76, 78 arranged in series may be configured in various ways not illustrated in FIG. 8. For example, although illustrated as using a respective vacuum pump 84, 86, 88 with each dehumidification unit 74, 76, 78, in certain embodiments, a single vacuum pump 52 may be used with multiple inlet ports connected to the first, second, and third water vapor vacuum volumes 90, 92, 94. In addition, although illustrated as using a single condensation unit 54, reservoir 58, and liquid pump 60 to condense the water vapor 26B into a liquid state, and store and/or transport the liquid water from the HVAC system 72, in other embodiments, each set of dehumidification units 74, 76, 78 and vacuum pumps 84, 86, 88 may be operated independently and be associated with their own respective condensation units 54, reservoirs 58, and liquid pumps 60.

In addition, the control system 64 of FIG. 7 may also be used in the HVAC system 72 of FIG. 8 to control the operation of the HVAC system 72 in a similar manner as described previously with respect to FIG. 7. For example, as described previously, the control system 64 may be configured to control the rate of removal of the noncondensable components 30 of the water vapor 26 in the water vapor vacuum volumes 90, 92, 94 by turning the vacuum pumps 84, 86, 88 (or separate vacuum pumps 62, as described previously with respect to FIGS. 6 and 7) on or off, or by modulating the rate at which the vacuum pumps 84, 86, 88 (or separate vacuum pumps 62, as described previously with respect to FIGS. 6 and 7) remove the noncondensable components 30. More specifically, in certain embodiments, the control system 64 may receive signals from sensors in the water vapor vacuum volumes 90, 92, 94 that detect when too many noncondensable components 30 are present in the water vapor 26A contained in the water vapor vacuum volumes 90, 92, 94.

In addition, the control system 64 may modulate the lower partial pressure of the water vapor 26A in the water vapor vacuum volumes 90, 92, 94 to modify the water vapor removal capacity and efficiency ratio of the dehumidification units 74, 76, 78. For example, the control system 64 may receive signals from pressure sensors in the water vapor vacuum volumes 90, 92, 94, the water vapor channels 18, as well as signals generated by sensors relating to characteristics (e.g., temperature, pressure, flow rate, relative humidity, and so forth) of the air 14, among other things. The control system 64 may use this information to determine how to modulate the lower partial pressure of the water vapor 26A in the water vapor vacuum volumes 90, 92, 94 to increase or decrease the rate of removal of water vapor 26 from the air channels 16 to the water vapor channels 18 through the interfaces 20 of the dehumidification units 74, 76, 78 as $H_2O$ (i.e., as water molecules, gaseous water vapor, liquid water, adsorbed/desorbed water molecules, absorbed/desorbed water molecules, and so forth, through the interfaces 20).

For example, if more water vapor removal is desired, the lower partial pressure of the water vapor 26A in the water vapor vacuum volumes 90, 92, 94 may be reduced and, conversely, if less water vapor removal is desired, the lower partial pressure of the water vapor 26A in the water vapor vacuum volumes 90, 92, 94 may be increased. Furthermore, as described above, the amount of dehumidification (i.e., water vapor removal) may be cycled to improve the efficiency of the dehumidification units 74, 76, 78. More specifically, under certain operating conditions, the dehumidification units 74, 76, 78 may function more efficiently at higher rates of water vapor removal. As such, in certain embodiments, the dehumidification units 74, 76, 78 may be cycled to remove a maximum amount of water vapor from the air 14 for a period of time (e.g., approximately 1 sec, 10 sec, 100 sec, 10 min), then to remove relatively no water vapor from the air 14 for a period of time (e.g., approximately 1 sec, 10 sec, 100 sec, 10 min), then to remove a maximum amount of water vapor from the air 14 for a period of time (e.g., approximately 1 sec, 10 sec, 100 sec, 10 min), and so forth. In other words, the dehumidification units 74, 76, 78 may be operated at full water vapor removal capacity for periods of time alternating with other periods of time where no water vapor is removed. In addition, the control system 64 may be configured to control start-up and shutdown sequencing of the dehumidification units 74, 76, 78.

Figure 9:
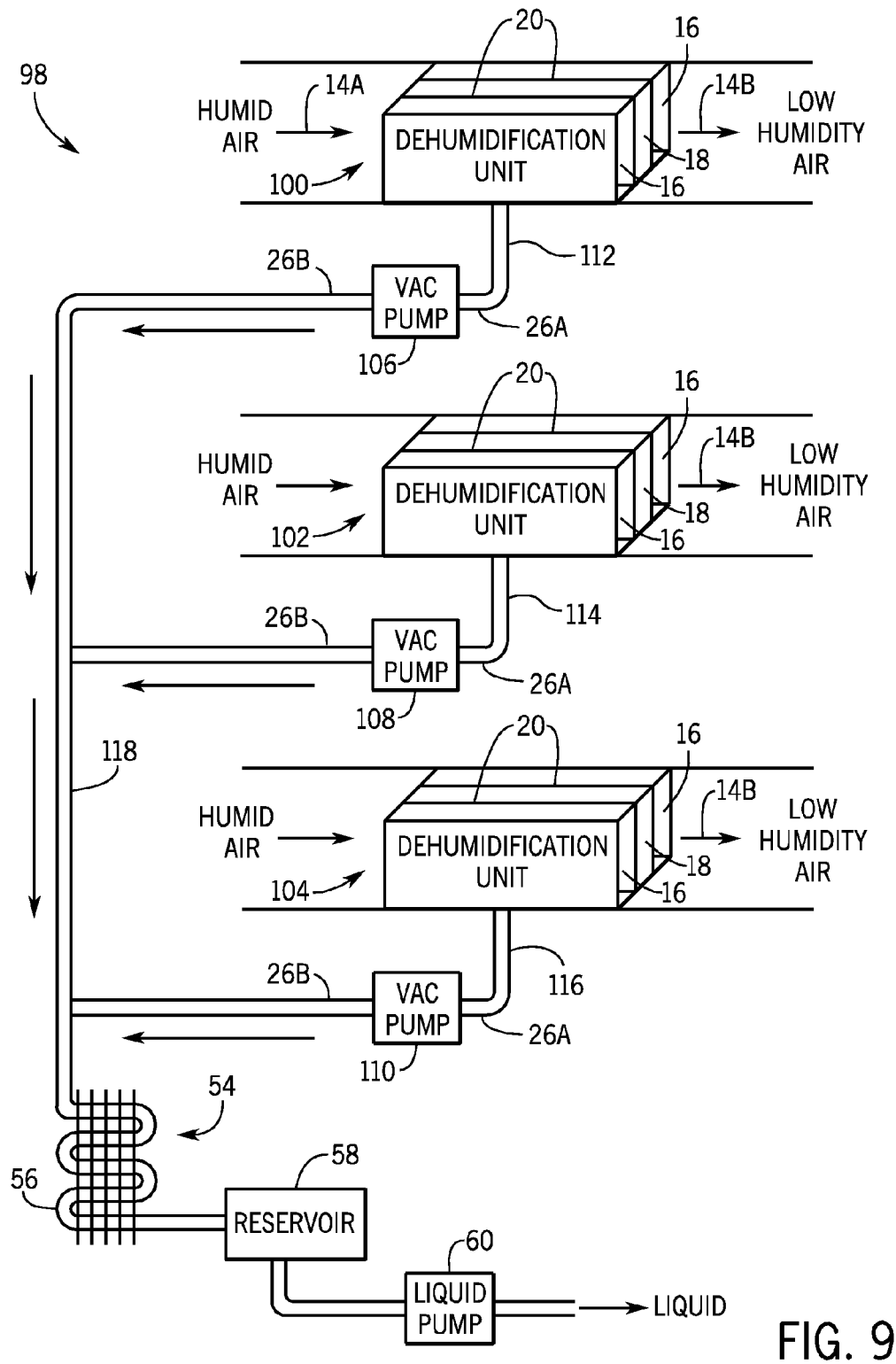
FIG. 9 is a schematic diagram of an HVAC system having a plurality of dehumidification units arranged in parallel in accordance with an embodiment of the present disclosure.

While FIG. 8 includes a serial arrangement of multiple dehumidification units 12, present embodiments include other ways in which multiple dehumidification units 12 may be arranged in a single HVAC system. For example, FIG. 9 is a schematic diagram of an HVAC system 98 having a plurality of dehumidification units 12 (i.e., a first dehumidification unit 100, a second dehumidification unit 102, and a third dehumidification unit 104) arranged in parallel in accordance with an embodiment of the present disclosure. Although illustrated as having three dehumidification units 100, 102, 104 in parallel, any number of dehumidification units 12 may indeed be used in parallel in the HVAC system 98. For example, in other embodiments, 2, 4, 5, 6, 7, 8, 9, 10, or even more dehumidification units 12 may be used in parallel in the HVAC system 98.

The HVAC system 98 of FIG. 9 generally functions the same as the HVAC system 10 of FIGS. 1, 6, and 7 and the HVAC system 72 of FIG. 8. More specifically, as illustrated in FIG. 9, each dehumidification unit 100, 102, 104 of the HVAC system 98 receives the inlet air 14A having a relatively high humidity and expels the outlet air 14B having a relatively low humidity. As illustrated, many of the components of the HVAC system 98 of FIG. 9 may be considered identical to the components of the HVAC system 10 of FIGS. 1, 6, and 7 and the HVAC system 72 of FIG. 8. For example, the dehumidification units 100, 102, 104 of the HVAC system 98 of FIG. 9 may be considered identical to the dehumidification units 12 of FIGS. 1, 6, and 7 and the dehumidification units 74, 76, 78 of FIG. 8. In addition, the HVAC system 98 of FIG. 9 also includes the condensation unit 54 that receives water vapor 26B having a partial pressure just high enough to facilitate condensation, as described previously. In certain embodiments, the HVAC system 98 of FIG. 9 may also include the reservoir 58 for temporary storage of saturated vapor and liquid water. However, as described previously, in other embodiments, no reservoir may be used. In either case, the liquid water from the condensation unit 54 may be directed into the liquid pump 60, within which the pressure of the liquid water from the condensation unit 54 is increased to approximately atmospheric pressure (i.e., approximately 14.7 psia) so that the liquid water may be rejected at ambient conditions.

As illustrated in FIG. 9, in certain embodiments, each dehumidification unit 100, 102, 104 may be associated with a respective vacuum pump 106, 108, 110, each of which is similar in functionality to the vacuum pump 52 of FIGS. 1, 6, and 7 and the vacuum pumps 84, 86, 88 of FIG. 8. However, as opposed to the HVAC system 72 of FIG. 8, because the dehumidification units 100, 102, 104 and associated vacuum pumps 106, 108, 110 are arranged in parallel, the partial pressure of water vapor in the air 14 will be approximately the same in each dehumidification unit 100, 102, 104. As such, in general, the partial pressure of water vapor in the water vapor vacuum volumes 112, 114, 116 associated with each respective vacuum pump 106, 108, 110 will also be approximately the same. For example, as described previously with respect to the HVAC system 10 of FIGS. 1, 6, and 7, the partial pressure of the water vapor 26A in the water vapor vacuum volumes 112, 114, 116 may be maintained in a range of approximately 0.10-0.25 psia.

As illustrated in FIG. 9, in certain embodiments, each of the vacuum pumps 106, 108, 110 may compress the water vapor 26 and direct it into a common manifold 118 having a substantially constant partial pressure of water vapor (i.e., just high enough to facilitate condensation in the condensation unit 54). In other embodiments, the water vapor 26 extracted from each successive dehumidification unit 100, 102, 104 (i.e., from top to bottom) may be compressed by its respective vacuum pump 106, 108, 110 and then combined with the water vapor 26 extracted from the next downstream (i.e., with respect to the common manifold) dehumidification unit 100, 102, 104. For example, in other embodiments, the water vapor 26 from the first dehumidification unit 100 may be compressed by the first vacuum pump 106 and then combined with the water vapor 26 from the second dehumidification unit 102 in the second water vapor vacuum volume 114. Similarly, the water vapor 26 compressed by the second vacuum pump 108 may be combined with the water vapor 26 from the third dehumidification unit 104 in the third water vapor vacuum volume 116. In this embodiment, the exhaust side of each successive vacuum pump 106, 108, 110 increases the partial pressure of the water vapor 26 only to the operating pressure of the next downstream vacuum pump 106, 108, 110. For example, the first vacuum pump 106 may only increase the pressure of the water vapor 26 to approximately 0.2 psia if the partial pressure of water vapor in the second water vapor vacuum volume 114 is approximately 0.2 psia. Similarly, the second vacuum pump 108 may only increase the pressure of the water vapor 26 to approximately 0.35 psia if the partial pressure of water vapor in the third water vapor vacuum volume 116 is approximately 0.35 psia. In this embodiment, the water vapor 26 compressed by the third vacuum pump 110 will be directed into the condensation unit 54 at a partial pressure of water vapor just high enough to facilitate condensation.

It should be noted that the specific embodiment illustrated in FIG. 9 having a plurality of dehumidification units 100, 102, 104 arranged in parallel may be configured in various ways not illustrated in FIG. 9. For example, although illustrated as using a respective vacuum pump 106, 108, 110 with each dehumidification unit 100, 102, 104, in certain embodiments, a single vacuum pump 52 may be used with multiple inlet ports connected to the first, second, and third water vapor vacuum volumes 112, 114, 116. In addition, although illustrated as using a single condensation unit 54, reservoir 58, and liquid pump 60 to condense the water vapor 26B into a liquid state, and store and/or transport the liquid water from the HVAC system 98, in other embodiments, each set of dehumidification units 100, 102, 104 and vacuum pumps 106, 108, 110 may be operated independently and be associated with their own respective condensation units 54, reservoirs 58, and liquid pumps 60.

In addition, the control system 64 of FIG. 7 may also be used in the HVAC system 98 of FIG. 9 to control the operation of the HVAC system 98 in a similar manner as described previously with respect to FIG. 7. For example, as described previously, the control system 64 may be configured to control the rate of removal of the noncondensable components 30 of the water vapor 26A in the water vapor vacuum volumes 112, 114, 116 by turning the vacuum pumps 106, 108, 110 (or separate vacuum pumps 62, as described previously with respect to FIGS. 6 and 7) on or off, or by modulating the rate at which the vacuum pumps 106, 108, 110 (or separate vacuum pumps 62, as described previously with respect to FIGS. 6 and 7) remove the noncondensable components 30. More specifically, in certain embodiments, the control system 64 may receive signals from sensors in the water vapor vacuum volumes 112, 114, 116 that detect when too many noncondensable components 30 are present in the water vapor 26A contained in the water vapor vacuum volumes 112, 114, 116.

In addition, the control system 64 may modulate the lower partial pressure of the water vapor 26A in the water vapor vacuum volumes 112, 114, 116 to modify the water vapor removal capacity and efficiency ratio of the dehumidification units 100, 102, 104. For example, the control system 64 may receive signals from pressure sensors in the water vapor vacuum volumes 112, 114, 116, the water vapor channels 18, as well as signals generated by sensors relating to characteristics (e.g., temperature, pressure, flow rate, relative humidity, and so forth) of the air 14, among other things. The control system 64 may use this information to determine how to modulate the lower partial pressure of the water vapor 26A in the water vapor vacuum volumes 112, 114, 116 to increase or decrease the rate of removal of water vapor 26 from the air channels 16 to the water vapor channels 18 through the interfaces 20 of the dehumidification units 100, 102, 104 as $H_2O$ (i.e., as water molecules, gaseous water vapor, liquid water, adsorbed/desorbed water molecules, absorbed/desorbed water molecules, and so forth, through the interfaces 20).

For example, if more water vapor removal is desired, the lower partial pressure of the water vapor 26A in the water vapor vacuum volumes 112, 114, 116 may be reduced and, conversely, if less water vapor removal is desired, the lower partial pressure of the water vapor 26A in the water vapor vacuum volumes 112, 114, 116 may be increased. Furthermore, as described above, the amount of dehumidification (i.e., water vapor removal) may be cycled to improve the efficiency of the dehumidification units 100, 102, 104. More specifically, under certain operating conditions, the dehumidification units 100, 102, 104 may function more efficiently at higher rates of water vapor removal. As such, in certain embodiments, the dehumidification units 100, 102, 104 may be cycled to remove a maximum amount of water vapor from the air 14 for a period of time (e.g., approximately 1 sec, 10 sec, 100 sec, 10 min), then to remove relatively no water vapor from the air 14 for a period of time (e.g., approximately 1 sec, 10 sec, 100 sec, 10 min), then to remove a maximum amount of water vapor from the air 14 for a period of time (e.g., approximately 1 sec, 10 sec, 100 sec, 10 min), and so forth. In other words, the dehumidification units 100, 102, 104 may be operated at full water vapor removal capacity for periods of time alternating with other periods of time where no water vapor is removed. In addition, the control system 64 may be configured to control start-up and shut-down sequencing of the dehumidification units 100, 102, 104.

Figure 10:
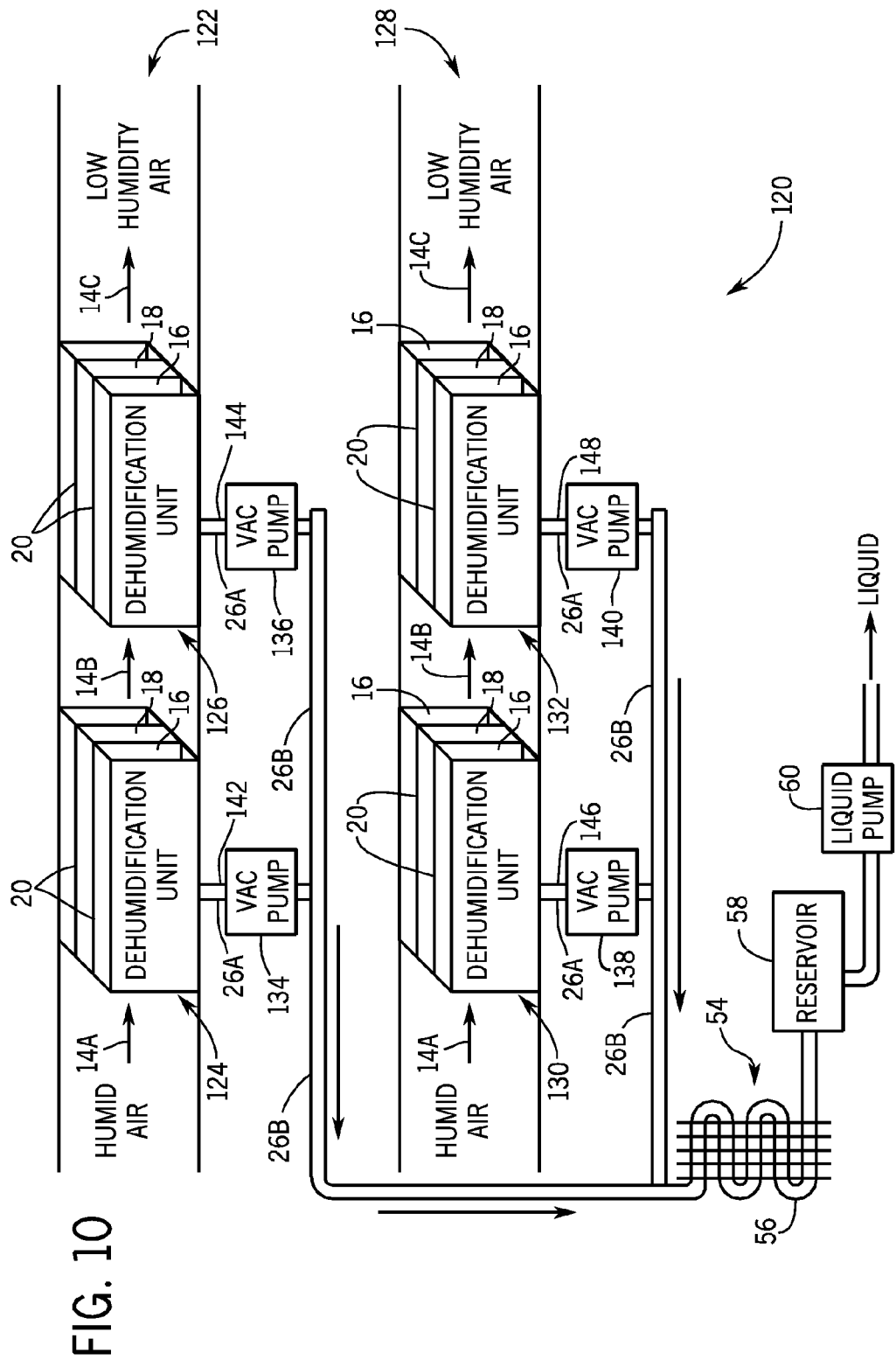
FIG. 10 is a schematic diagram of an HVAC system having a first plurality of dehumidification units arranged in series, and a second plurality of dehumidification units also arranged in series, with the first and second plurality of dehumidification units arranged in parallel in accordance with an embodiment of the present disclosure.

In addition to the serial arrangement of dehumidification units 12 illustrated in FIG. 8 and the parallel arrangement of dehumidification units 12 illustrated in FIG. 9, multiple dehumidification units 12 may be used in other ways. Indeed, much more complex and expansive arrangements may also be used. For example, FIG. 10 is a schematic diagram of an HVAC system 120 having a first set 122 of dehumidification units 12 (i.e., a first dehumidification unit 124 and a second dehumidification unit 126) arranged in series, and a second set 128 of dehumidification units 12 (i.e., a third dehumidification unit 130 and a fourth dehumidification unit 132) also arranged in series, with the first and second sets 122, 128 of dehumidification units 12 arranged in parallel in accordance with an embodiment of the present disclosure. In other words, the first set 122 of serial first and second dehumidification units 124, 126 are arranged in parallel with the second set 128 of serial third and fourth dehumidification units 130, 132.

Although illustrated as having two sets 122, 128 of serial dehumidification units 12 arranged in parallel, any number of parallel pluralities of dehumidification units 12 may indeed be used in the HVAC system 120. For example, in other embodiments, 3, 4, 5, 6, 7, 8, 9, 10, or even more parallel sets of dehumidification units 12 may be used in the HVAC system 120. Similarly, although illustrated as having two dehumidification units 12 arranged in series within each set 122, 128 of dehumidification units 12, any number of dehumidification units 12 may indeed be used in series within each set 122, 128 of dehumidification units 12 in the HVAC system 120. For example, in other embodiments, 1, 3, 4, 5, 6, 7, 8, 9, 10, or even more dehumidification units 12 may be used in series within each set 122, 128 of dehumidification units 12 in the HVAC system 120.

All of the operating characteristics of the HVAC system 120 of FIG. 10 are similar to those described previously with respect to the HVAC systems 72, 98 of FIGS. 8 and 9 (as well as the HVAC system 10 of FIGS. 1, 6, and 7). For example, as illustrated, each of the dehumidification units 124, 126, 130, 132 may be associated with its own respective vacuum pump 134, 136, 138, 140 (e.g., similar to the vacuum pump 52 of FIGS. 1, 6, and 7). However, in other embodiments, one vacuum pump 52 may be used for each set 122, 128 of dehumidification units 12 with multiple inlet ports connected to the respective water vapor vacuum volumes 142, 144, 146, 148. Indeed, in other embodiments, all of the dehumidification units 124, 126, 130, 132 may be associated with a single vacuum pump 52 with multiple inlet ports connected to all of the water vapor vacuum volumes 142, 144, 146, 148.

In addition, although illustrated as using a single condensation unit 54, reservoir 58, and liquid pump 60 to condense the water vapor 26B into a liquid state, and store and/or transport the liquid water from the HVAC system 120, in other embodiments, each set of dehumidification units 124, 126, 130, 132 and vacuum pumps 134, 136, 138, 140 may be operated independently and be associated with their own respective condensation units 54, reservoirs 58, and liquid pumps 60. In addition, the control system 64 described previously may also be used in the HVAC system 120 of FIG. 10 to control operation of the HVAC system 120 in a similar manner as described previously.

The embodiments described previously with respect to FIGS. 8 through 10 are slightly more complex than the embodiments described previously with respect to FIGS. 1 through 7 inasmuch as multiple dehumidification units 12 are used in series, parallel, or some combination thereof. As such, the control of pressures and temperatures of the HVAC systems 72, 98, 120 of FIGS. 8 through 10 are slightly more complicated than the control of a single dehumidification unit 12. For example, the partial pressures in the water vapor vacuum volumes may need to be closely monitored and modulated by the control system 64 to take into account variations in temperature and partial pressure of water vapor in the air 14 within the respective dehumidification units 12, operating pressures of adjacent water vapor vacuum volumes and vacuum pumps (which may be cross-piped together as described previously to facilitate control of pressures, flows, and so forth), among other things. In certain embodiments, variable or fixed orifices may be used to control pressures and changes in pressures in and between the dehumidification units 12. In addition, as described previously, each of the respective vacuum pumps may be controlled to adjust the partial pressures of water vapor in the water vapor vacuum volumes to account for variations between dehumidification units 12.

Figure 11:
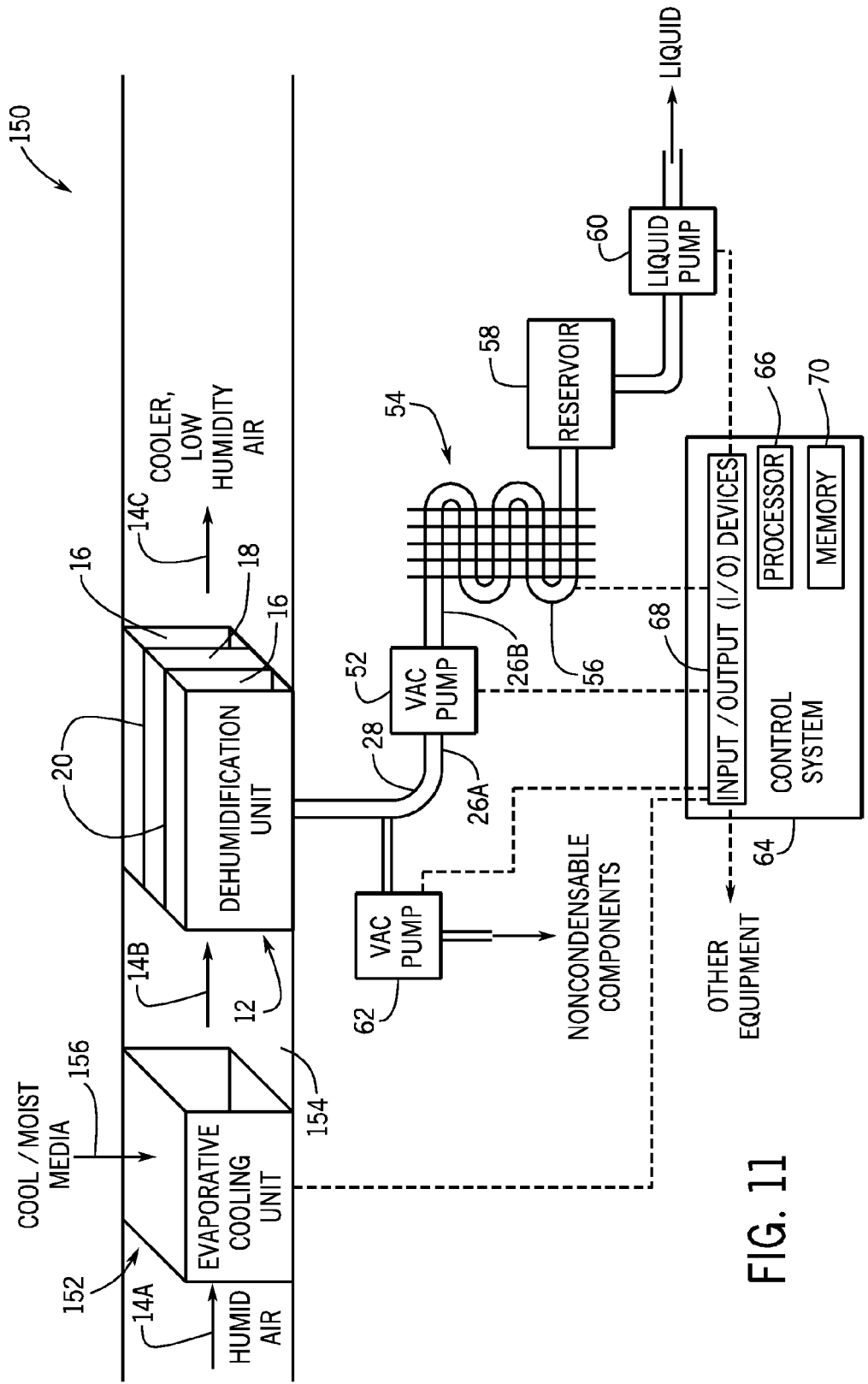
FIG. 11 is a schematic diagram of an HVAC system having an evaporative cooling unit disposed upstream of the dehumidification unit in accordance with an embodiment of the present disclosure.

In certain embodiments, the dehumidification unit 12 described with respect to FIGS. 1 through 7 may be used in conjunction with one or more evaporative cooling units 12. For example, FIG. 11 is a schematic diagram of an HVAC system 150 having an evaporative cooling unit 152 disposed upstream of the dehumidification unit 12 in accordance with an embodiment of the present disclosure. The HVAC system 150 of FIG. 11 generally functions the same as the HVAC system 10 of FIGS. 1, 6, and 7. However, as illustrated in FIG. 11, the HVAC system 150 specifically includes the evaporative cooling unit 152 disposed upstream of the dehumidification unit 12. Thus, the HVAC system 150 first receives the relatively humid inlet air 14A into the evaporative cooling unit 152, instead of the dehumidification unit 12. The evaporative cooling unit 152 reduces the temperature of the relatively humid inlet air 14A and expels cooler (but still relatively humid) air 14B, which is directed into the dehumidification unit 12 via a duct 154. As described previously, the cooler (but still relatively humid) air 14B is then dehumidified in the dehumidification unit 12 and expelled as relatively dry air 14C into the conditioned space.

The evaporative cooling unit 152 of FIG. 11 may either be a direct evaporative cooling unit or an indirect evaporative cooling unit. In other words, when the evaporative cooling unit 152 uses direct evaporative cooling techniques, a relatively cool and moist media 156 (e.g., relatively cool water) is directly added to the relatively humid inlet air 14A. However, when the evaporative cooling unit 152 uses indirect evaporative cooling techniques, the relatively humid air 14A may, for example, flow across one side of a plate of a heat exchanger while the relatively cool and moist media 156 flows across another side of the plate of the heat exchanger. In other words, generally speaking, some of the relatively cool moisture from the relatively cool and moist media 156 is indirectly added to the relatively humid air 14A. Whether direct or indirect evaporative cooling techniques are used in the evaporative cooling unit 152 affects the rate of humidity removal and temperature reduction of the air 14 that flows through the HVAC system 150 of FIG. 11. In general, however, the evaporative cooling unit 152 of FIG. 11 initially cools the air 14 to a temperature as low as possible for the particular application, and the dehumidification unit 12 lowers the humidity ratio at approximately constant temperature.

As illustrated, many of the components of the HVAC system 150 of FIG. 11 may be considered identical to the components of the HVAC system 10 of FIGS. 1, 6, and 7. For example, as described previously, HVAC system 150 of FIG. 11 includes the condensation unit 54 that receives water vapor 26B having a partial pressure just high enough to facilitate condensation, as described previously. In certain embodiments, the HVAC system 150 of FIG. 11 may also include the reservoir 58 for temporary storage of saturated vapor and liquid water. However, as described previously, in other embodiments, no reservoir may be used. In either case, the liquid water from the condensation unit 54 may be directed into the liquid pump 60, within which the pressure of the liquid water from the condensation unit 54 is increased to approximately atmospheric pressure (i.e., approximately 14.7 psia) so that the liquid water may be rejected at ambient conditions.

In addition, the control system 64 of FIG. 7 may also be used in the HVAC system 150 of FIG. 11 to control the operation of the HVAC system 150 in a similar manner as described previously with respect to FIG. 7. For example, as described previously, the control system 64 may be configured to control the rate of removal of the noncondensable components 30 of the water vapor 26A in the water vapor vacuum volume 28 by turning the vacuum pump 52 (or separate vacuum pump 62) on or off, or by modulating the rate at which the vacuum pump 52 (or separate vacuum pump 62)

removes the noncondensable components 30. More specifically, in certain embodiments, the control system 64 may receive signals from sensors in the water vapor vacuum volume 28 that detect when too many noncondensable components 30 are present in the water vapor 26A contained in the water vapor vacuum volume 28.

In addition, the control system 64 may modulate the lower partial pressure of the water vapor 26A in the water vapor vacuum volume 28 to modify the water vapor removal capacity and efficiency ratio of the dehumidification unit 12. For example, the control system 64 may receive signals from pressure sensors in the water vapor vacuum volume 28, the water vapor channels 18, as well as signals generated by sensors relating to characteristics (e.g., temperature, pressure, flow rate, relative humidity, and so forth) of the air 14 in the evaporative cooling unit 152, the dehumidification unit 12, or both, among other things.

The control system 64 may use this information to determine how to modulate the lower partial pressure of the water vapor 26A in the water vapor vacuum volume 28 to increase or decrease the rate of removal of water vapor 26 from the air channels 16 to the water vapor channels 18 through the interfaces 20 of the dehumidification unit 12 as $H_2O$ (i.e., as water molecules, gaseous water vapor, liquid water, adsorbed/desorbed water molecules, absorbed/desorbed water molecules, and so forth, through the interfaces 20). For example, if more water vapor removal is desired, the lower partial pressure of the water vapor 26A in the water vapor vacuum volume 28 may be reduced and, conversely, if less water vapor removal is desired, the lower partial pressure of the water vapor 26A in the water vapor vacuum volume 28 may be increased. Furthermore, as described above, the amount of dehumidification (i.e., water vapor removal) may be cycled to improve the efficiency of the dehumidification unit 12. More specifically, under certain operating conditions, the dehumidification unit 12 may function more efficiently at higher rates of water vapor removal. As such, in certain embodiments, the dehumidification unit 12 may be cycled to remove a maximum amount of water vapor from the air 14 for a period of time (e.g., approximately 1 sec, 10 sec, 100 sec, 10 min), then to remove relatively no water vapor from the air 14 for a v (e.g., approximately 1 sec, 10 sec, 100 sec, 10 min), then to remove a maximum amount of water vapor from the air 14 for a period of time (e.g., approximately 1 sec, 10 sec, 100 sec, 10 min), and so forth. In other words, the dehumidification unit 12 may be operated at full water vapor removal capacity for periods of time alternating with other periods of time where no water vapor is removed.

Furthermore, the control system 64 may also be configured to control operation of the evaporative cooling unit 152. For example, the control system 64 may selectively modulate how much (direct or indirect) evaporative cooling occurs in the evaporative cooling unit 152. As an example, valves may be actuated to control the flow rate of the relatively cool and moist media 156 through the evaporative cooling unit 152, thereby directly affecting the amount of (direct or indirect) evaporative cooling in the evaporative cooling unit 152. In addition, operation of the evaporative cooling unit 152 and the dehumidification unit 12 may be controlled simultaneously. Furthermore, the control system 64 may be configured to control start-up and shutdown sequencing of the evaporative cooling unit 152 and the dehumidification unit 12.

Figure 12A:
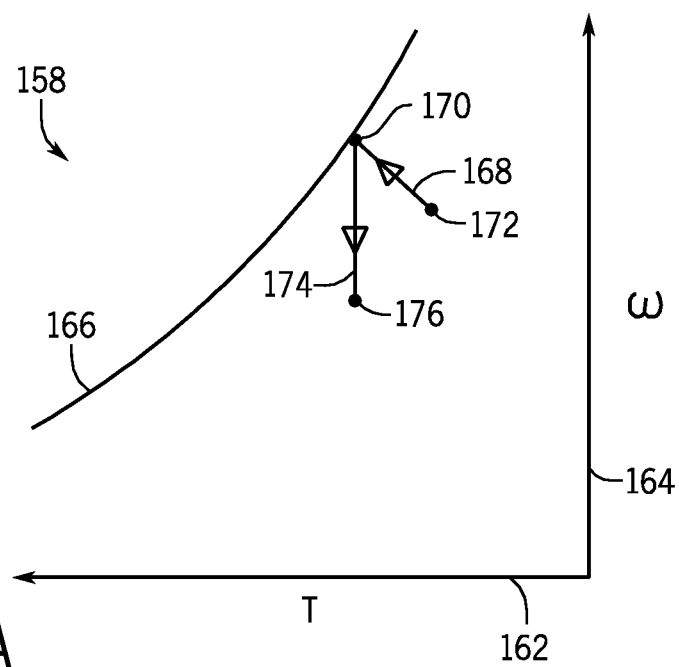
FIG. 12A is a psychrometric chart of the temperature and the humidity ratio of the air flowing through a direct evaporative cooling unit and the dehumidification unit of FIG. 11 in accordance with an embodiment of the present disclosure.
Figure 12B:
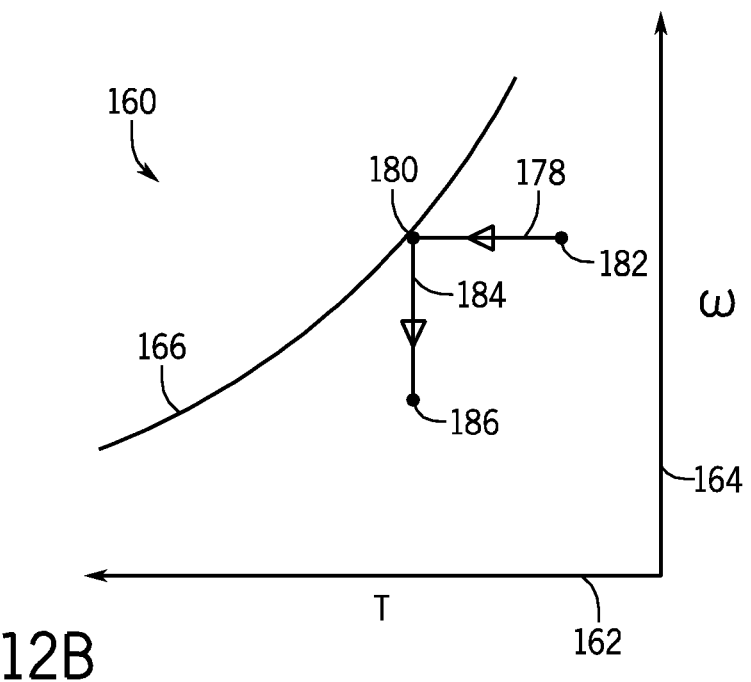
FIG. 12B is a psychrometric chart of the temperature and the humidity ratio of the air flowing through an indirect evaporative cooling unit and the dehumidification unit of FIG. 11 in accordance with an embodiment of the present disclosure.

FIGS. 12A and 12B are psychrometric charts 158, 160 of the temperature and the humidity ratio of the air 14 flowing through the evaporative cooling unit 152 and the dehumidification unit 12 of FIG. 11 in accordance with an embodiment of the present disclosure. More specifically, FIG. 12A is the psychrometric chart 158 of the temperature and the humidity ratio of the air 14 flowing through a direct evaporative cooling unit 152 and the dehumidification unit 12 of FIG. 11, in accordance with an embodiment of the present disclosure, and FIG. 12B is the psychrometric chart 160 of the temperature and the humidity ratio of the air 14 flowing through an indirect evaporative cooling unit 152 and the dehumidification unit 12 of FIG. 11 in accordance with an embodiment of the present disclosure. In particular, in each chart 158, 160, the x-axis 162 corresponds to the temperature of the air 14 flowing through the evaporative cooling unit 152 and the dehumidification unit 12 of FIG. 11, the y-axis 164 corresponds to the humidity ratio of the air 14 flowing through the evaporative cooling unit 152 and the dehumidification unit 12 of FIG. 11, and the curve 166 represents the water vapor saturation curve for a given relative humidity of the air 14 flowing through the evaporative cooling unit 152 and the dehumidification unit 12 of FIG. 11.

As illustrated by line 168 in FIG. 12A, because the relatively cool and moist media 156 is directly introduced into the air 14 flowing though the direct evaporative cooling unit 152, the humidity ratio of the air 14B (i.e., point 170) out of the direct evaporative cooling unit 152 is substantially higher than the humidity ratio of the inlet air 14A (i.e., point 172) into the direct evaporative cooling unit 152. However, the temperature of the air 14B (i.e., point 170) out of the direct evaporative cooling unit 152 is substantially lower than the temperature of the inlet air 14A (i.e., point 172) into the evaporative cooling unit 152. As illustrated by line 174 of FIG. 12A, because water vapor 26 is removed from the air 14B flowing through the dehumidification unit 12, the humidity ratio of the outlet air 14C (i.e., point 176) from the dehumidification unit 12 is lower than the humidity ratio of the air 14B (i.e., point 170) into the dehumidification unit 12, while the temperature of the outlet air 14C and the air 14B are substantially the same. Indeed, the direct evaporative cooling unit 152 humidifies and cools the air 14, while the dehumidification unit 12 subsequently dehumidifies the air 14 at substantially constant temperature.

As illustrated by line 178 in FIG. 12B, because the relatively cool and moist media 156 indirectly cools the air 14 flowing through the indirect evaporative cooling unit 152, the humidity ratio of the air 14B (i.e., point 180) out of the indirect evaporative cooling unit 152 is substantially the same as the humidity ratio of the inlet air 14A (i.e., point 182) into the indirect evaporative cooling unit 152. However, the temperature of the air 14B (i.e., point 180) out of the indirect evaporative cooling unit 152 is substantially lower than the temperature of the inlet air 14A (i.e., point 182) into the indirect evaporative cooling unit 152. As illustrated by line 184 of FIG. 12B, because water vapor 26 is removed from the air 14B flowing through the dehumidification unit 12, the humidity ratio of the outlet air 14C (i.e., point 186) from the dehumidification unit 12 is lower than the humidity ratio of the air 14B (i.e., point 180) into the dehumidification unit 12, while the temperature of the outlet air 14C and the air 14B are substantially the same. Indeed, the indirect evaporative cooling unit 152 cools (without substantially humidifying) the air 14, while the dehumidification unit 12 subsequently dehumidifies the air 14 at substantially constant temperature.

As described previously, the control system 64 of FIG. 11 may be configured to control the operation of the evaporative cooling unit 152 and the dehumidification unit 12. For example, the control system 64 may be configured to adjust where points 170, 172, 176 and points 180, 182, 186 of the air 14 fall in the psychrometric charts 158, 160 of FIGS. 12A and 12B when direct and indirect evaporative cooling techniques, respectively, are used in the evaporative cooling unit 152 of FIG. 11.

FIG. 13 is a schematic diagram of an HVAC system 188 having the evaporative cooling unit 152 disposed downstream of the dehumidification unit 12 in accordance with an embodiment of the present disclosure. The HVAC system 188 of FIG. 13 generally functions the same as the HVAC system 10 of FIGS. 1, 6, and 7 and the HVAC system 150 of FIG. 11. However, as illustrated in FIG. 13, the HVAC system 188 first receives the relatively humid inlet air 14A into the dehumidification unit 12. As described previously, the relatively humid inlet air 14A is first dehumidified in the dehumidification unit 12 and expelled as relatively dry air 14B into the duct 154. The evaporative cooling unit 152 then reduces the temperature of the dry air 14B and expels cooler dry air 14C into the conditioned space.

As described previously with respect to FIG. 11, the evaporative cooling unit 152 of FIG. 13 may either be a direct evaporative cooling unit or an indirect evaporative cooling unit. In other words, when the evaporative cooling unit 152 uses direct evaporative cooling techniques, the relatively cool and moist media 156 (e.g., relatively cool water) is directly added to the relatively dry air 14B in the duct 154. However, when the evaporative cooling unit 152 uses indirect evaporative cooling techniques, the relatively dry air 14B may, for example, flow across one side of a plate of a heat exchanger while the relatively cool and moist media 156 flows across another side of the plate of the heat exchanger. In other words, generally speaking, some of the relatively cool moisture from the relatively cool and moist media 156 is indirectly added to the relatively dry air 14B in the duct 154. Whether direct or indirect evaporative cooling techniques are used in the evaporative cooling unit 152 affects the rate of humidity removal and temperature reduction of the air 14 that flows through the HVAC system 188 of FIG. 13. In general, however, the dehumidification unit 12 initially lowers the humidity ratio at approximately constant temperature, and the evaporative cooling unit 152 cools the air 14 to a temperature as low as possible for the particular application.

As illustrated, many of the components of the HVAC system 188 of FIG. 13 may be considered identical to the components of the HVAC system 10 of FIGS. 1, 6, and 7 and the HVAC system 150 of FIG. 11. For example, as described previously, HVAC system 188 of FIG. 13 includes the condensation unit 54 that receives water vapor 26B having a partial pressure just high enough to facilitate condensation, as described previously. In certain embodiments, the HVAC system 188 of FIG. 13 may also include the reservoir 58 for temporary storage of saturated vapor and liquid water. However, as described previously, in other embodiments, no reservoir may be used. In either case, the liquid water from the condensation unit 54 may be directed into the liquid pump 60, within which the pressure of the liquid water from the condensation unit 54 is increased to approximately atmospheric pressure (i.e., approximately 14.7 psia) so that the liquid water may be rejected at ambient conditions.

In addition, the control system 64 of FIGS. 7 and 11 may also be used in the HVAC system 188 of FIG. 13 to control the operation of the HVAC system 188 in a similar manner as described previously with respect to FIGS. 7 and 11. For example, as described previously, the control system 64 may be configured to control the rate of removal of the noncondensable components 30 of the water vapor 26A in the water vapor vacuum volume 28 by turning the vacuum pump 52 (or separate vacuum pump 62) on or off, or by modulating the rate at which the vacuum pump 52 (or separate vacuum pump 62) removes the noncondensable components 30. More specifically, in certain embodiments, the control system 64 may receive signals from sensors in the water vapor vacuum volume 28 that detect when too many noncondensable components 30 are present in the water vapor 26A contained in the water vapor vacuum volume 28.

In addition, the control system 64 may modulate the lower partial pressure of the water vapor 26A in the water vapor vacuum volume 28 to modify the water vapor removal capacity and efficiency ratio of the dehumidification unit 12. For example, the control system 64 may receive signals from pressure sensors in the water vapor vacuum volume 28, the water vapor channels 18, as well as signals generated by sensors relating to characteristics (e.g., temperature, pressure, flow rate, relative humidity, and so forth) of the air 14 in the dehumidification unit 12, the evaporative cooling unit 152, or both, among other things.

The control system 64 may use this information to determine how to modulate the lower partial pressure of the water vapor 26A in the water vapor vacuum volume 28 to increase or decrease the rate of removal of water vapor 26 from the air channels 16 to the water vapor channels 18 through the interfaces 20 of the dehumidification unit 12 as $H_2O$ (i.e., as water molecules, gaseous water vapor, liquid water, adsorbed/desorbed water molecules, absorbed/desorbed water molecules, and so forth, through the interfaces 20). For example, if more water vapor removal is desired, the lower partial pressure of the water vapor 26A in the water vapor vacuum volume 28 may be reduced and, conversely, if less water vapor removal is desired, the lower partial pressure of the water vapor 26A in the water vapor vacuum volume 28 may be increased. Furthermore, as described above, the amount of dehumidification (i.e., water vapor removal) may be cycled to improve the efficiency of the dehumidification unit 12. More specifically, under certain operating conditions, the dehumidification unit 12 may function more efficiently at higher rates of water vapor removal. As such, in certain embodiments, the dehumidification unit 12 may be cycled to remove a maximum amount of water vapor from the air 14 for a period of time (e.g., approximately 1 sec, 10 sec, 100 sec, 10 min), then to remove relatively no water vapor from the air 14 for a period of time (e.g., approximately 1 sec, 10 sec, 100 sec, 10 min), then to remove a maximum amount of water vapor from the air 14 for a period of time (e.g., approximately 1 sec, 10 sec, 100 sec, 10 min), and so forth. In other words, the dehumidification unit 12 may be operated at full water vapor removal capacity for periods of time alternating with other periods of time where no water vapor is removed.

Furthermore, the control system 64 may also be configured to control operation of the evaporative cooling unit 152. For example, the control system 64 may selectively modulate how much (direct or indirect) evaporative cooling occurs in the evaporating cooling unit 152. As an example, valves may be actuated to control the flow rate of the relatively cool and moist media 156 through the evaporative cooling unit 152, thereby directly affecting the amount of (direct or indirect) evaporative cooling in the evaporative cooling unit 152. In addition, operation of the dehumidification unit 12 and the evaporative cooling unit 152 may be controlled simultaneously. Furthermore, the control system 64 may be configured to control start-up and shutdown sequencing of the dehumidification unit 12 and the evaporative cooling unit 152.

Figure 14A:
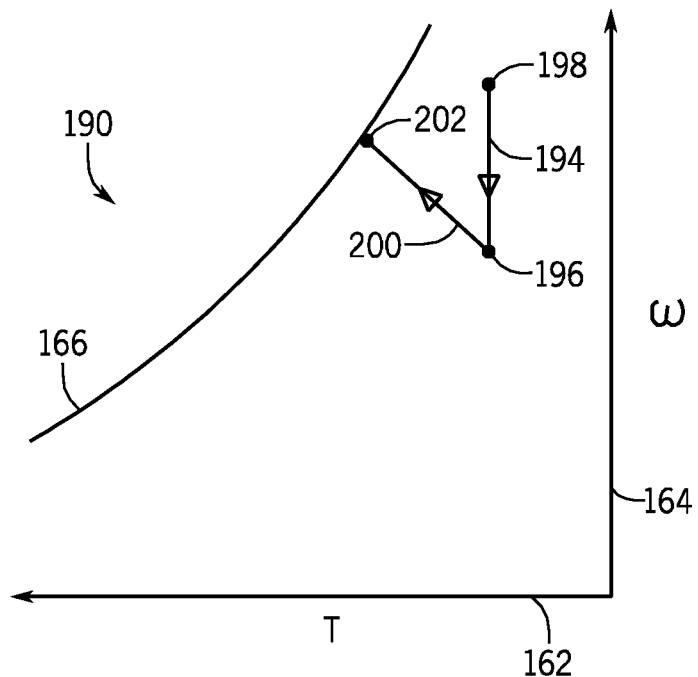
FIG. 14A is a psychrometric chart of the temperature and the humidity ratio of the air flowing through the dehumidification unit and a direct evaporative cooling unit of FIG. 13 in accordance with an embodiment of the present disclosure.
Figure 14B:
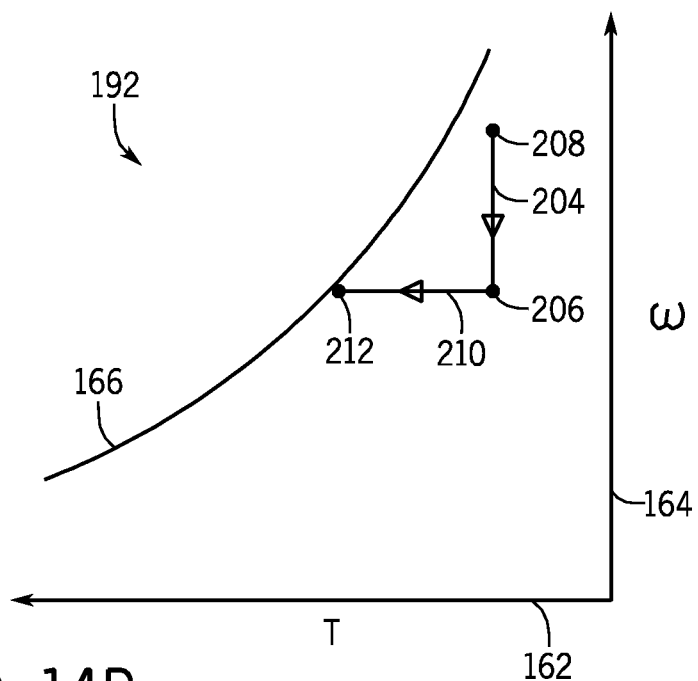
FIG. 14B is a psychrometric chart of the temperature and the humidity ratio of the air flowing through the dehumidification unit and an indirect evaporative cooling unit of FIG. 13 in accordance with an embodiment of the present disclosure.

FIGS. 14A and 14B are psychrometric charts 190, 192 of the temperature and the humidity ratio of the air 14 flowing through the dehumidification unit 12 and the evaporative cooling unit 152 of FIG. 13 in accordance with an embodiment of the present disclosure. More specifically, FIG. 14A is the psychrometric chart 190 of the temperature and the humidity ratio of the air 14 flowing through the dehumidification unit 12 and a direct evaporative cooling unit 152 of FIG. 13 in accordance with an embodiment of the present disclosure, and FIG. 14B is the psychrometric chart 192 of the temperature and the humidity ratio of the air 14 flowing through the dehumidification unit 12 and an indirect evaporative cooling unit 152 of FIG. 13 in accordance with an embodiment of the present disclosure. In particular, as described previously with respect to FIGS. 12A and 12B, the x-axis 162 corresponds to the temperature of the air 14 flowing through the dehumidification unit 12 and the evaporative cooling unit 152 of FIG. 13, the y-axis 164 corresponds to the humidity ratio of the air 14 flowing through the dehumidification unit 12 and the evaporative cooling unit 152 of FIG. 13, and the curve 166 represents the water vapor saturation curve for a given relative humidity of the air 14 flowing through the dehumidification unit 12 and the evaporative cooling unit 152 of FIG. 13.

As illustrated by line 194 in FIG. 14A, because water vapor 26 is removed from the relatively humid inlet air 14A flowing through the dehumidification unit 12, the humidity ratio of the relatively dry air 14B (i.e., point 196) from the dehumidification unit 12 is lower than the humidity ratio of the relatively humid inlet air 14A (i.e., point 198) into the dehumidification unit 12, while the temperature of the relatively dry air 14B and the relatively humid inlet air 14A are substantially the same. As illustrated by line 200 of FIG. 14A, because the relatively cool and moist media 156 is directly introduced into the relatively dry air 14B flowing through the direct evaporative cooling unit 152, the humidity ratio of the outlet air 14C (i.e., point 202) from the direct evaporative cooling unit 152 is substantially higher than the humidity ratio of the relatively dry air 14B (i.e., point 196) into the direct evaporative cooling unit 152. However, the temperature of the outlet air 14C (i.e., point 202) from the direct evaporative cooling unit 152 is substantially lower than the temperature of the relatively dry air 14B (i.e., point 196) into the direct evaporative cooling unit 152. Indeed, the dehumidification unit 12 dehumidifies the air 14 at substantially constant temperature, while the direct evaporative cooling unit 152 subsequently humidifies and cools the air 14.

As illustrated by line 204 in FIG. 14B, because water vapor 26 is removed from the relatively humid inlet air 14A flowing through the dehumidification unit 12, the humidity ratio of the relatively dry air 14B (i.e., point 206) from the dehumidification unit 12 is lower than the humidity ratio of the relatively humid inlet air 14A (i.e., point 208) into the dehumidification unit 12, while the temperature of the relatively dry air 14B and the relatively humid inlet air 14A are substantially the same. As illustrated by line 210 of FIG. 14B, because the relatively cool and moist media 156 indirectly cools the relatively dry air 14B flowing though the indirect evaporative cooling unit 152, the humidity ratio of the outlet air 14C (i.e., point 212) from the indirect evaporative cooling unit 152 is substantially the same as the humidity ratio of the relatively dry air 14B (i.e., point 206) into the indirect evaporative cooling unit 152. However, the temperature of the outlet air 14C (i.e., point 212) from the indirect evaporative cooling unit 152 is substantially lower than the temperature of the relatively dry air 14B (i.e., point 206) into the indirect evaporative cooling unit 152. Indeed, the dehumidification unit 12 dehumidifies the air 14 at substantially constant temperature, while the indirect evaporative cooling unit 152 cools (without substantially humidifying) the air 14.

As described previously, the control system 64 of FIG. 13 may be configured to control the operation of the dehumidification unit 12 and the evaporative cooling unit 152. For example, the control system 64 may be configured to adjust where points 196, 198, 202 and points 206, 208, 212 of the air 14 fall in the psychrometric charts 190, 192 of FIGS. 14A and 14B when direct and indirect evaporative cooling techniques, respectively, are used in the evaporative cooling unit 152 of FIG. 13.

The embodiments of the HVAC systems 150, 188 of FIGS. 11 and 13 are not the only ways in which dehumidification units 12 may be combined with evaporative cooling units 152. More specifically, whereas FIGS. 11 and 13 illustrate the use of a single dehumidification unit 12 and a single evaporative cooling unit 152 in series with each other, in other embodiments, any number of dehumidification units 12 and evaporative cooling units 152 may be used in series with each other. As another example, in one embodiment, a first dehumidification unit 12 may be followed by a first evaporative cooling unit 152, which is in turn followed by a second dehumidification unit 12, which is in turn followed by a second evaporative cooling unit 152, and so forth. However, any number of dehumidification units 12 and evaporative cooling units 152 may indeed be used in series with each other, wherein the air 14 exiting each unit 12, 152 is directed into the next downstream unit 12, 152 in the series (except from the last unit 12, 152 in the series, from which the air 14 is expelled into the conditioned space). In other words, the air 14 exiting each dehumidification unit 12 in the series is directed into a downstream evaporative cooling unit 152 (or to the conditioned space, if it is the last unit in the series), and the air 14 exiting each evaporative cooling unit 152 in the series is directed into a downstream dehumidification unit 12 (or to the conditioned space, if it is the last unit in the series). As such, the temperature of the air 14 may be successively lowered in each evaporative cooling unit 152 between dehumidification units 12 in the series, and the humidity ratio of the air 14 may be successively lowered in each dehumidification unit 12 between evaporative cooling units 152 in the series. This process may be continued within any number of dehumidification units 12 and evaporative cooling units 152 (e.g., 2, 3, 4, 5, 6, 7, 8, 9, 10, or more units 12 and/or units 152) until the desired final temperature and humidity ratio conditions of the air 14 are achieved. In one embodiment, each dehumidification unit 12 may be combined with a corresponding evaporative cooling unit 152. In another embodiment, more than one dehumidification unit 12 may be combined with a single evaporative cooling unit 152, or vice versa. The combinations may include the dehumidification unit 12 upstream of the evaporative cooling unit 152, or downstream of the evaporative cooling unit 152.

Figure 15A:
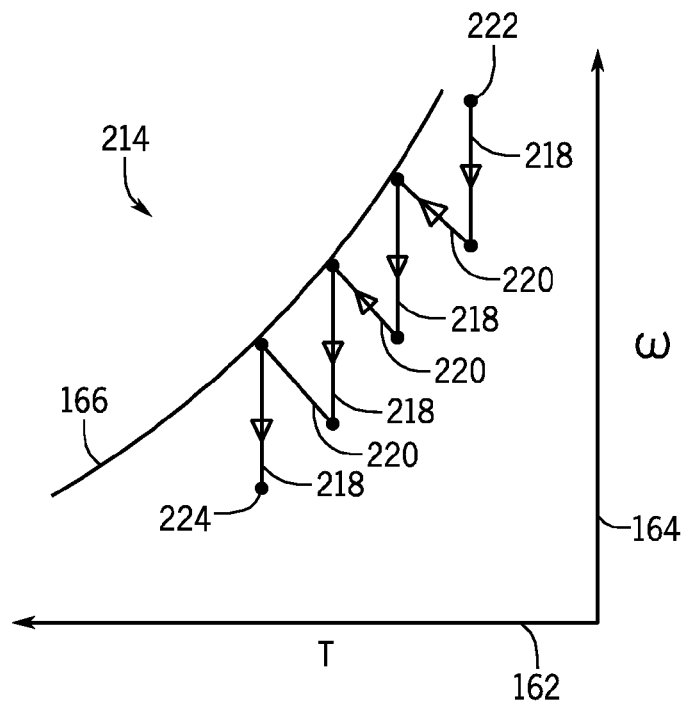
FIG. 15A is a psychrometric chart of the temperature and the humidity ratio of the air flowing through a plurality of dehumidification units and a plurality of direct evaporative cooling units in accordance with an embodiment of the present disclosure.
Figure 15B:
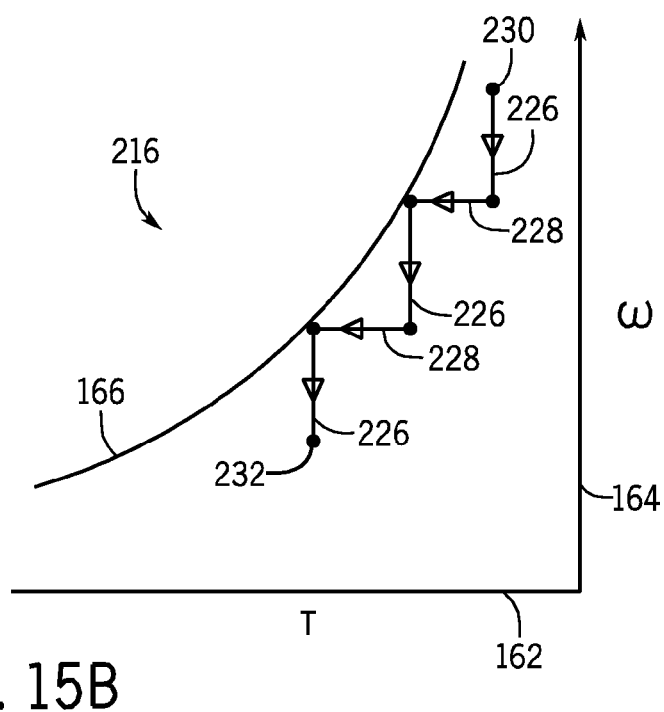
FIG. 15B is a psychrometric chart of the temperature and the humidity ratio of the air flowing through a plurality of dehumidification units and a plurality of indirect evaporative cooling units in accordance with an embodiment of the present disclosure.

FIGS. 15A and 15B are psychrometric charts 214, 216 of the temperature and the humidity ratio of the air 14 flowing through a plurality of dehumidification units 12 and a plurality of evaporative cooling units 152 in accordance with an embodiment of the present disclosure. More specifically, FIG. 15A is a psychrometric chart 214 of the temperature and the humidity ratio of the air 14 flowing through a plurality of dehumidification units 12 and a plurality of direct evaporative cooling units 152 in accordance with an embodiment of the present disclosure, and FIG. 15B is a psychrometric chart 216 of the temperature and the humidity ratio of the air 14 flowing through a plurality of dehumidification units 12 and a plurality of indirect evaporative cooling units 152 in accordance with an embodiment of the present disclosure. In particular, in each chart 214, 216, the x-axis 162 corresponds to the temperature of the air 14 flowing through the plurality of dehumidification units 12 and the plurality of evaporative cooling units 152, the y-axis 164 corresponds to the humidity ratio of the air 14 flowing through the plurality of dehumidification units 12 and the plurality of evaporative cooling units 152, and the curve 166 represents the water vapor saturation curve for a given relative humidity of the air 14 flowing through the plurality of dehumidification units 12 and the plurality of evaporative cooling units 152.

As illustrated by lines 218 in FIG. 15A, because water vapor 26 is removed from relatively humid air 14 flowing through each of the plurality of dehumidification units 12, the humidity ratio of the air 14 substantially decreases while the temperature of the air 14 remains substantially the same in each of the plurality of dehumidification units 12. As illustrated by lines 220 in FIG. 15A, because the relatively cool and moist media 156 is directly introduced into the relatively dry air 14 flowing though each of the direct evaporative cooling units 152, the humidity ratio of the air 14 increases while the temperature of the air 14 substantially decreases in each of the plurality of direct evaporative cooling units 152. In other words, each of the plurality of dehumidification units 12 successively dehumidifies the air 14 at substantially constant temperature, while each of the plurality of direct evaporative cooling units 152 successively humidifies and cools the air 14 until the desired final conditions of temperature and humidity ratio are achieved. More specifically, as illustrated in FIG. 15A, the lines 218, 220 generally form a "step function" progression from the initial conditions of temperature and humidity ratio of the inlet air 14 (i.e., point 222) to the final conditions of temperature and humidity ratio of the outlet air 14 (i.e., point 224).

As illustrated by lines 226 in FIG. 15B, because water vapor 26 is removed from relatively humid air 14 flowing through each of the plurality of dehumidification units 12, the humidity ratio of the air 14 substantially decreases while the temperature of the air 14 remains substantially the same in each of the plurality of dehumidification units 12. As illustrated by lines 228 in FIG. 15B, because the relatively cool and moist media 156 indirectly interacts with the relatively dry air 14 flowing though each of the indirect evaporative cooling units 152, the humidity ratio of the air 14 remains substantially the same while the temperature of the air 14 substantially decreases in each of the plurality of indirect evaporative cooling units 152. In other words, each of the plurality of dehumidification units 12 successively dehumidifies the air 14 at substantially constant temperature, while each of the plurality of indirect evaporative cooling units 152 successively cools the air 14 at substantially constant humidity ratio until the desired final conditions of temperature and humidity ratio are achieved. More specifically, as illustrated in FIG. 15B, the lines 226, 228 generally form a "sawtooth" progression from the initial conditions of temperature and humidity ratio of the inlet air 14 (i.e., point 230) to the final conditions of temperature and humidity ratio of the outlet air 14 (i.e., point 232).

Because evaporative cooling units 152 are used between dehumidification units 12, each dehumidification unit 12 receives air 14 that is cooler and at a lower partial pressure of water vapor than the upstream dehumidification units 12. As such, each of the dehumidification units 12 operates at substantially different operating conditions. Accordingly, the control system 64 may be used to modulate the operating parameters (e.g., the partial pressures of water vapor in the water vapor vacuum volumes 28, among other things) of the dehumidification units 12 to take into account the variations between dehumidification units 12. Similarly, because dehumidification units 12 are used between evaporative cooling units 152, each evaporative cooling unit 152 also receives air 14 that is cooler and at a lower partial pressure of water vapor than the upstream evaporative cooling units 152. As such, each of the evaporative cooling units 152 also operates at substantially different operating conditions. Accordingly, the control system 64 may also be used to modulate the operating parameters (e.g., the flow rates of the relatively cool and moist media 156, among other things) of the evaporative cooling units 152 to take into account the variations between evaporative cooling units 152. In addition, the control system 64 may also simultaneously coordinate operation of the plurality of dehumidification units 12 and the plurality of evaporative cooling units 152 to take the variations into account.

The evaporative cooling units 152 of FIGS. 11 and 13 not only serve to lower the temperature of the air 14, but also serve to clean the air 14 by, for example, passing the air 14 through a moist, fibrous mat. In addition, the dehumidification units 12 and the evaporative cooling units 14 may be operated at variable speeds or fixed speeds for optimal operation between different initial temperature and humidity conditions (i.e., operating points 222 and 230 in FIGS. 15A and 15B, respectively) and the final temperature and humidity conditions (i.e., operating points 224 and 232 in FIGS. 15A and 15B, respectively). Furthermore, the evaporative cooling units 152 are relatively low-energy units, thereby minimizing overall operating costs.

Figure 16:
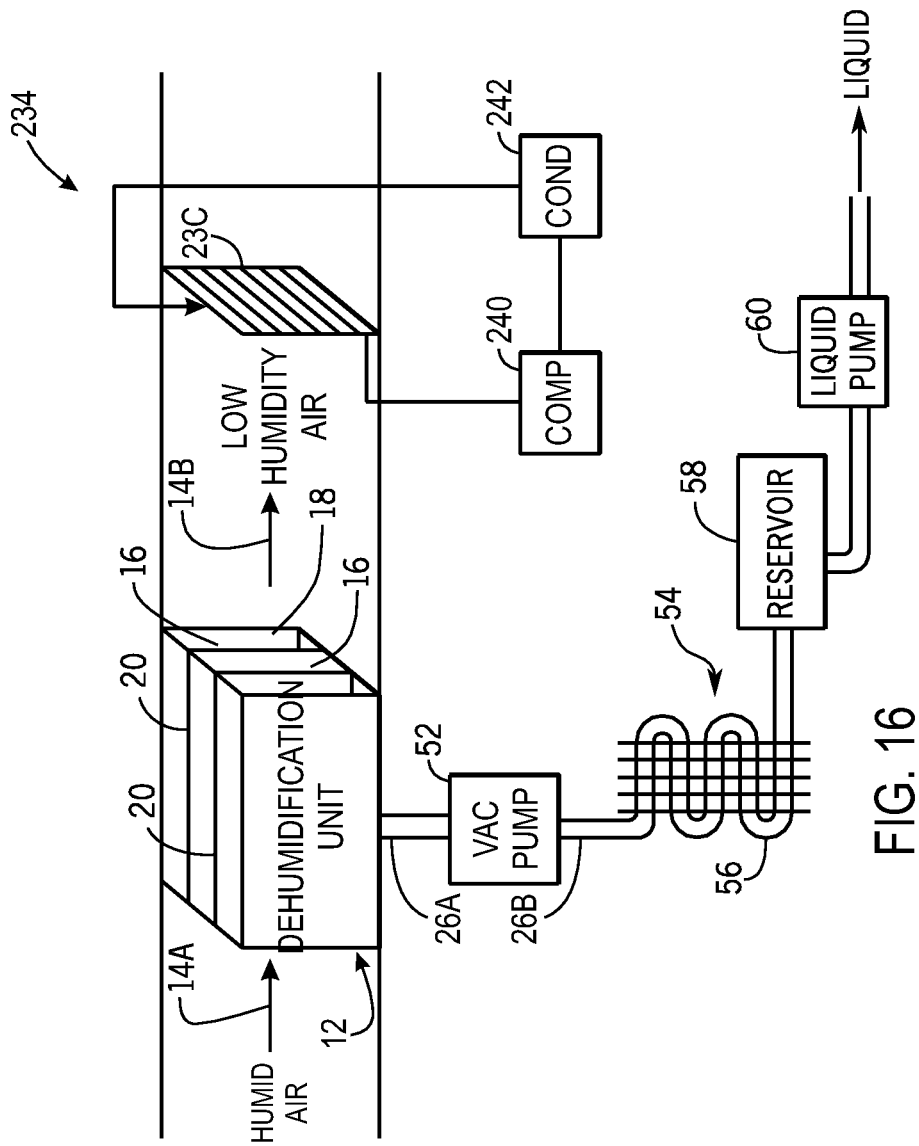
FIG. 16 is a schematic diagram of an HVAC system having a mechanical cooling unit disposed downstream of the dehumidification unit in accordance with an embodiment of the present disclosure.
Figure 17:
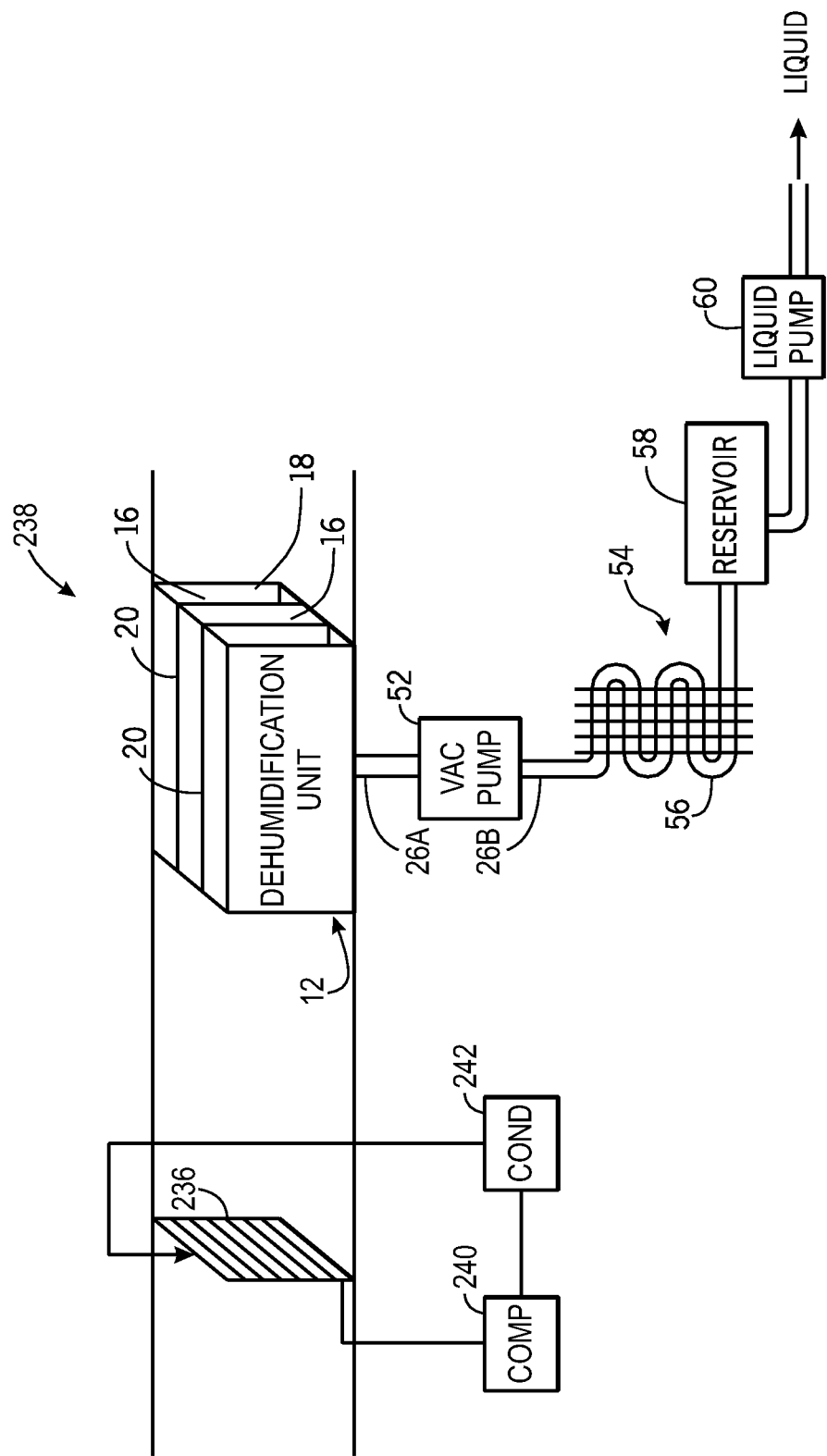
FIG. 17 is a schematic diagram of an HVAC system having the mechanical cooling unit of FIG. 16 disposed upstream of the dehumidification unit in accordance with an embodiment of the present disclosure.

In addition to the embodiments described previously, in other embodiments, one or more of the dehumidification unit 12 described herein may be used in conjunction with one or more mechanical cooling units. For example, FIG. 16 is a schematic diagram of an HVAC system 234 having a mechanical cooling unit 236 disposed downstream of the dehumidification unit 12 in accordance with an embodiment of the present disclosure, and FIG. 17 is a schematic diagram of an HVAC system 238 having the mechanical cooling unit 236 of FIG. 16 disposed upstream of the dehumidification unit 12 in accordance with an embodiment of the present disclosure. In each of these embodiments, the mechanical cooling unit 236 may include components typical for mechanical cooling units 236 such as a compressor 240 (e.g., a variable speed compressor), a condenser 242, and so forth. A refrigerant is recycled through the components to cool the air received from the dehumidification unit 12 (i.e., FIG. 16) or the air delivered to the dehumidification unit (i.e., FIG. 17) to deliver non-latent, sensible compression cooling to the air. Although the embodiments illustrated in FIGS. 16 and 17 illustrate the use of one dehumidification unit 12 and one mechanical cooling unit 236 in series, in other embodiments, any number of the dehumidification units 12 and mechanical cooling units 236 may be used in series, parallel, or some combination thereof (similar to the embodiments described previously). In certain embodiments, one or more dehumidification units 12 may be retrofitted into existing HVAC systems have mechanical cooling units 236.

Figure 18:
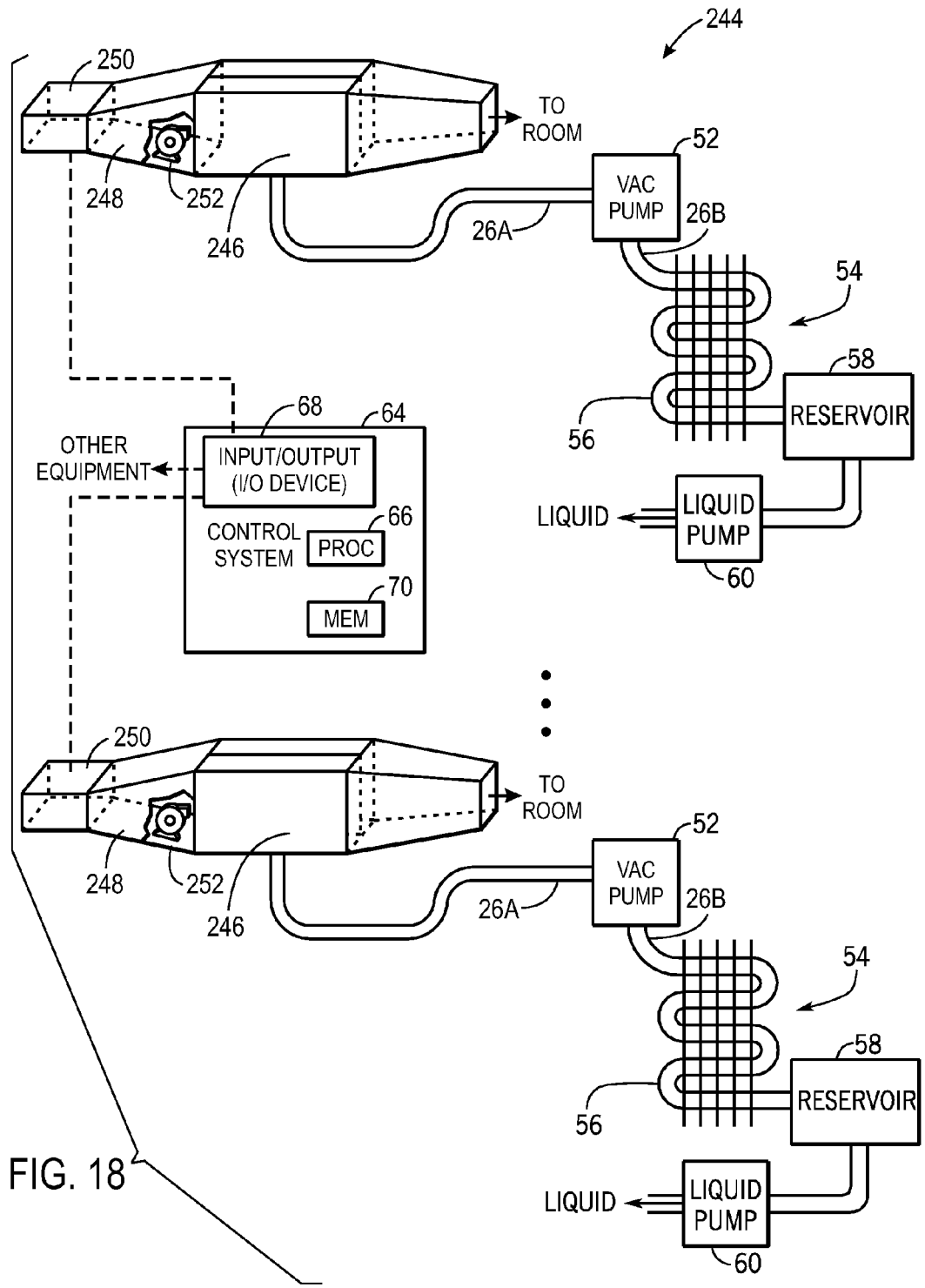
FIG. 18 is a schematic diagram of an HVAC system using mini-dehumidification units in accordance with an embodiment of the present disclosure.

In addition, in certain embodiments, the dehumidification units 12 described herein may be used as distributed dehumidification units 12 that may, for example, be portable and may be retrofitted into existing HVAC systems. For example, FIG. 18 is a schematic diagram of an HVAC system 244 using mini-dehumidification units 246 in accordance with an embodiment of the present disclosure, wherein the mini-dehumidification units 246 include all of the functionality of the dehumidification units 12 described previously. As illustrated, the mini-dehumidification units 246 may be connected to existing ducts 248 of the components 250 of the HVAC system 244 to improve the dehumidification capabilities of the HVAC system 244. In certain embodiments, fans 252 (e.g., variable speed fans) may be used to blow air from the existing HVAC components 250 of the HVAC system 244 into the mini-dehumidification units 246. The mini-dehumidification units 246 may be sized to facilitate coordination with standard components of existing HVAC systems.

In addition, in certain embodiments, the dehumidification units 12 described herein may be modified slightly to use them as enthalpy recovery ventilators (ERVs). For example, in a first ERV embodiment, relatively high humidity air and relatively low humidity air may flow in a counterflow arrangement on opposite sides of an interface 20 (e.g., a water vapor permeable membrane) as described previously. Alternatively, in a second ERV embodiment, relatively high humidity air and relatively low humidity air may flow in a parallel flow arrangement on opposite sides of an interface 20 as described previously. In both of these embodiments, the vacuum pump 52 described previously may not be used. Rather, both humidity and sensible heat may be recovered through transfer between the relatively high humidity air and the relatively low humidity air through the interface 20. In addition, both of the ERV embodiments may have sections inserted between the interface 20 to increase heat transfer between the relatively high humidity air and the relatively low humidity air on opposite sides of the interface 20.

In addition, the ERV embodiments described previously may be combined with other stages to improve the overall performance of the system. For example, in certain embodiments, a single section membrane dehumidification unit 12 with associated vacuum pump 52 and condensation unit 54 (e.g., such as the HVAC system 10 of FIGS. 1, 6, and 7) may be connected upstream or downstream (or both) of one of the ERV embodiments. In other embodiments, a multistage membrane dehumidification unit 12 with associated vacuum pump 52 and condensation unit 54 (e.g., such as the HVAC systems 72, 98, 120 of FIGS. 8 through 10) may be connected upstream or downstream (or both) of one of the ERV embodiments. In other embodiments, a single stage or multi-stage dehumidification unit 12 with associated vacuum pump 52, condensation unit 54, and one or more evaporative cooling units 152 (e.g., such as the HVAC systems 150, 188 of FIGS. 11 and 13) may be connected upstream or downstream (or both) of one of the ERV embodiments. In other embodiments, a single stage or multi-stage membrane dehumidification unit 12 with sensible compression cooling (e.g., such as the HVAC systems 234, 238 of FIGS. 16 and 17) may be connected upstream or downstream (or both) of one of the ERV embodiments.

In addition, in other embodiments, the vacuum pump 52 described previously may be a multi-stage vacuum pump. This multi-stage vacuum pump 52 will make the improved efficiency of the multi-stage HVAC systems 72, 98, 120 of FIGS. 8 through 10 and the evaporative cooling HVAC systems 150, 188 of FIGS. 11 and 13 more readily achievable in practice. In certain embodiments, the multi-stage vacuum pump 52 may be a turbine type vacuum pump that has multiple inlets, such that the multi-stage vacuum pump 52 may suction water vapor 26A into the multi-stage vacuum pump 52 at increasing pressures in a continuous flow process. The flow rate increases as the pressure increases, because additional water vapor 26A is sucked into the multi-stage vacuum pump 52. The multi-stage vacuum pump 52 may be combined with the multi-stage dehumidification units 12 (e.g., dehumidification units 74, 76, 78 of FIG. 8, dehumidification units 100, 102, 104 of FIG. 9, or dehumidification units 124, 126, 130, 132 of FIG. 10). The high pressure end of the turbine in the multi-stage vacuum pump 52 removes moisture from the highest moisture stage, while the lowest pressure stage of the turbine of the multi-stage vacuum pump 52 is coupled to the lowest moisture stage. The controller 64 described previously may be used to control the flow into the various stages. In addition, in certain embodiments, two or more turbines may operate in parallel so that the turbines can have more pressure difference between inlets than may exist between sequential stages. The multi-stage vacuum pump 52 may also be combined with the dehumidification units 12 and evaporative cooling units 152 of FIGS. 11 and 13. In addition, the multi-stage vacuum pump 52 may also be combined with a multi-stage dehumidifier that is followed by a compression cooler to provide sensible cooling (e.g., such as the HVAC systems 234, 238 of FIGS. 16 and 17).

In addition, in certain embodiments, the condensation unit 54 described previously may be replaced with a membrane module, which includes one or more interfaces 20 (e.g., water vapor permeable membranes) similar to those used in the dehumidification units 12 described herein. In these embodiments, the water vapor 26B from the vacuum pump 52 may be directed into the membrane module, where part of the water vapor 26B passes through the interfaces 20 and is rejected to atmosphere, whereas other components in the water vapor 26B are substantially blocked from flowing into a water vapor channel of the membrane module. In addition, in other embodiments, this membrane module may be used in combination with the condensation unit 54.

Figure 19:
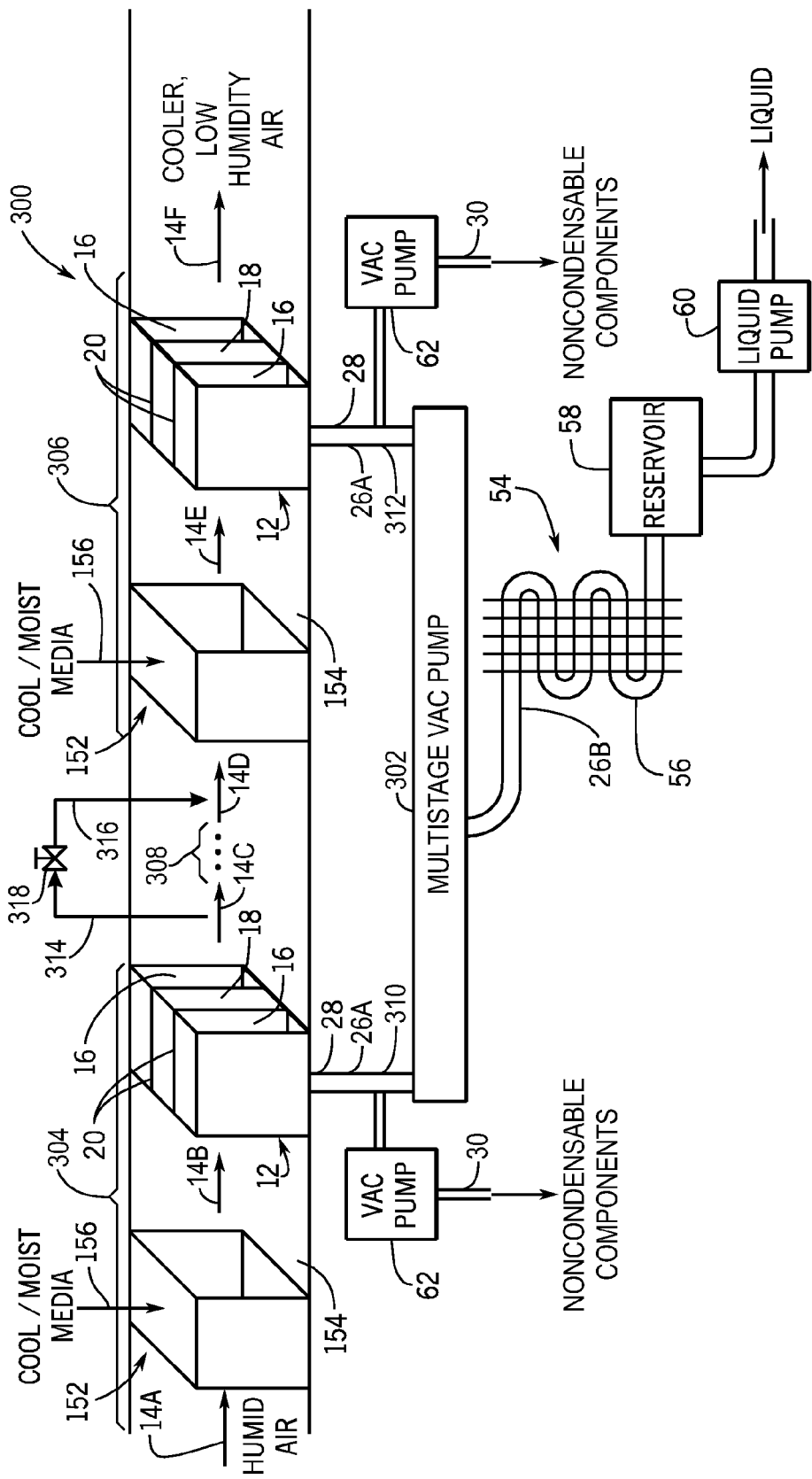
FIG. 19 is a schematic diagram of an HVAC system using multiple cooling and dehumidification stages disposed in series, in accordance with an embodiment of the present disclosure.

Turning now to FIG. 19, the figure is a schematic diagram of an HVAC system 300 including a multi-stage vacuum pump 302 coupled to multiple cooling and dehumidification stages 304 and 306. Although illustrated as having two stages 304 and 306 disposed in series, any number of cooling and dehumidification stages may be used. For example, in other embodiments, 2, 4, 5, 6, 7, 8, 9, 10, or even more dehumidification and cooling stages may be used in series in the HVAC system 300. As illustrated, each stage 304 and 306 includes the evaporative cooling unit 152 disposed upstream of the dehumidification unit 12, in accordance with an embodiment of the present disclosure. The HVAC system 300 of FIG. 19 generally functions the same as the HVAC system 10 of FIGS. 1, 6, and 7 and the HVAC system 150 of FIG. 11. However, as illustrated in FIG. 19, the HVAC system 300 first receives the relatively humid inlet air 14A into the evaporative cooling unit 152. Accordingly, the relatively humid inlet air 14A may first be cooled. The evaporative cooling unit 152 then expels the cooler air 14B into the duct 154. The dehumidification unit 12 then dries the cooler air, and expels cooler dry air 14C into the conditioned space, approximate to a section 308.

As illustrated, the section 308 of the HVAC system 300 may include one more cooling and dehumidification stages, each stage including the evaporative cooling unit 152 disposed upstream of the dehumidification unit 12. Indeed, 2, 3, 4, 5, 6, 7, 8, 9, 10 or more cooling and dehumidification stages may be disposed in the section 308 of the HVAC system. The stages found in section 308 may then further cool and dehumidify the air 14C, resulting in a cooler, drier air 14D. In the depicted embodiment, the air 14D may then be further processed by the final stage 306. That is, the air 14D may first be cooled into a cooler air 14E by the final stage, and then the air 14E may be dehumidified, thus producing a cooler, low humidity air 14F. By providing for multiple stages (each subsequent stage further cooling and dehumidifying the initial air 14A), a cooler, low humidity air 14F may be produced in a more efficient manner. For, example, the single multi-stage vacuum pump 302 may be used to drive the conversion between the air 14A and the air 14F.

In certain embodiments, the multi-stage vacuum pump 302 includes a centrifugal pump (e.g., turbine type vacuum pump) that has multiple inlets 310 and 312. While two inlets 310 and 312 are depicted, 3, 4, 5, 6, 7, 8, 9, 10 or more inlets may be used. As the water vapor passes through the turbine pump 302, the turbine pump 302 can suction vapor at increasing pressures in a continuous flow process. The flow rate increases as the pressure increases because additional vapor is sucked into the turbine pump 302. In other embodiment, the multi-stage vacuum pump may be combined with a multi-stage dehumidifier and the high pressure end of the turbine pump 302 may remove moisture from the highest moisture stage of the multi-stage dehumidifier, while the lowest pressure stage of the turbine is coupled to the lowest moisture stage of the dehumidifier. Additionally, while each of the stages 304 and 306 are depicted as having a single evaporative cooling unit 152 and a single dehumidification unit 12, other stages may have multiple evaporative cooling units 152 and/or multiple dehumidification units 12. Further, in other embodiments, the evaporative cooling unit 152 may be replaced or added to the mechanical cooling unit 236 described in FIG. 16.

As described previously with respect to FIG. 13, each evaporative cooling unit 152 of FIG. 19 may either be a direct evaporative cooling unit or an indirect evaporative cooling unit. In other words, when the evaporative cooling unit 152 uses direct evaporative cooling techniques, the relatively cool and moist media 156 (e.g., relatively cool water) is directly added, for example, to the relatively dry air 14B and 14E. However, when the evaporative cooling unit 152 uses indirect evaporative cooling techniques, the relatively dry air 14B and 14E may, for example, flow across one side of a plate of a heat exchanger while the relatively cool and moist media 156 flows across another side of the plate of the heat exchanger. In other words, generally speaking, some of the relatively cool moisture from the relatively cool and moist media 156 is indirectly added to the relatively dry air 14B and 14E. Whether direct or indirect evaporative cooling techniques are used in the evaporative cooling unit 152 affects the rate of humidity removal and temperature reduction of the air 14 that flows through the HVAC system 300 of FIG. 19. In general, however, each of the dehumidification units 12 initially lowers the humidity ratio at approximately constant temperature, and each of the evaporative cooling unit 152 cools the air 14 to a temperature as low as possible for the particular stage.

As illustrated, many of the components of the HVAC system 300 of FIG. 19 may be considered identical to the components of the HVAC system 10 of FIGS. 1, 6, and 7, the HVAC system 150 of FIG. 11, and the HVAC system 188 of FIG. 13. For example, as described previously, the HVAC system 300 of FIG. 19 includes the condensation unit 54 that receives water vapor 26A, as described previously. In certain embodiments, the HVAC system 300 of FIG. 19 may also include the reservoir 58 for temporary storage of saturated vapor and liquid water. However, as described previously, in other embodiments, no reservoir may be used. In either case, the liquid water from the condensation unit 54 may be directed into the liquid pump 60, within which the pressure of the liquid water from the condensation unit 54 is increased to approximately atmospheric pressure (i.e., approximately 14.7 psia) so that the liquid water may be rejected at ambient conditions. Additionally, or alternatively, a low pressure side may include the vacuum pumps 62 useful in purging noncondensable components.

In certain embodiment, the HVAC system 300 may provide for increased reliability and redundancy by using bypass conduits and valves, such as the depicted conduits 314, 316 (e.g., bypass ducts) and bypass valve 318. In these embodiments, the bypass conduits 314, 316 and valve 318 may bypass certain cooling and dehumidification stages. For example, if it is desired to perform maintenance on the stages disposed in section 308, the bypass valve may be actuated and air 14C may be directed to enter the final stage 306 rather than the stages disposed in section 308. Accordingly, components of the HVAC system 300 may be maintained or replaced without discontinuing cooling and/or dehumidification operations. The valve may be actuated manually, or by using a control system, such as the control system 64 embodiment depicted in FIG. 20. Additionally, the bypass valve 316 may be used to optimize the cooling and drying. For example, the bypass valve 316 may be used to reduce the number of cooling and drying stages in use by the HVAC system 300 when it is desired to lower the cooling and drying capabilities of the HVAC system 300 (e.g., in hot, dry weather). Likewise, the bypass valve 318 may be actuated open (or partially open) in warmer, more humid weather, to include use of the cooling and dehumidification stages disposed in section 308.

Figure 20:
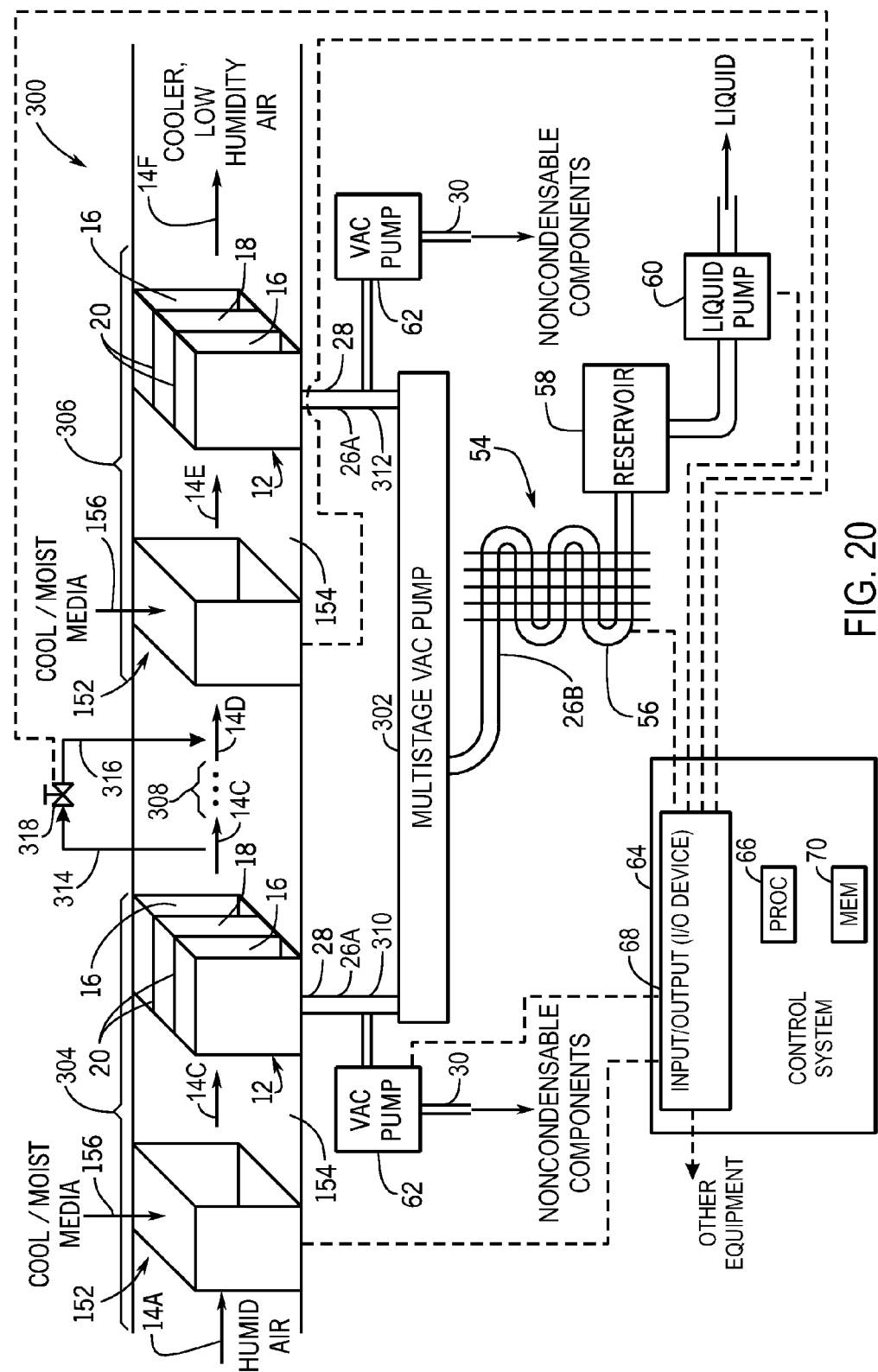
FIG. 20 is a schematic diagram of the HVAC system of FIG. 19, including a control system.

FIG. 20 is a schematic diagram of an HVAC system 300 of FIG. 19 including the control system 64. The control system 64 may be communicatively coupled to various components of the HVAC system 300, including the pumps 60, 62, and 302, the evaporative cooling units 152, and the bypass valve 318. In certain embodiments, the control system 64 may be configured to control the rate of removal of the noncondensable components 30 of the water vapor 26A in the water vapor vacuum volume 28 by turning the vacuum pumps 62 on or off, or by modulating the rate at which the multi-stage vacuum pump 302 removes the noncondensable components 30. More specifically, in certain embodiments, the control system 64 may receive signals from sensors in the water vapor vacuum volume 28 that detect when too many noncondensable components 30 are present in the water vapor 26A contained in the water vapor vacuum volume 28.

The control system 64 may modulate the lower partial pressure of the water vapor 26A in the water vapor vacuum volume 28 of each stage 304 and 306 to modify the water vapor removal capacity and efficiency ratio of the dehumidification units 12. For example, the control system 64 may receive signals from pressure sensors in the water vapor vacuum volumes 28, the water vapor channels 18, as well as signals generated by sensors relating to characteristics (e.g., temperature, pressure, flow rate, relative humidity, and so forth) of the air 14 in the dehumidification units 12, the evaporative cooling units 152, or both units 12 and 152, among other components.

The control system 64 may use this information to determine how to modulate the lower partial pressure of the water vapor 26A in the water vapor vacuum volume 28 to increase or decrease the rate of removal of water vapor 26 from the air channels 16 to the water vapor channels 18 through the interfaces 20 of the dehumidification units 12 as $H_2O$ (i.e., as water molecules, gaseous water vapor, liquid water, adsorbed/desorbed water molecules, absorbed/desorbed water molecules, and so forth, through the interfaces 20). For example, if more water vapor removal is desired, the lower partial pressure of the water vapor 26A in the water vapor vacuum volume 28 may be reduced and, conversely, if less water vapor removal is desired, the lower partial pressure of the water vapor 26A in the water vapor vacuum volume 28 may be increased. Furthermore, as described above, the amount of dehumidification (i.e., water vapor removal) may be cycled to improve the efficiency of the dehumidification units 12. More specifically, under certain operating conditions, the dehumidification units 12 may function more efficiently at higher rates of water vapor removal. As such, in certain embodiments, the dehumidification units 12 may be cycled to remove a maximum amount of water vapor from the air 14 for a period of time (e.g., approximately 1 sec, 10 sec, 100 sec, 10 min), then to remove relatively no water vapor from the air 14 for a period of time (e.g., approximately 1 sec, 10 sec, 100 sec, 10 min), then to remove a maximum amount of water vapor from the air 14 for a period of time (e.g., approximately 1 sec, 10 sec, 100 sec, 10 min), and so forth. In other words, the dehumidification units 12 may be operated at full water vapor removal capacity for periods of time alternating with other periods of time where no water vapor is removed. In one embodiment, modulation of the partial pressure of the water vapor 26A may be accomplished by opening and closing (partially or fully) one or more valves (not shown) disposed on each inlet 310 and 312. Indeed, each inlet 310 and 312 may include one or more valves suitable for controlling flow through the inlet.

Furthermore, the control system 64 may also be configured to control operation of the evaporative cooling units 152. For example, the control system 64 may selectively modulate how much (direct or indirect) evaporative cooling occurs in the evaporating cooling units 152. As an example, valves may be actuated to control the flow rate of the relatively cool and moist media 156 through the evaporative cooling units 152, thereby directly affecting the amount of (direct or indirect) evaporative cooling in the evaporative cooling units 152. In addition, operation of the dehumidification units 12 and the evaporative cooling units 152 may be controlled simultaneously. Furthermore, the control system 64 may be configured to control start-up and shutdown sequencing of the dehumidification units 12 and the evaporative cooling units 152. Indeed, by controlling the several cooling and dehumidification stages 304 and 306, and the multi-stage pump 302 of the HVAC system 300, the control system 64 may enable a more energy efficient, reliable HVAC system 300 suitable for producing cooler, lower humidity air 14F.

It is to be noted that the stage 304 and/or the stage 306 may be replaced by other cooling and/or dehumidification systems. For example, rather than using an evaporative cooling unit, a mechanical cooling unit may be used. Indeed, the HVAC system 300 may include embodiments where a mechanical cooling unit, such as the mechanical cooling unit 236 described above with respect to FIGS. 16 and 17, may replace each of the evaporative cooling units 152 depicted in FIG. 20. In this embodiment, sensible compression cooling may be provided by the mechanical cooling unit 236. Additionally or alternatively, the multi-stage vacuum pump 302 may be used with cooling and dehumidification stages 304 and 306 disposed in parallel, as described in more detail below with respect to FIG. 21. Further, the multi-stage pump 302 may be replaced by multiple single stage pumps (e.g., pumps 52). Additionally, multiple pumps 52 described in all the embodiments herein, may be replaced with a single multi-stage pump 302, each stage of the multi-stage pump 302 corresponding to one of the pumps 52.

Figure 21:
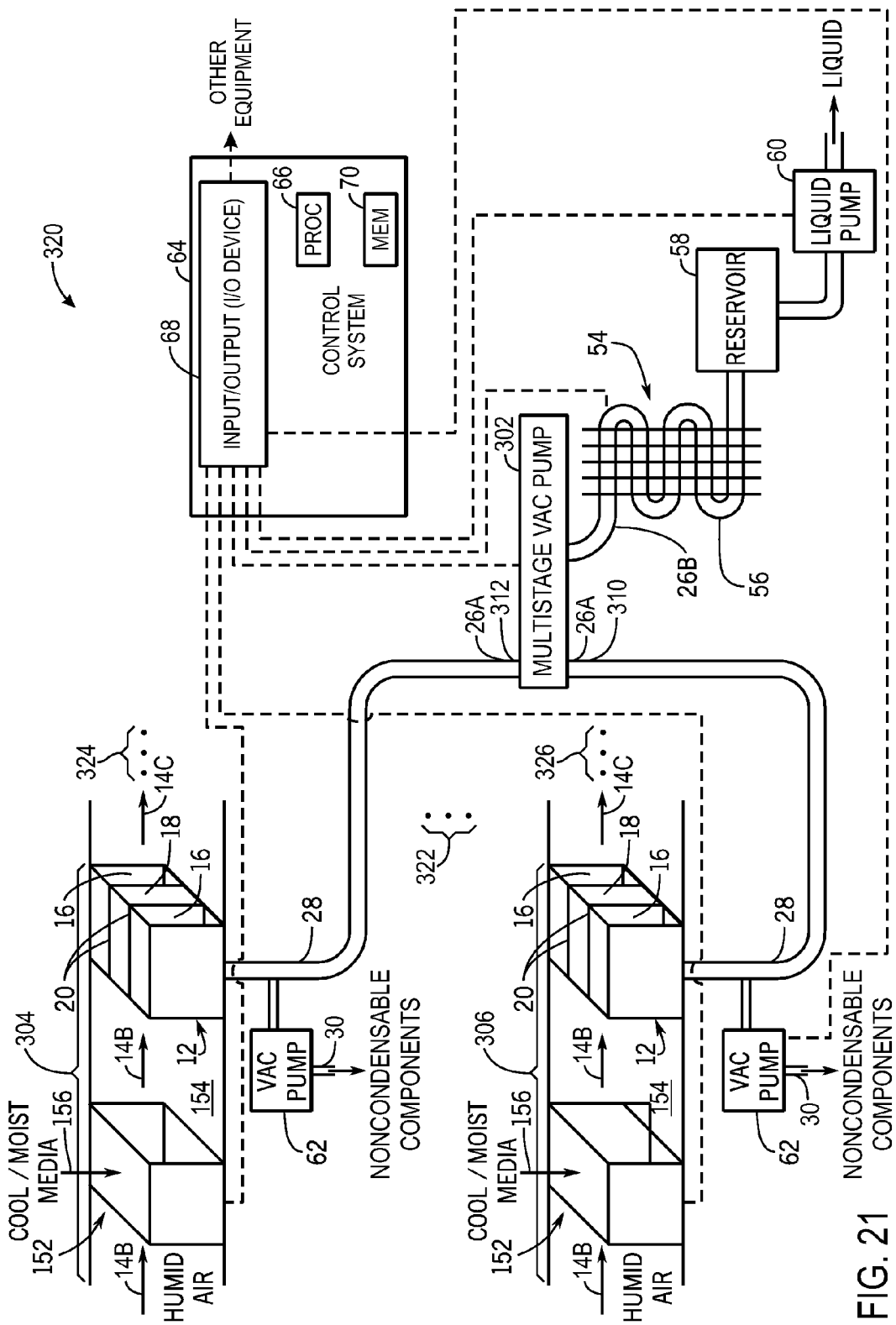
FIG. 21 is a schematic diagram of an HVAC system using multiple cooling and dehumidification stages disposed in parallel and in series, in accordance with an embodiment of the present disclosure.

FIG. 21 is a schematic view illustrating an embodiment of an HVAC system 320 using the multi-stage vacuum pump 302 with the cooling and dehumidification stages 304 and 306 disposed in parallel. Also depicted is a section 322 of the HVAC system 320 that may include one or more cooling and dehumidification stages also disposed in parallel. Indeed, 3, 4, 5, 6, 7, 8, 9, 10 or more cooling and dehumidification stages may be disposed in parallel and connected to the multi-stage vacuum pump 302 having multiple inlets 310 and 312. Additionally, sections 324 and 326 may include further cooling and dehumidification stages disposed in series. Thus the HVAC system 320 may include cooling and dehumidification stages disposed in parallel and in series. In addition, the control system 64 may also be used to control the HVAC system 320.

As illustrated may of the components, including but not limited to the components 152, 12, 62, 54, 58, 302, and 60 may be considered identical to the components of the HVAC system 300 of FIG. 20. For example, as described previously with respect to the HVAC system 300 of FIG. 20, each stage 304 and 306 includes the evaporative cooling unit 152 of FIGS. 19 and 20, which may either be a direct evaporative cooling unit or an indirect evaporative cooling unit that function as described above. The evaporative cooling unit 152 may be disposed upstream of the dehumidification unit 12. Relatively humid inlet air 14A may enter in parallel into the evaporative cooling units 152. The relatively humid inlet air 14A is then first cooled in parallel in each of the evaporative cooling units 152 and expelled as cooler air 14B into the ducts 154. The dehumidification units 12 then reduce the humidity of the air 14B, and expel cooler dry air 14C into the conditioned space. Sections 324 and 326 may include multiple cooling and dehumidification stages suitable for further cooling and drying the air 14C.

In the depicted embodiment, each of the dehumidification units 12 is depicted as fluidly coupled to the inlets 310 and 312 of multi-stage pump 302. Indeed, the multi-stage pump 302 may include a stage and an inlet corresponding to each cooling and dehumidification stage. Therefore, if 2 stages are used, 2 inlets are included, if 4 stages are used, 4 inlets are included, if 10 stages are used, 10 inlets are included, and so on. In the depicted embodiment, the multi-stage pump 402 may be used, for example by the control system 64, to modulate the lower partial pressure of the water vapor 26A in the water vapor vacuum volume 28 of each stage 304 and 306 to modify the water vapor removal capacity and efficiency ratio of the dehumidification units 12. In one example, the water vapor removal capacity and the efficiency ratio of each of the dehumidification units 12 may be approximately similar. In other examples, the water vapor removal capacity and efficiency ratio may be varied between dehumidification units 12, for example, to provide cooler or warmer air, and for drier or more humid air. For example, if more water vapor removal is desired, the lower partial pressure of the water vapor 26A in the water vapor vacuum volume 28 may be reduced and, conversely, if less water vapor removal is desired, the lower partial pressure of the water vapor 26A in the water vapor vacuum volume 28 may be increased. Furthermore, as described above, the amount of dehumidification (i.e., water vapor removal) may be cycled to improve the efficiency of the dehumidification units 12.

The condensation unit 54 receives water vapor 26B having a partial pressure just high enough to facilitate condensation from an outlet of the multi-stage pump 302. In certain embodiments, the HVAC system 320 of FIG. 21 may also include the reservoir 58 for temporary storage of saturated vapor and liquid water. However, as described previously, in other embodiments, no reservoir may be used. In either case, the liquid water from the condensation unit 54 may be directed into the liquid pump 60, within which the pressure of the liquid water from the condensation unit 54 is increased to approximately atmospheric pressure (i.e., approximately 14.7 psia) so that the liquid water may be rejected at ambient conditions. Additionally, or alternatively, a low pressure side may include the vacuum pump 62 useful in purging noncondensable components 30.

Additionally HVAC system's 320 flexibility may be provided by turning on or off certain number of cooling and dehumidification stages. For example, the control system 64 may turn on or off the stage 304 or the stage 306 to provide for differing cooling and/or dehumidification capacities, or for system maintenance. For example, if maintenance on the stage 304 is desired, it may be turned off while the stage 306 is allowed to continue operations. Likewise, stage 306 may be turned off while stage 304 is operating. Additionally, each stage 304 and 306 may be disposed in a different floor or room of a building, thus enabling for multi-zone cooling and dehumidification. Further, the multi-stage vacuum pump may be used to modulate cooling and dehumidification of any stage disposed in parallel, in series, or a combination thereof, thus providing for differing cooling and dehumidification for various zones.

Figure 22:
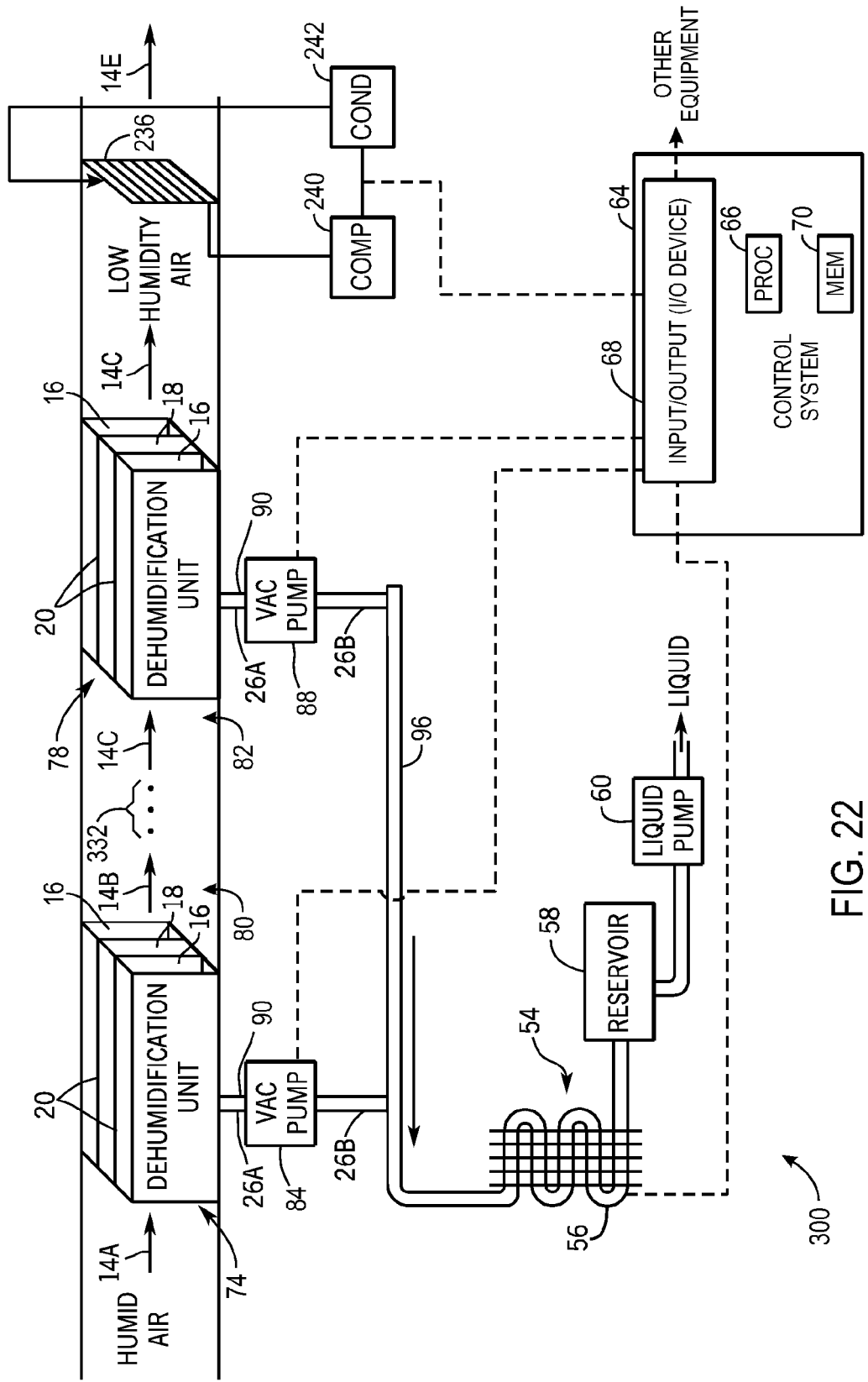
FIG. 22 is a schematic diagram of an HVAC system using multiple dehumidification units disposed in series and fluidly coupled to a cooling system disposed downstream of the multiple dehumidification units, in accordance with an embodiment of the present disclosure.

FIG. 22 is a schematic view illustrating an embodiment of the HVAC system 330 including multiple dehumidification units 74 and 78 disposed in series with the mechanical cooling unit 236 disposed downstream of the dehumidification units 74 and 78. The dehumidification units 74 and 78 are equivalent to the dehumidification unit 12 described above. Also depicted is a section 332 which may include 2, 3, 4, 5, 6, 7, 8, 9, 10 or more dehumidification units disposed in series. Because water vapor is removed from each successive dehumidification unit 74, 78, the partial pressure of water vapor in the air 14 will be gradually reduced at each successive dehumidification unit 74, 78. For example, as described previously, the partial pressure of water vapor in the inlet air 14A may be in the range of approximately 0.2-1.0 psia; the partial pressure of water vapor in the air 14B from the first dehumidification unit 74 may be in the range of approximately 0.17-0.75 psia (accomplishing approximately ⅓ of the drop); the partial pressure of water vapor in the air 14C from a second dehumidification unit (not shown) disposed in section 332 may be in the range of approximately 0.14-0.54 psia (accomplishing approximately the next ⅓ of the drop); and the partial pressure of water vapor in the outlet air 14D from the third dehumidification unit 78 may be in the range of approximately 0.10-0.25 psia, which is consistent with a 60° F. saturation temperature or lower. The very low values may be used to increase capacity for occasional use.

As such, in certain embodiments, the partial pressure of water vapor in the water vapor vacuum volumes 90, 94 (e.g., that are similar in functionality to the water vapor vacuum volume 28 described previously) associated with each respective vacuum pump 84, 88 may be modulated to ensure an optimal flow of water vapor 26A from each respective dehumidification unit 74, 78. For example, the partial pressure of the water vapor 26A in the water vapor vacuum volume 28 described previously may be maintained in a range of approximately 0.15-0.25 psia. However, in the HVAC system 330 of FIG. 22, the partial pressure of the water vapor 26A in the first water vapor vacuum volume 90 may be maintained in a range of approximately 0.15-0.7 psia, the partial pressure of the water vapor 26A in a second water vapor vacuum volume of a single dehumidification unit (not shown) disposed in section 332 may be maintained in a range of approximately 0.12-0.49 psia, and the partial pressure of the water vapor 26A in the third water vapor vacuum volume 94 may be maintained in a range of approximately 0.09-0.24 psia. Regardless, it may be expected that less water vapor 26 will be removed in each successive dehumidification unit 74, 78, and may generally be optimized to minimize energy used to operate the system 330.

In certain embodiments, each of the vacuum pumps 84, 88 may compress the water vapor 26 and direct it into a common manifold 96 having a substantially constant partial pressure of water vapor (i.e., just high enough to facilitate condensation in the condensation unit 54) such that the water vapor 26 flows in a direction opposite to the flow of the air 14. In other embodiments, the water vapor 26 extracted from each successive dehumidification unit 74, 78 may be compressed by its respective vacuum pump 84, 88 and then combined with the water vapor 26 extracted from the next upstream dehumidification unit 74, 78. For example, in other embodiments, the water vapor 26 from the dehumidification unit 78 may be compressed by the third vacuum pump 88 and then combined with the water vapor 26 from the dehumidification unit 74 in the second water vapor vacuum volume 90. In this embodiment, the exhaust side of each successive vacuum pump 84, 88 increases the partial pressure of the water vapor 26 only to the operating pressure of the next upstream vacuum pump 84, 88. In this embodiment, the water vapor 26 compressed by the first vacuum pump 84 will be directed into the condensation unit 54 at a partial pressure of water vapor just high enough to facilitate condensation, thus increasing efficiency.

It should be noted that the specific embodiment illustrated in FIG. 22 having a plurality of dehumidification units 74, 78 arranged in series may be configured in various ways not illustrated in FIG. 22. For example, although illustrated as using a respective vacuum pump 84, 88 with each dehumidification unit 74, 78, in certain embodiments, the single multi-stage vacuum pump 302 described above with respect to FIGS. 19, 20, and 21 may be used with multiple inlet ports 310 and 312 connected to the first, and second water vapor vacuum volumes 90, 94, respectively. In addition, although illustrated as using a single condensation unit 54, reservoir 58, and liquid pump 60 to condense the water vapor 26B into a liquid state, and store and/or transport the liquid water from the HVAC system 330, in other embodiments, each set of dehumidification units 74, 78 and vacuum pumps 84, 88 may be operated independently and be associated with their own respective condensation units 54, reservoirs 58, and liquid pumps 60.

Additionally, the low humidity air 14D may then be cooled by the mechanical cooling unit 236. Alternative or additional to the mechanical cooling unit 236, the evaporative cooling unit 152 described above may be used. In addition, the control system 64 may also be used to control the operation of the HVAC system 330 in a similar manner as described previously with respect to FIGS. 7 and 8. For example, as described previously, the control system 64 may be configured to control the rate of removal of the noncondensable components 30 of the water vapor 26 in the water vapor vacuum volumes 90, 94 by turning the vacuum pumps 84, 88 (or separate vacuum pumps 62, as described previously with respect to FIGS. 7 and 8) on or off, or by modulating the rate at which the vacuum pumps 84, 88 (or separate vacuum pumps 62, as described previously with respect to FIGS. 7 and 8) remove the noncondensable components 30. More specifically, in certain embodiments, the control system 64 may receive signals from sensors in the water vapor vacuum volumes 90, 94 that detect when too many noncondensable components 30 are present in the water vapor 26A contained in the water vapor vacuum volumes 90, 94.

In addition, the control system 64 may modulate the lower partial pressure of the water vapor 26A in the water vapor vacuum volumes 90, 94 to modify the water vapor removal capacity and efficiency ratio of the dehumidification units 74, 78. For example, the control system 64 may receive signals from pressure sensors in the water vapor vacuum volumes 90, 94, the water vapor channels 18, as well as signals generated by sensors relating to characteristics (e.g., temperature, pressure, flow rate, relative humidity, and so forth) of the air 14, among other things. The control system 64 may use this information to determine how to modulate the lower partial pressure of the water vapor 26A in the water vapor vacuum volumes 90, 94 to increase or decrease the rate of removal of water vapor 26 from the air channels 16 to the water vapor channels 18 through the interfaces 20 of the dehumidification units 74, 78 as H₂O (i.e., as water molecules, gaseous water vapor, liquid water, adsorbed/desorbed water molecules, absorbed/desorbed water molecules, and so forth, through the interfaces 20).

For example, if more water vapor removal is desired, the lower partial pressure of the water vapor 26A in the water vapor vacuum volumes 90, 94 may be reduced and, conversely, if less water vapor removal is desired, the lower partial pressure of the water vapor 26A in the water vapor vacuum volumes 90, 94 may be increased. Furthermore, as described above, the amount of dehumidification (i.e., water vapor removal) may be cycled to improve the efficiency of the dehumidification units 74, 78. More specifically, under certain operating conditions, the dehumidification units 74, 78 may function more efficiently at higher rates of water vapor removal. As such, in certain embodiments, the dehumidification units 74, 78 may be cycled to remove a maximum amount of water vapor from the air 14 for a period of time (e.g., approximately 1 sec, 10 sec, 100 sec, 10 min), then to remove relatively no water vapor from the air 14 for a period of time (e.g., approximately 1 sec, 10 sec, 100 sec, 10 min), then to remove a maximum amount of water vapor from the air 14 for a period of time (e.g., approximately 1 sec, 10 sec, 100 sec, 10 min), and so forth. In other words, the dehumidification units 74, 78 may be operated at full water vapor removal capacity for periods of time alternating with other periods of time where no water vapor is removed. Further, the control system 64 may be used to control the mechanical cooling unit 236, for example, by actuating the compressor to increase or decrease compression and cooling. In addition, the control system 64 may be configured to control start-up and shut-down sequencing of the dehumidification units 74, 78, the mechanical cooling unit 236, and the HVAC system 330. While FIG. 22 includes a disposition of the mechanical cooling unit 236 downstream of the dehumidification and cooling units 74, 78, other arrangements are contemplated herein. For example, FIG. 23 depicts an upstream arrangement of the mechanical cooling unit 236.

Figure 23:
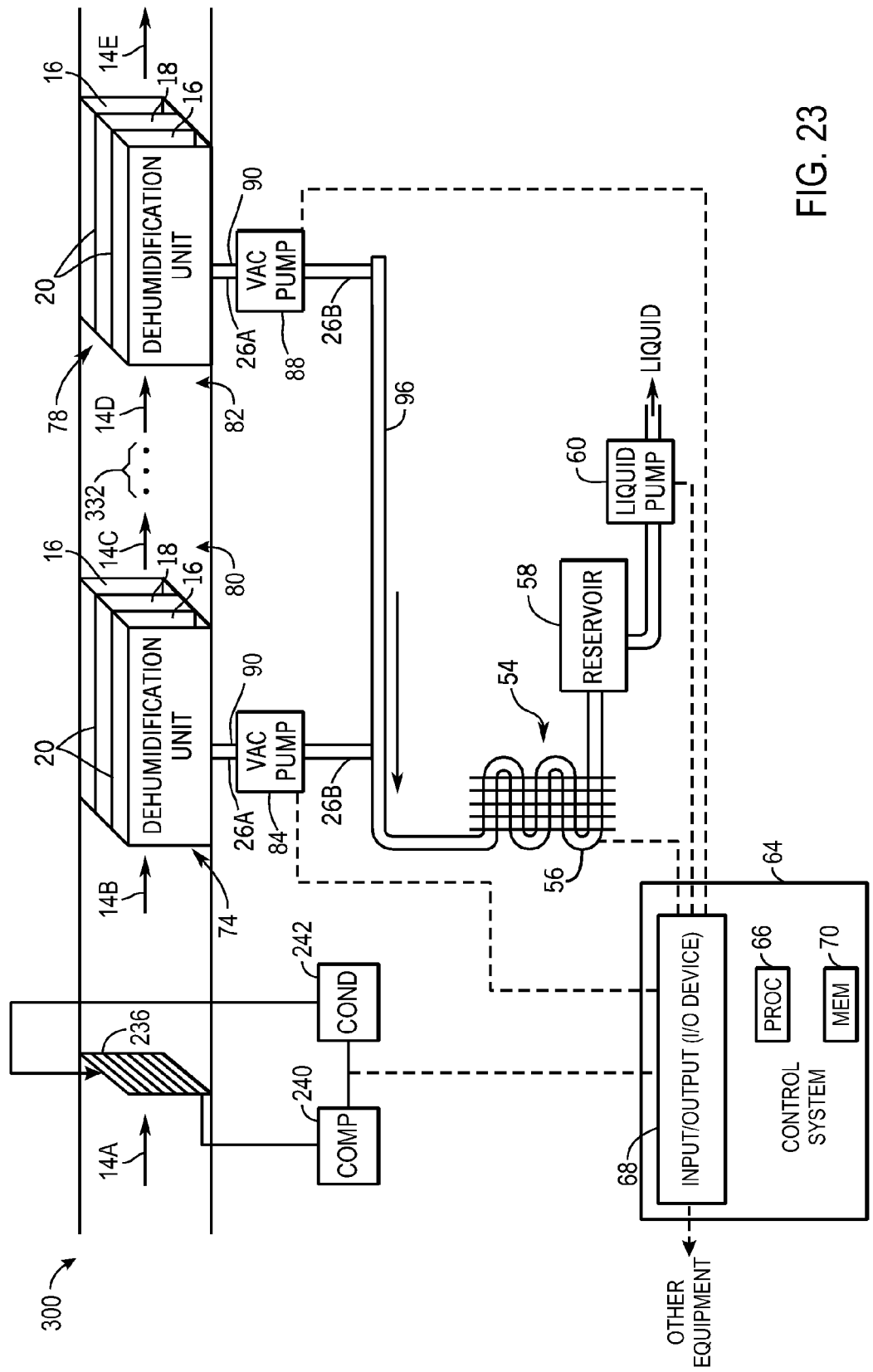
FIG. 23 is a schematic diagram of an HVAC system using multiple dehumidification units disposed in series and fluidly coupled to a cooling system disposed upstream of the multiple dehumidification units, in accordance with an embodiment of the present disclosure.

More specifically, FIG. 23 is schematic view of an embodiment of an HVAC system 334 including the mechanical cooling 236 disposed in series upstream of the dehumidification units 74, 78, and the section 332. Because the figure includes similar elements to FIG. 22, like numbers are used to denote like elements. In the depicted embodiment, hot, humid air 14A enters the mechanical cooling unit 236. The mechanical cooling unit 236 may then cool (and slightly dry) the air 14, resulting in a cooler (and slightly drier) air 14B. The air 14B may then be further dried by the cooling units 74, 78, and the section 332 as described above, to produce the air 14E having a drier state when compared to the air 14B. Additionally, the control system 64 may also be configured to control start-up and shutdown sequencing of the dehumidification units 74, 78, the mechanical cooling unit 236, and the HVAC system 334. Additional or alternative to the mechanical cooling unit 236, the evaporative cooling unit 152 may be provided, thus enhancing the cooling abilities of the HVAC system 334.

Figure 24:
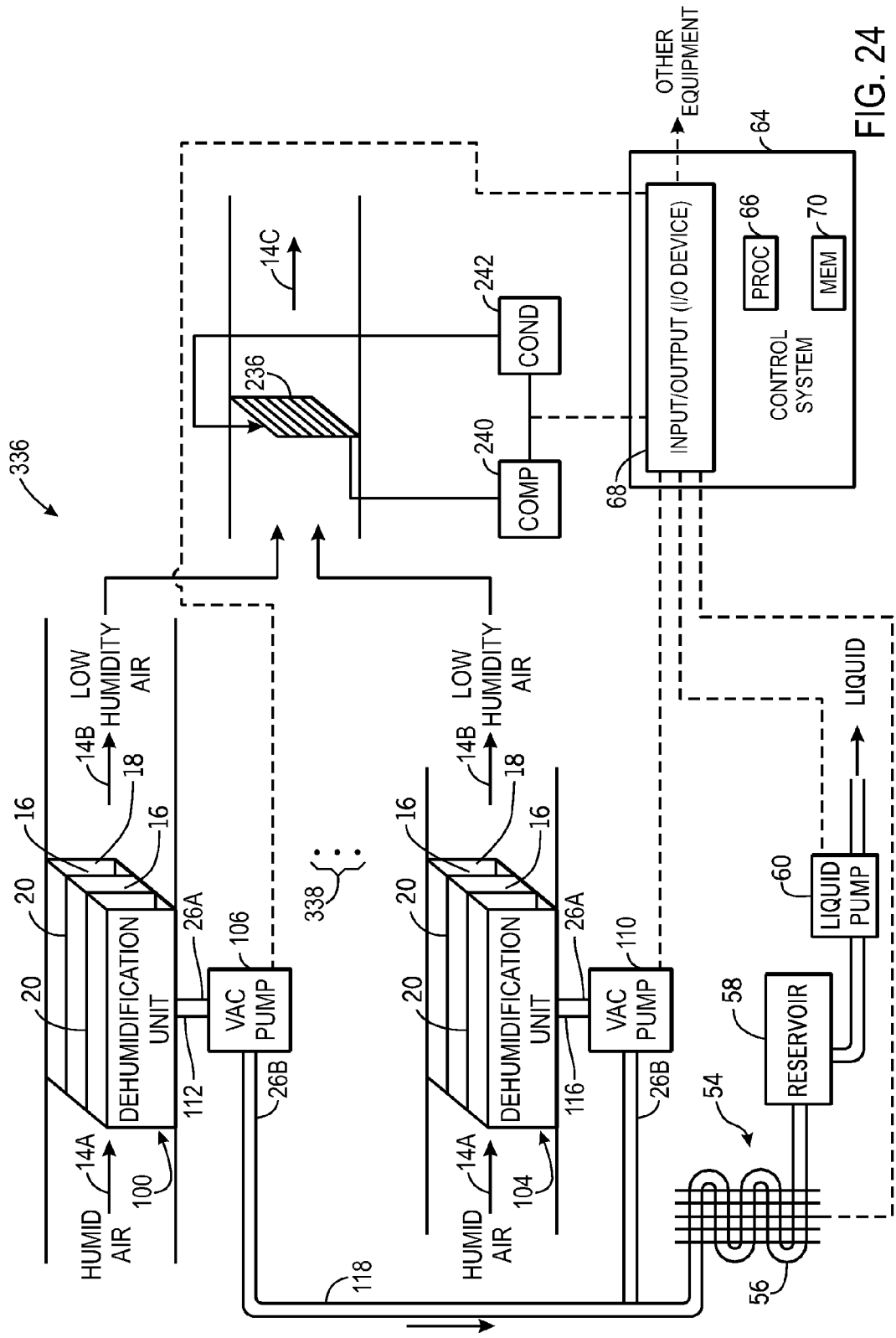
FIG. 24 is a schematic diagram of an HVAC system using multiple dehumidification units disposed in parallel and fluidly coupled to a cooling system disposed downstream of the multiple dehumidification units, in accordance with an embodiment of the present disclosure.

While FIG. 23 includes a serial arrangement of multiple dehumidification units 74, 78, present embodiments include other ways in which multiple dehumidification units 74, 78 may be arranged in a single HVAC system. For example, FIG. 24 depicts a parallel arrangement of the dehumidification units 100 and 104. More specifically, FIG. 24 is a schematic view of an embodiment of an HVAC system 336 including the dehumidification units 100, 104 disposed in parallel, and the mechanical cooling unit 236 disposed downstream from the dehumidification units 100, 104. Each of the dehumidification units 100, 104 is substantially the same as the dehumidification unit 12. Although illustrated as having two dehumidification units 100, 104 in parallel, any number of dehumidification units may indeed be used in parallel in the HVAC system 336. For example, in other embodiments, 2, 4, 5, 6, 7, 8, 9, 10, or even more dehumidification units may be used in parallel in the HVAC system 336. For example, a section 338 may be used to dispose additional dehumidification units in parallel.

The HVAC system 336 of FIG. 24 generally functions the same as the HVAC system 10 of FIGS. 1, 6, and 7 and the HVAC system 98 of FIG. 9, but with the addition of a single mechanical cooling unit 236. It is to be understood that, in other embodiments, each of the dehumidification units 100, 104 may include a corresponding mechanical cooling unit 236. As illustrated in FIG. 24, each dehumidification unit 100, 104 of the HVAC system 336 receives the inlet air 14A having a relatively high humidity and expels the outlet air 14B having a relatively low humidity. As illustrated, many of the components of the HVAC system 336 of FIG. 24 may be considered identical to the components of the HVAC system 10 of FIGS. 1, 6, and 7, the HVAC system 98 of FIG. 9, and the HVAC system 334 of FIG. 23. For example, the dehumidification units 100, 104 of the HVAC system 336 of FIG. 24 may be considered identical to the dehumidification units 12 of FIGS. 1, 6, and 7. In addition, the HVAC system 336 of FIG. 24 also includes the condensation unit 54 that receives water vapor 26B having a partial pressure just high enough to facilitate condensation, as described previously. In certain embodiments, the HVAC system 336 of FIG. 24 may also include the reservoir 58 for temporary storage of saturated vapor and liquid water. However, as described previously, in other embodiments, no reservoir may be used. In either case, the liquid water from the condensation unit 54 may be directed into the liquid pump 60, within which the pressure of the liquid water from the condensation unit 54 is increased to approximately atmospheric pressure (i.e., approximately 14.7 psia) so that the liquid water may be rejected at ambient conditions.

As illustrated in FIG. 24, in certain embodiments, each dehumidification unit 100, 104 may be associated with a respective vacuum pump 106, 110, each of which is similar in functionality to the vacuum pump 52 of FIGS. 1, 6, and 7. However, as opposed to the HVAC system 334 of FIG. 23, because the dehumidification units 100, 104 and associated vacuum pumps 106, 110 are arranged in parallel, the partial pressure of water vapor in the air 14 will be approximately the same in each dehumidification unit 100, 104. As such, in general, the partial pressure of water vapor in the water vapor vacuum volumes 112, 116 associated with each respective vacuum pump 106, 110 will also be approximately the same. For example, as described previously with respect to the HVAC system 10 of FIGS. 1, 6, and 7, the partial pressure of the water vapor 26A in the water vapor vacuum volumes 112, 116 may be maintained in a range of approximately 0.10-0.25 psia.

As illustrated in FIG. 24, in certain embodiments, each of the vacuum pumps 106, 110 may compress the water vapor 26 and direct it into a common manifold 118 having a substantially constant partial pressure of water vapor (i.e., just high enough to facilitate condensation in the condensation unit 54). In other embodiments, the water vapor 26 extracted from each successive dehumidification unit 100, 104 (i.e., from top to bottom) may be compressed by its respective vacuum pump 106, 110 and then combined with the water vapor 26 extracted from the next downstream (i.e., with respect to the common manifold) dehumidification unit 100, 104. For example, in other embodiments, the water vapor 26 from the first dehumidification unit 100 may be compressed by the first vacuum pump 106 and then combined with the water vapor 26 from the second dehumidification unit 104 in the second water vapor vacuum volume 116. In this embodiment, the exhaust side of each successive vacuum pump 106, 110 increases the partial pressure of the water vapor 26 only to the operating pressure of the next downstream vacuum pump 106, 110. For example, the first vacuum pump 106 may only increase the pressure of the water vapor 26 to approximately 0.2 psia if the partial pressure of water vapor in the second water vapor vacuum volume 116 is approximately 0.2 psia. In this embodiment, the water vapor 26 compressed by the vacuum pump 110 will be directed into the condensation unit 54 at a partial pressure of water vapor just high enough to facilitate condensation.

It should be noted that the specific embodiment illustrated in FIG. 24 having a plurality of dehumidification units 100, 104 arranged in parallel may be configured in various ways not illustrated in FIG. 24. For example, although illustrated as using a respective vacuum pump 106, 110 with each dehumidification unit 100, 104, in certain embodiments, the single multi-stage vacuum pump 302 may be used with multiple inlet ports 310, 312 connected to the first and second water vapor vacuum volumes 112, 116. In addition, although illustrated as using a single condensation unit 54, reservoir 58, and liquid pump 60 to condense the water vapor 26B into a liquid state, and store and/or transport the liquid water from the HVAC system 336, in other embodiments, each set of dehumidification units 100, 104 and vacuum pumps 106, 110 may be operated independently and be associated with their own respective condensation units 54, reservoirs 58, and liquid pumps 60.

In addition, the control system 64 may also be used in the HVAC system 336 of FIG. 24 to control the operation of the HVAC system 336 in a similar manner as described previously with respect to FIG. 9. For example, as described previously, the control system 64 may be configured to control the rate of removal of the noncondensable components 30 of the water vapor 26A in the water vapor vacuum volumes 112, 116 by turning the vacuum pumps 106, 110 (or separate vacuum pumps 62, as described previously with respect to FIGS. 7 and 9) on or off, or by modulating the rate at which the vacuum pumps 106, 110 (or separate vacuum pumps 62, as described previously with respect to FIGS. 7 and 9) remove the noncondensable components 30. More specifically, in certain embodiments, the control system 64 may receive signals from sensors in the water vapor vacuum volumes 112, 116 that detect when too many noncondensable components 30 are present in the water vapor 26A contained in the water vapor vacuum volumes 112, 116.

In addition, the control system 64 may modulate the lower partial pressure of the water vapor 26A in the water vapor vacuum volumes 112, 116 to modify the water vapor removal capacity and efficiency ratio of the dehumidification units 100, 104. For example, the control system 64 may receive signals from pressure sensors in the water vapor vacuum volumes 112, 116, the water vapor channels 18, as well as signals generated by sensors relating to characteristics (e.g., temperature, pressure, flow rate, relative humidity, and so forth) of the air 14, among other things. The control system 64 may use this information to determine how to modulate the lower partial pressure of the water vapor 26A in the water vapor vacuum volumes 112, 116 to increase or decrease the rate of removal of water vapor 26 from the air channels 16 to the water vapor channels 18 through the interfaces 20 of the dehumidification units 100, 102, 104 as $H_2O$ (i.e., as water molecules, gaseous water vapor, liquid water, adsorbed/desorbed water molecules, absorbed/desorbed water molecules, and so forth, through the interfaces 20).

For example, if more water vapor removal is desired, the lower partial pressure of the water vapor 26A in the water vapor vacuum volumes 112, 116 may be reduced and, conversely, if less water vapor removal is desired, the lower partial pressure of the water vapor 26A in the water vapor vacuum volumes 112, 116 may be increased. Furthermore, as described above, the amount of dehumidification (i.e., water vapor removal) may be cycled to improve the efficiency of the dehumidification units 100, 104. More specifically, under certain operating conditions, the dehumidification units 100, 104 may function more efficiently at higher rates of water vapor removal. As such, in certain embodiments, the dehumidification units 100, 104 may be cycled to remove a maximum amount of water vapor from the air 14 for a period of time (e.g., approximately 1 sec, 10 sec, 100 sec, 10 min), then to remove relatively no water vapor from the air 14 for a period of time (e.g., approximately 1 sec, 10 sec, 100 sec, 10 min), then to remove a maximum amount of water vapor from the air 14 for a v (e.g., approximately 1 sec, 10 sec, 100 sec, 10 min), and so forth. In other words, the dehumidification units 100, 104 may be operated at full water vapor removal capacity for periods of time alternating with other periods of time where no water vapor is removed. In addition, the control system 64 may be configured to control start-up and shut-down sequencing of the dehumidification units 100, 104, the mechanical cooling unit 236, and the HVAC system 336.

Figure 25:
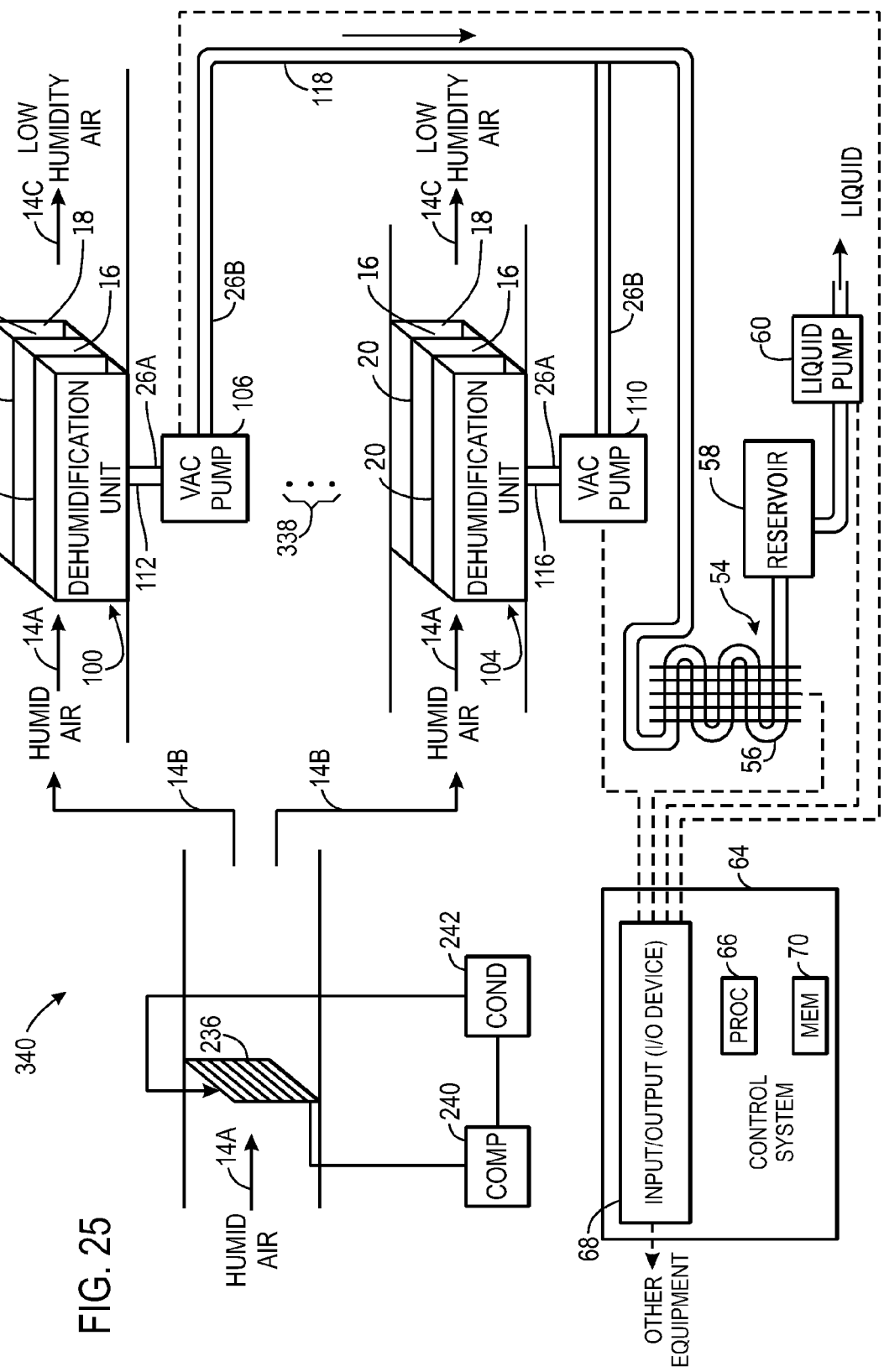
FIG. 25 is a schematic diagram of an HVAC system using multiple dehumidification units disposed in parallel and fluidly coupled to a cooling system disposed upstream of the multiple dehumidification units, in accordance with an embodiment of the present disclosure.

While FIG. 24 includes a disposition of the mechanical cooling unit 236 downstream of the dehumidification and cooling units 100, 104, other arrangements are contemplated herein. For example, FIG. 25 depicts an upstream arrangement of the mechanical cooling unit 236. More specifically, FIG. 25 is schematic view of an embodiment of an HVAC system 340 including the mechanical cooling 236 disposed in series upstream of the dehumidification units 100, 104, and the section 338. Because the figure includes similar elements to FIG. 24, like numbers are used to denote like elements. In the depicted embodiment, hot, humid air 14A enters the mechanical cooling unit 236. The mechanical cooling unit 236 may then cool (and slightly dry) the air 14, resulting in a cooler (and slightly drier) air 14B. The air 14B may then be further dried by the cooling units 100, 104 and the section 338 as described above, to produce the air 14C having a drier state when compared to the air 14B. Additionally, the control system 64 may also be configured to control start-up and shut-down sequencing of the dehumidification units 100, 104, the mechanical cooling unit 236, and the HVAC system 340. Additional or alternative to the mechanical cooling unit 236, the evaporative cooling unit 152 may be provided, thus enhancing the cooling abilities of the HVAC system 340.

Figure 26:
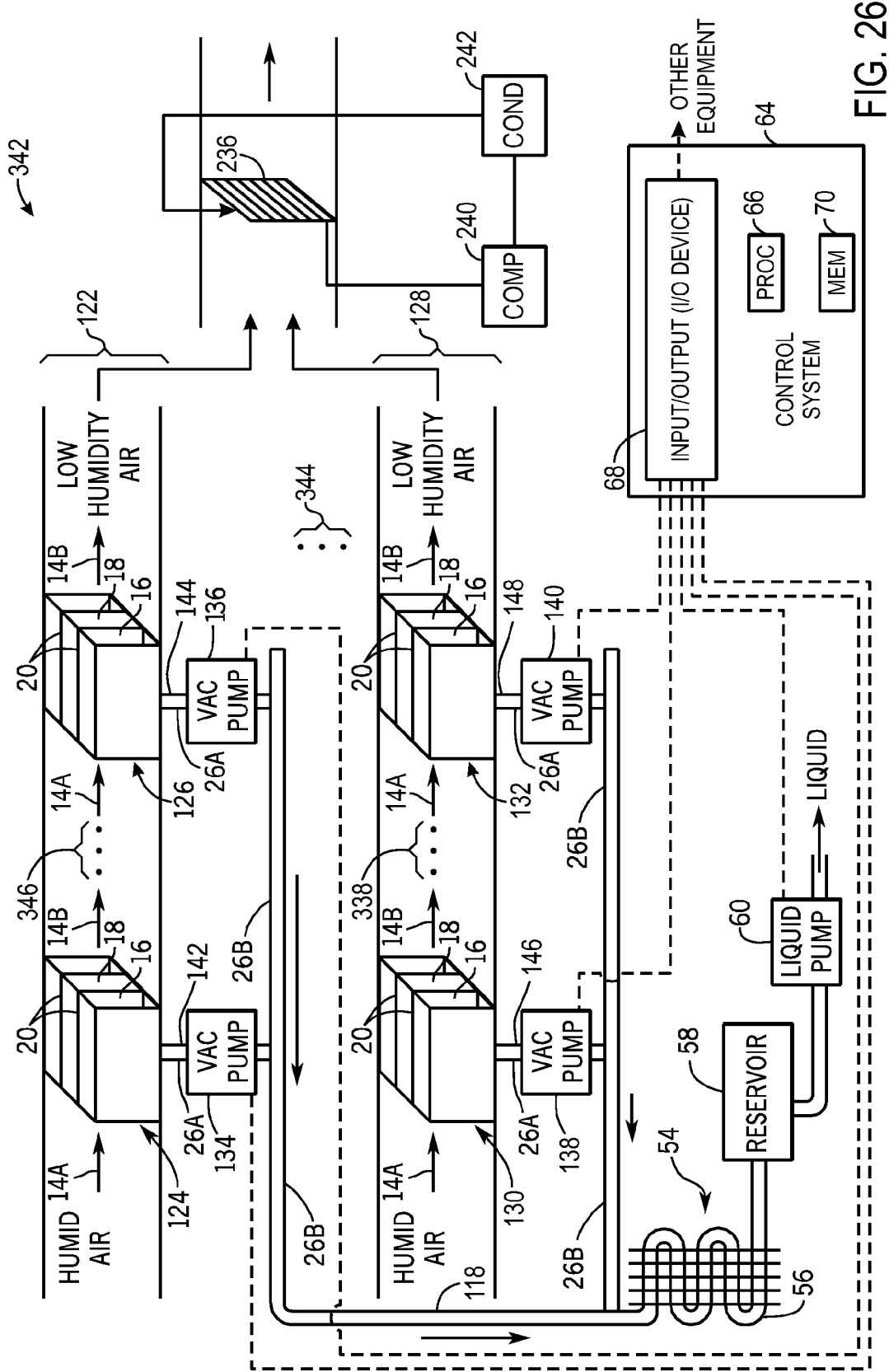
FIG. 26 is a schematic diagram of an HVAC system using multiple dehumidification units disposed in parallel and in series and fluidly coupled to a cooling system disposed downstream of the multiple dehumidification units, in accordance with an embodiment of the present disclosure.

In addition to the serial arrangement of dehumidification units 74, 78 illustrated in FIGS. 22 and 23, and the parallel arrangement of dehumidification units 100, 104 illustrated in FIGS. 24 and 25, multiple dehumidification units may be used in other ways. Indeed, much more complex and expansive arrangements may also be used. For example, FIG. 26 is a schematic diagram of an HVAC system 342 having a first set 122 of dehumidification units (i.e., a first dehumidification unit 124 and a second dehumidification unit 126) arranged in series, and a second set 128 of dehumidification units (i.e., a third dehumidification unit 130 and a fourth dehumidification unit 132) also arranged in series, with the first and second sets 122, 128 of dehumidification units arranged in parallel in accordance with an embodiment of the present disclosure. Additionally, a section 344 may be used to dispose further dehumidification units in series and in parallel. In other words, the first set 122 of serial first and second dehumidification units 124, 126 are arranged in parallel with the second set 128 of serial third and fourth dehumidification units 130, 132. The dehumidification units 124, 126, 130, and 132 are functionally equivalent to the dehumidification unit 12 described above.

Although illustrated as having two sets 122, 128 of serial dehumidification units 12 arranged in parallel, any number of parallel pluralities of dehumidification units 12 may indeed be used in the HVAC system 342. For example, in other embodiments, 3, 4, 5, 6, 7, 8, 9, 10, or even more parallel sets of dehumidification units may be used in the HVAC system 342. Similarly, although illustrated as having two dehumidification units arranged in series within each set 122, 128 of dehumidification units, any number of dehumidification units may indeed be used in series within each set 122, 128 of dehumidification units 12 in the HVAC system 342. For example, in other embodiments, 1, 3, 4, 5, 6, 7, 8, 9, 10, or even more dehumidification units may be used in series within each set 122, 128 of dehumidification units 12 in the HVAC system 342, such as dehumidification units disposed in sections 346 and 348.

Substantially all of the operating characteristics of the HVAC system 342 of FIG. 26 are similar to those described previously with respect to the HVAC systems described in FIGS. 22-25. For example, as illustrated, each of the dehumidification units 124, 126, 130, 132 may be associated with its own respective vacuum pump 134, 136, 138, 140 (e.g., similar to the vacuum pump 52 of FIGS. 1, 6, and 7). However, in other embodiments, one multi-stage vacuum pump 302 may be used for each set 122, 128 of dehumidification units with multiple inlet ports connected to the respective water vapor vacuum volumes 142, 144, 146, 148. Indeed, in other embodiments, all of the dehumidification units 124, 126, 130, 132 may be associated with the single multi-stage vacuum pump 302 with multiple inlet ports connected to all of the water vapor vacuum volumes 142, 144, 146, 148.

In addition, although illustrated as using a single condensation unit 54, reservoir 58, and liquid pump 60 to condense the water vapor 26B into a liquid state, and store and/or transport the liquid water from the HVAC system 342, in other embodiments, each set of dehumidification units 124, 126, 130, 132 and vacuum pumps 134, 136, 138, 140 may be operated independently and be associated with their own respective condensation units 54, reservoirs 58, and liquid pumps 60. In addition, the control system 64 described previously may also be used in the HVAC system 342 of FIG. 26 to control operation of the HVAC system 342 in a similar manner as described previously.

The embodiments described previously with respect to FIGS. 19 through 26 are slightly more complex than the embodiments described previously with respect to FIGS. 1 through 7 inasmuch as multiple dehumidification units are used in series, parallel, or some combination thereof. As such, the control of pressures and temperatures of the HVAC systems of FIGS. 19 through 26 are slightly more complicated than the control of a single dehumidification unit 12. For example, the partial pressures in the water vapor vacuum volumes may need to be closely monitored and modulated by the control system 64 to take into account variations in temperature and partial pressure of water vapor in the air 14 within the respective dehumidification units 12, operating pressures of adjacent water vapor vacuum volumes and vacuum pumps (which may be cross-piped together as described previously to facilitate control of pressures, flows, and so forth), among other things. In certain embodiments, variable or fixed orifices may be used to control pressures and changes in pressures in and between the dehumidification units 12. In addition, as described previously, each of the respective vacuum pumps may be controlled to adjust the partial pressures of water vapor in the water vapor vacuum volumes to account for variations between dehumidification units 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A dehumidification system for removing water vapor from an airstream, comprising:
   at least one cooling unit configured to cool air;
   a plurality of dehumidification units fluidly coupled to the cooling unit, each dehumidification unit comprising a first and second channel separated by a membrane, wherein the membrane is configured to facilitate removal of water vapor from an airstream flowing through the first channel by facilitating passage of $H_2O$ from the first channel to the second channel through permeable volumes of the membrane while substantially blocking all other components of the airstream from passing through the membrane;
   at least one pressure increasing device configured to create a lower partial pressure of water vapor within the second channels than in the first channels, such that the $H_2O$ moves through the membranes to the second channels, wherein the at least one pressure increasing device is also configured to increase the pressure of water vapor at an outlet of the at least one pressure increasing device to a partial pressure of water vapor in a range suitable for subsequent condensing into liquid water;
   at least one condensation device configured to receive the water vapor from the at least one pressure increasing device and condense the water vapor into liquid water; and
   at least one water transport device configured to transport the liquid water from the at least one condensation device.

2. The system of claim 1, wherein the plurality of dehumidification units are arranged in series with each other such that the airstream flows through the first channel of each dehumidification unit in series.

3. The system of claim 1, wherein the plurality of dehumidification units are arranged in parallel with each other such that the airstream flows through the first channel of only one dehumidification unit in parallel.

4. The system of claim 1, wherein a first set of the plurality of dehumidification units is arranged in series with each other, a second set of the plurality of dehumidification units is arranged in series with each other, and the first and second set of the plurality of dehumidification units are arranged in parallel with each other.

5. The system of claim 1, wherein the at least one cooling unit comprises a mechanical cooling unit, an evaporative cooling unit, or a combination thereof.

6. The system of claim 1, wherein the at least one cooling unit is disposed upstream of the plurality of dehumidification units, downstream of the plurality of dehumidification units, or a combination thereof.

7. The system of claim 1, wherein each of the plurality of dehumidification units delivers water vapor from the second channel to the same pressure increasing device.

8. The system of claim 1, wherein each of the plurality of dehumidification units delivers water vapor from the second channel to a respective pressure increasing device associated therewith.

9. The system of claim 1, wherein a controller is configured to increase efficiency of the operation of the dehumidification system by substantially reducing an energy use.

10. The system of claim 9, wherein the at least one pressure increasing device comprises a vacuum pump, and wherein the controller is configured to substantially reduce the energy use by substantially reducing a pump energy used to drive the vacuum pump.

11. A system, comprising:
a dehumidification system for removing $H_2O$ vapor from an airstream, comprising:
at least one cooling unit configured to cool air;
a plurality of dehumidification units fluidly coupled to the at least one cooling unit, each dehumidification unit comprising an air channel configured to receive an inlet airstream and discharge an outlet airstream, and an $H_2O$ permeable barrier adjacent to the air channel, wherein the $H_2O$ permeable barrier is configured to selectively enable $H_2O$ from $H_2O$ vapor in the inlet airstream to pass through the $H_2O$ permeable barrier to a suction side of the $H_2O$ permeable barrier and substantially block other components in the inlet airstream from passing through the $H_2O$ permeable barrier to the suction side of the $H_2O$ permeable barrier; and
at least one pressure increasing device configured to create a lower partial pressure of $H_2O$ vapor on the suction sides of the $H_2O$ permeable barriers than the partial pressure of the $H_2O$ vapor in the inlet airstreams to drive passage of the $H_2O$ from the $H_2O$ vapor in the inlet airstream through the $H_2O$ permeable barrier, and to increase the pressure at an outlet of the at least one pressure increasing device to a partial pressure of $H_2O$ vapor suitable for condensing $H_2O$ vapor into liquid $H_2O$, wherein a first set of the plurality of dehumidification units is arranged in series with each other, a second set of the plurality of dehumidification units is arranged in series with each other, and the first and second set of the plurality of dehumidification units are arranged in parallel with each other.

12. The system of claim 11, wherein the dehumidification system comprises at least one condensation device configured to receive the $H_2O$ vapor from the outlet of the at least one pressure increasing device, and to condense the $H_2O$ vapor into liquid $H_2O$.

13. The system of claim 12, wherein the dehumidification system comprises at least one device configured to adjust a pressure of the liquid $H_2O$ from the at least one condensation device to an ambient pressure.

14. The system of claim 11, wherein the dehumidification system comprises at least one membrane water vapor rejection device configured to receive the $H_2O$ vapor from the outlet of the at least one pressure increasing device, and to reject the $H_2O$ vapor into an ambient air.

15. The system of claim 11, wherein the plurality of dehumidification units are arranged in series with each other such that the airstream flows through the air channel of each dehumidification unit in series.

16. The system of claim 11, wherein the plurality of dehumidification units are arranged in parallel with each other such that the airstream flows through the air channel of only one dehumidification unit in parallel.

17. The system of claim 11, wherein the $H_2O$ permeable barriers comprise zeolite.

18. A method, comprising:
receiving a plurality of airstreams including $H_2O$ vapor into air channels of a plurality of dehumidification units, wherein the airstreams have a first partial pressure of $H_2O$ vapor;
suctioning $H_2O$ into $H_2O$ vapor channels of the plurality of dehumidification units through $H_2O$ permeable materials of the plurality of dehumidification units using pressure differentials across the $H_2O$ permeable materials, wherein the $H_2O$ vapor channels have a second partial pressure of $H_2O$ vapor lower than the first partial pressure of $H_2O$ vapor of the airstreams;
receiving $H_2O$ vapor from the $H_2O$ vapor channels into a pressure increasing device and increasing the pressure of the $H_2O$ vapor from the pressure increasing device to a third partial pressure of $H_2O$ vapor that is higher than the second partial pressure of $H_2O$ vapor;
receiving the $H_2O$ vapor from the pressure increasing device into a condensation device and condensing the $H_2O$ vapor into liquid $H_2O$;
transporting the liquid $H_2O$ from the condensation device to ambient conditions; and
cooling the airstreams by using at least one cooling unit.

19. The method of claim 18, comprising receiving the plurality of airstreams including $H_2O$ vapor into air channels of the plurality of dehumidification units arranged in series with each other such that the airstreams flow through the air channels of each dehumidification unit in series.

20. The method of claim 18, comprising receiving the plurality of airstreams including $H_2O$ vapor into air channels of the plurality of dehumidification units arranged in parallel with each other such that each of the airstreams flow through the air channel of only one dehumidification unit in parallel.

21. The method of claim 18, comprising receiving the plurality of airstreams including $H_2O$ vapor into air channels of a first set of the plurality of dehumidification units arranged in series with each other, and a second set of the plurality of dehumidification units arranged in series with each other, wherein the first and second set of the plurality of dehumidification units are arranged in parallel with each other.

22. The method of claim 18, wherein cooling the airstreams occurs downstream of the receiving a plurality of airstreams, upstream of the receiving a plurality of airstreams, or a combination thereof.

23. A system, comprising:
a dehumidification system for removing $H_2O$ vapor from an airstream, comprising:
at least one cooling unit configured to cool air;
a plurality of dehumidification units fluidly coupled to the at least one cooling unit, each of the plurality of dehumidification units comprises an air channel configured to receive an inlet airstream and discharge an outlet airstream, and an $H_2O$ permeable barrier adjacent to the air channel, wherein the $H_2O$ permeable barrier is configured to selectively enable $H_2O$ from $H_2O$ vapor in the inlet airstream to pass through the $H_2O$ permeable barrier to a suction side of the $H_2O$ permeable barrier and substantially block other components in the inlet airstream from passing through the $H_2O$ permeable barrier to the suction side of the $H_2O$ permeable barrier;

at least one pressure increasing device configured to create a lower partial pressure of $H_2O$ vapor on the suction sides of the $H_2O$ permeable barriers than a partial pressure of the $H_2O$ vapor in the inlet airstreams to drive passage of the $H_2O$ from the $H_2O$ vapor in the inlet airstream through the $H_2O$ permeable barrier, and to increase the pressure at an outlet of the at least one pressure increasing device to the partial pressure of $H_2O$ vapor suitable for condensing $H_2O$ vapor into liquid $H_2O$; and at least one membrane water vapor rejection device configured to receive the $H_2O$ vapor from the outlet of the at least one pressure increasing device, and to reject the $H_2O$ vapor into an ambient air.

* * * * *